US009206827B2

(12) United States Patent
Loree et al.

(10) Patent No.: US 9,206,827 B2
(45) Date of Patent: Dec. 8, 2015

(54) WALL MOUNT ORGANIZATION SYSTEM

(71) Applicant: Avery Dennison Corporation, Pasadena, CA (US)

(72) Inventors: Dale Loree, Brea, CA (US); Benjamin D. Rose, Cambridge (GB); Stephen Sams, Cambridge (GB); Arti Krishna, Cambridge (GB); Arielle S. Boguslav, Worcester, MA (US)

(73) Assignee: Avery Dennison Corporation, Pasadena, CA (US)

(*) Notice: Subject to any disclaimer, the term of this patent is extended or adjusted under 35 U.S.C. 154(b) by 0 days.

(21) Appl. No.: 13/682,731

(22) Filed: Nov. 20, 2012

(65) Prior Publication Data

US 2014/0138332 A1 May 22, 2014

(51) Int. Cl.

*A47F 5/08* (2006.01)
*F16B 17/00* (2006.01)
*A47B 96/02* (2006.01)

(Continued)

(52) U.S. Cl.

CPC ................. *F16B 17/00* (2013.01); *A47B 96/02* (2013.01); *A47B 96/06* (2013.01); *A47F 5/0846* (2013.01); *F16B 11/006* (2013.01); *Y10T 403/60* (2015.01)

(58) Field of Classification Search

CPC ........ A47B 46/00; A47B 47/00; A47B 96/02; A47B 96/06; A47B 81/00; A47B 96/067; A47B 95/008; A47F 5/00; A47F 5/08; A47F 7/00; A47F 5/0846; A47F 5/0853; A47F 5/0838; A47F 5/0823; A47F 5/0869; A47F 5/0876; A47F 5/0006; A47F 5/0018; A47G 29/02; F16B 17/00; F16B 11/006; Y10T 403/60; B32B 37/18; E04F 13/0864; E04F 13/0803; E04F 13/0862; E04F 13/0894; E04F 2203/04

USPC ......... 211/94.01, 87.01, 57.1, 59.1, 103, 183; 248/223.41, 475.1, 467, 489, 476, 490, 248/488, 683, 205.3, 478; 52/36.5, 36.1; 40/642.01, 642.02; D25/123, 138

See application file for complete search history.

(56) References Cited

U.S. PATENT DOCUMENTS

| | | | |
|---|---|---|---|
| 253,683 | A | 2/1882 | Catterall et al. |
| 791,093 | A | 5/1905 | Gulland |
| 1,639,616 | A | 8/1927 | Schweiker et al. |

(Continued)

FOREIGN PATENT DOCUMENTS

| | | |
|---|---|---|
| AU | 1064370 | 7/1971 |
| AU | 8937282 | 4/1984 |

(Continued)

OTHER PUBLICATIONS http://www.megawall.com/plasticslatwall.php; last visited May 21, 2013.

(Continued)

*Primary Examiner* — Jennifer E Novosad
(74) *Attorney, Agent, or Firm* — McDonald Hopkins LLC

(57) ABSTRACT

The present disclosure relates generally to workspace organization systems, and more particularly to wall-mounted systems for use in workspace organization. In one embodiment, a system configured to couple to a wall includes a mount configured to be detachably couple to the wall, the mount including a frame having opposing front and rear surfaces, and a panel detachably coupled to the mount, the panel configured to detachably support at least one accessory.

17 Claims, 41 Drawing Sheets

(51) Int. Cl.
*A47B 96/06* (2006.01)
*F16B 11/00* (2006.01)

(56) References Cited

U.S. PATENT DOCUMENTS 2,898,798 A 8/1959 Carno
3,112,547 A 12/1963 Poe
3,116,528 A 1/1964 Poe
3,371,454 A 3/1968 Anderson
3,385,157 A 5/1968 Rapata
3,411,397 A 11/1968 Birmingham
3,438,302 A 4/1969 Sandor
3,603,274 A 9/1971 Ferdinand et al.
3,606,814 A 9/1971 Mackenzie
3,622,116 A * 11/1971 Fellows ........................ 248/467
3,637,186 A 1/1972 Greenfield
3,698,565 A 10/1972 Weber
3,728,761 A 4/1973 Holly
3,803,789 A 4/1974 Gibson
3,822,924 A 7/1974 Lust
3,830,374 A * 8/1974 Kassimir ........................... 211/1
3,918,130 A 11/1975 Poe
3,965,826 A 6/1976 Markham
3,995,401 A 12/1976 Smith
4,004,526 A 1/1977 King
4,005,883 A 2/1977 Guest
4,065,088 A 12/1977 Shell
4,085,651 A 4/1978 Koscik
4,117,644 A 10/1978 Weinar
4,125,304 A 11/1978 Ebert
4,131,203 A 12/1978 Bridges
4,208,802 A 6/1980 Berndt
4,215,765 A 8/1980 Harris
4,220,309 A * 9/1980 Eisen et al. ................... 248/542
4,221,095 A 9/1980 Weinar
4,234,094 A 11/1980 Jorgensen
4,250,677 A 2/1981 Yablonski
4,296,580 A 10/1981 Weinar
4,318,486 A 3/1982 Bobrowski
4,333,286 A 6/1982 Weinar
4,350,252 A 9/1982 Hopkins et al.
4,361,099 A 11/1982 Kokenge et al.
4,381,715 A 5/1983 Forman
4,382,640 A 5/1983 Kashden
4,384,648 A * 5/1983 Hart et al. ..................... 206/527
4,410,095 A 10/1983 Dembicks
4,434,900 A 3/1984 Cook
4,437,712 A 3/1984 Wissinger
4,443,986 A 4/1984 Propst et al.
4,457,436 A 7/1984 Kelley
4,461,443 A * 7/1984 Dauman .................. 248/220.41
4,509,648 A 4/1985 Govang et al.
4,511,047 A 4/1985 Elinsky
4,557,446 A 12/1985 Barron
4,559,728 A 12/1985 Price
4,560,072 A 12/1985 Burrell
4,591,058 A 5/1986 Amstutz et al.
4,607,753 A 8/1986 Radek
4,609,172 A 9/1986 Dorner
4,615,448 A 10/1986 Johnstonbaugh
4,618,117 A 10/1986 Gerbe
4,629,076 A 12/1986 Amstutz et al.
4,635,801 A 1/1987 Oren
4,672,789 A 6/1987 Fortier
4,674,240 A 6/1987 Strausheim
4,678,151 A 7/1987 Radek
4,687,094 A 8/1987 Allsop et al.
4,694,965 A 9/1987 Parnell
4,704,837 A 11/1987 Menchetti et al.
4,708,311 A 11/1987 Clausen et al.
4,724,638 A 2/1988 Bezborodko
4,747,025 A * 5/1988 Barton .......................... 362/147
4,752,010 A 6/1988 Holztrager
4,765,645 A 8/1988 Shamie
4,782,642 A 11/1988 Conville
4,787,768 A 11/1988 Lange
4,796,845 A 1/1989 Regel
4,805,783 A 2/1989 Mayer
4,805,784 A 2/1989 Solheim et al.
4,809,479 A 3/1989 Tierno et al.
4,815,866 A 3/1989 Martone
4,825,601 A 5/1989 Halverson
4,830,203 A 5/1989 Ennis
4,830,440 A 5/1989 Burch
4,844,266 A 7/1989 Small et al.
4,876,835 A * 10/1989 Kelley et al. .................... 52/239
4,891,897 A 1/1990 Gieske et al.
4,903,928 A 2/1990 Shell
4,932,538 A 6/1990 Gambello
4,944,416 A * 7/1990 Petersen et al. ................ 52/36.5
4,961,295 A * 10/1990 Kosch, Sr. et al. ............. 52/36.5
4,971,206 A 11/1990 Lemmerman et al.
4,976,357 A 12/1990 Pearson
4,993,583 A 2/1991 Chasen
4,995,605 A 2/1991 Conville
5,018,323 A 5/1991 Clausen
5,031,780 A 7/1991 Lemmerman et al.
5,038,946 A 8/1991 Tenser et al.
5,050,832 A 9/1991 Lee et al.
5,069,263 A 12/1991 Edwards
5,109,993 A 5/1992 Hutchison
5,121,578 A 6/1992 Holz
5,138,803 A 8/1992 Grossen
5,140,915 A 8/1992 Knape
5,186,427 A 2/1993 Semchuck
5,224,610 A 7/1993 Veazey
5,228,579 A 7/1993 Kaufman
5,242,241 A 9/1993 Nelson
5,255,803 A 10/1993 Pavone et al.
5,269,083 A * 12/1993 Vampatella et al. ............ 40/711
5,318,264 A 6/1994 Meiste
5,325,641 A 7/1994 Felton
5,328,137 A * 7/1994 Miller et al. ............. 248/220.21
5,332,108 A 7/1994 Blass
5,337,987 A 8/1994 Sawatsky
5,346,078 A 9/1994 Ernetoft
5,348,385 A 9/1994 Berg
5,356,104 A 10/1994 Rosenberg et al.
5,379,976 A 1/1995 Degirolamo
5,390,462 A 2/1995 Kreiter
5,397,006 A * 3/1995 Terrell ....................... 211/88.01
5,397,087 A 3/1995 Teece
5,409,120 A * 4/1995 Miller et al. ............... 211/85.26
5,412,912 A * 5/1995 Alves ............................ 52/36.5
5,431,761 A 7/1995 Holztrager
5,466,058 A 11/1995 Chan
5,477,645 A 12/1995 Bauer
5,477,969 A 12/1995 Beeskau et al.
5,482,168 A 1/1996 Welch et al.
5,482,238 A 1/1996 Kreiter
5,493,832 A 2/1996 Abrams
5,507,464 A * 4/1996 Hamerski et al. ............. 248/683
5,517,795 A 5/1996 Doke
5,531,167 A 7/1996 Stevens et al.
5,551,580 A 9/1996 Knutson
5,575,396 A 11/1996 Smed
5,582,376 A 12/1996 Thompson
5,588,541 A 12/1996 Goetz
5,592,886 A 1/1997 Williams et al.
5,601,896 A 2/1997 Bodine et al.
5,606,834 A 3/1997 Bauer
5,641,074 A 6/1997 Smed
5,655,674 A 8/1997 Holztrager
5,658,014 A 8/1997 Barker et al.
5,673,803 A 10/1997 Burback
5,695,163 A 12/1997 Tayar
5,711,115 A 1/1998 Wirt
5,775,521 A 7/1998 Tisbo
5,791,093 A * 8/1998 Diamond ...................... 52/36.5
5,803,275 A 9/1998 Schweitzer
5,806,693 A 9/1998 Carbonaro
5,819,490 A 10/1998 Current
5,834,081 A 11/1998 Fanti
5,857,578 A 1/1999 Fishman

(56) References Cited

U.S. PATENT DOCUMENTS

| | | | | |
|---|---|---|---|---|
| 5,868,263 | A | 2/1999 | Mcallister et al. | |
| 5,888,144 | A | 3/1999 | Jäger | |
| 5,897,002 | A | 4/1999 | Carlino | |
| 5,899,344 | A | 5/1999 | Current et al. | |
| 5,901,516 | A | 5/1999 | Watson | |
| 5,938,158 | A | 8/1999 | Tisbo | |
| 5,941,026 | A * | 8/1999 | Eisenreich et al. | 52/36.5 |
| 5,944,203 | A | 8/1999 | Vlah et al. | |
| 5,944,294 | A | 8/1999 | Baer | |
| 5,983,574 | A | 11/1999 | Holztrager | |
| 5,984,439 | A | 11/1999 | Orr et al. | |
| 6,010,017 | A | 1/2000 | Michaelis et al. | |
| 6,019,331 | A | 2/2000 | Hoogland et al. | |
| 6,035,598 | A | 3/2000 | Sukolics et al. | |
| 6,050,426 | A | 4/2000 | Leurdijk | |
| 6,050,657 | A | 4/2000 | Hiltzman | |
| 6,065,723 | A | 5/2000 | Skudelny | |
| 6,073,399 | A | 6/2000 | Shipman et al. | |
| 6,089,685 | A | 7/2000 | Ryan et al. | |
| 6,095,465 | A * | 8/2000 | Weck et al. | 248/205.3 |
| 6,102,217 | A | 8/2000 | Mathy et al. | |
| 6,119,317 | A | 9/2000 | Pfister | |
| 6,119,878 | A | 9/2000 | Zen | |
| 6,134,846 | A | 10/2000 | Lamb | |
| 6,164,467 | A * | 12/2000 | DePottey et al. | 211/189 |
| D438,030 | S | 2/2001 | Riga | |
| 6,202,865 | B1 | 3/2001 | Kuo | |
| 6,220,461 | B1 | 4/2001 | Dickinson | |
| 6,230,907 | B1 | 5/2001 | Stuart | |
| 6,269,958 | B1 | 8/2001 | Pollock et al. | |
| 6,273,656 | B1 | 8/2001 | Cleland et al. | |
| 6,276,034 | B1 | 8/2001 | Bachman et al. | |
| 6,286,691 | B1 | 9/2001 | Oberhaus et al. | |
| 6,299,001 | B1 | 10/2001 | Frolov et al. | |
| 6,311,854 | B1 | 11/2001 | Anderson | |
| 6,325,223 | B1 | 12/2001 | Hannen | |
| 6,328,571 | B1 | 12/2001 | Dricken et al. | |
| 6,349,507 | B1 | 2/2002 | Muellerleile | |
| 6,405,465 | B2 | 6/2002 | Dwyer et al. | |
| 6,419,333 | B2 | 7/2002 | Liebertz et al. | |
| 6,421,961 | B1 | 7/2002 | Mallozzi | |
| 6,439,404 | B1 | 8/2002 | Steeg | |
| 6,467,637 | B2 | 10/2002 | Riga | |
| 6,467,860 | B2 | 10/2002 | Remmers | |
| 6,491,172 | B2 | 12/2002 | Chance et al. | |
| D468,560 | S | 1/2003 | Riga | |
| 6,508,449 | B2 | 1/2003 | Veazey | |
| 6,510,635 | B1 | 1/2003 | Rudolph et al. | |
| D471,993 | S | 3/2003 | Holztrager | |
| D473,664 | S | 4/2003 | Perkins et al. | |
| 6,547,086 | B1 | 4/2003 | Harvey | |
| 6,564,952 | B1 | 5/2003 | Suttles | |
| 6,578,498 | B1 | 6/2003 | Draudt et al. | |
| 6,581,788 | B1 | 6/2003 | Winig et al. | |
| 6,612,532 | B1 | 9/2003 | Paulus | |
| 6,637,707 | B1 | 10/2003 | Gates et al. | |
| D482,802 | S | 11/2003 | Yates, Jr. | |
| D482,803 | S | 11/2003 | Yates, Jr. | |
| 6,644,609 | B1 | 11/2003 | Scott | |
| 6,668,514 | B2 | 12/2003 | Skov | |
| 6,688,238 | B1 | 2/2004 | Alexiou | |
| 6,701,678 | B1 | 3/2004 | Skov et al. | |
| 6,702,128 | B2 | 3/2004 | Winig et al. | |
| 6,711,871 | B2 * | 3/2004 | Beirise et al. | 52/782.1 |
| 6,730,091 | B1 | 5/2004 | Pfefferle et al. | |
| 6,749,161 | B1 | 6/2004 | Will et al. | |
| 6,763,957 | B1 | 7/2004 | Mullerleile | |
| D494,842 | S | 8/2004 | Perkins et al. | |
| 6,786,340 | B2 | 9/2004 | Ford et al. | |
| 6,802,484 | B1 | 10/2004 | Kiley et al. | |
| 6,805,185 | B2 * | 10/2004 | Gravel et al. | 160/135 |
| 6,837,384 | B2 | 1/2005 | Secondino | |
| 6,877,617 | B2 | 4/2005 | Lane et al. | |
| D507,355 | S | 7/2005 | Fischer | |
| 6,929,131 | B1 | 8/2005 | Landi | |
| 6,935,518 | B2 | 8/2005 | Winig et al. | |
| 6,945,414 | B1 | 9/2005 | Stevens et al. | |
| 6,945,620 | B2 | 9/2005 | Lam et al. | |
| D511,390 | S | 11/2005 | Schuberth | |
| D511,581 | S | 11/2005 | Holztrager | |
| 6,971,614 | B2 | 12/2005 | Fischer et al. | |
| 6,976,595 | B1 | 12/2005 | Geller | |
| D513,535 | S | 1/2006 | Fischer | |
| 7,021,730 | B2 | 4/2006 | Remmers | |
| D520,794 | S | 5/2006 | Grover | |
| 7,055,703 | B2 | 6/2006 | Perkins et al. | |
| 7,066,435 | B2 | 6/2006 | Oddsen, Jr. et al. | |
| 7,086,543 | B2 | 8/2006 | Remmers | |
| 7,088,580 | B2 | 8/2006 | Chen et al. | |
| 7,093,726 | B1 | 8/2006 | Holztrager | |
| 7,104,023 | B1 | 9/2006 | Holztrager | |
| 7,114,789 | B2 | 10/2006 | Keaton | |
| D533,283 | S | 12/2006 | Holztrager | |
| 7,147,114 | B2 | 12/2006 | Sarnoff et al. | |
| 7,147,115 | B2 | 12/2006 | Perkins et al. | |
| D536,239 | S | 2/2007 | Tallman | |
| 7,175,034 | B2 | 2/2007 | Nook et al. | |
| 7,185,770 | B1 | 3/2007 | Roten | |
| 7,198,159 | B2 | 4/2007 | Fischer | |
| 7,228,977 | B2 * | 6/2007 | Perkins et al. | 211/94.01 |
| 7,234,604 | B2 | 6/2007 | Eisele | |
| D547,640 | S | 7/2007 | Remmers | |
| D549,562 | S | 8/2007 | Browne et al. | |
| D549,563 | S | 8/2007 | Browne et al. | |
| D551,470 | S | 9/2007 | Loew | |
| D551,781 | S | 9/2007 | Abdullah | |
| D551,884 | S | 10/2007 | Remmers | |
| D552,894 | S | 10/2007 | Loew | |
| 7,296,695 | B2 | 11/2007 | Perkins et al. | |
| 7,296,863 | B2 | 11/2007 | Lam et al. | |
| 7,306,107 | B2 | 12/2007 | Secondino | |
| D563,567 | S | 3/2008 | Fischer | |
| 7,392,912 | B2 | 7/2008 | Zandt | |
| 7,439,293 | B2 | 10/2008 | Perkins et al. | |
| D582,190 | S | 12/2008 | Valiulis et al. | |
| 7,461,484 | B2 | 12/2008 | Battey et al. | |
| 7,464,511 | B2 | 12/2008 | Kosch | |
| 7,469,979 | B2 | 12/2008 | Tupper et al. | |
| 7,497,533 | B2 | 3/2009 | Remmers | |
| 7,527,156 | B2 | 5/2009 | Wisnoski et al. | |
| 7,571,571 | B1 | 8/2009 | Mershon | |
| 7,597,203 | B2 | 10/2009 | Jasniy | |
| 7,618,069 | B2 | 11/2009 | Lutzke | |
| 7,627,983 | B1 | 12/2009 | Deutsch-Aboulmahassine | |
| 7,665,619 | B2 | 2/2010 | Mangano | |
| 7,686,172 | B2 | 3/2010 | Wisnoski et al. | |
| D613,520 | S | 4/2010 | Goodman | |
| 7,717,279 | B2 | 5/2010 | Lawson | |
| 7,740,144 | B2 | 6/2010 | Kosir | |
| 7,753,217 | B2 | 7/2010 | Lawson | |
| 7,757,869 | B2 | 7/2010 | Lawson | |
| 7,762,023 | B2 | 7/2010 | Kasdorf et al. | |
| 7,775,492 | B2 | 8/2010 | Pierzynski et al. | |
| 7,798,338 | B2 | 9/2010 | Maheu et al. | |
| 7,798,341 | B2 | 9/2010 | Richardson et al. | |
| 7,802,769 | B1 | 9/2010 | Lindsey | |
| 7,841,676 | B2 | 11/2010 | Hawkins | |
| D628,459 | S | 12/2010 | Minkley et al. | |
| 7,845,604 | B2 | 12/2010 | Connor, Jr. | |
| 7,866,491 | B2 | 1/2011 | Newman | |
| 8,037,642 | B2 * | 10/2011 | Nagel et al. | 52/36.1 |
| 8,061,539 | B2 | 11/2011 | Punzel et al. | |
| 8,104,850 | B2 | 1/2012 | Hager et al. | |
| 8,146,754 | B2 | 4/2012 | Apgood, II et al. | |
| 8,177,311 | B2 | 5/2012 | Apgood, II et al. | |
| 8,205,395 | B2 | 6/2012 | Jakiel | |
| 2001/0047971 | A1 * | 12/2001 | Chance et al. | 211/87.01 |
| 2002/0005024 | A1 | 1/2002 | Hsueh | |
| 2002/0066199 | A1 | 6/2002 | Hanson | |
| 2002/0104813 | A1 | 8/2002 | Routhier | |
| 2003/0000901 | A1 * | 1/2003 | Salatin et al. | 211/85.16 |
| 2003/0025053 | A1 | 2/2003 | McKeon | |
| 2003/0056697 | A1 | 3/2003 | Crown et al. | |
| 2003/0057336 | A1 | 3/2003 | Hochman | |

(56) References Cited

U.S. PATENT DOCUMENTS

| | | | |
|---|---|---|---|
| 2003/0085188 | A1 | 5/2003 | Klein et al. |
| 2003/0160060 | A1 | 8/2003 | Hornblad et al. |
| 2003/0189393 | A1 | 10/2003 | Draudt et al. |
| 2004/0031890 | A1 | 2/2004 | Haluzak |
| 2004/0222176 | A1 | 11/2004 | Campbell et al. |
| 2005/0092704 | A1 | 5/2005 | Heneveld, Sr. |
| 2005/0145147 | A1 | 7/2005 | Costa et al. |
| 2005/0193641 | A1 | 9/2005 | Fischer |
| 2005/0224433 | A1 | 10/2005 | Heneveld, Sr. |
| 2005/0236538 | A1 | 10/2005 | Schmidt et al. |
| 2005/0236544 | A1 | 10/2005 | Mancino et al. |
| 2005/0263469 | A1 | 12/2005 | Norris et al. |
| 2005/0279041 | A1 | 12/2005 | Staples et al. |
| 2005/0280341 | A1 | 12/2005 | Vardon |
| 2006/0010820 | A1 | 1/2006 | Schwitte et al. |
| 2006/0012977 | A1 | 1/2006 | Joseph |
| 2006/0076305 | A1 | 4/2006 | Wang |
| 2006/0091093 | A1 | 5/2006 | Armari |
| 2006/0108486 | A1 | 5/2006 | Nowak |
| 2006/0137260 | A1 | 6/2006 | Shernaman |
| 2006/0243683 | A1 | 11/2006 | Onachilla et al. |
| 2006/0243688 | A1 | 11/2006 | Gilcrest et al. |
| 2006/0266901 | A1 | 11/2006 | Tallman |
| 2007/0056921 | A1 | 3/2007 | Lo |
| 2007/0095997 | A1 | 5/2007 | Case |
| 2007/0102601 | A1 | 5/2007 | Thompson |
| 2007/0215493 | A1 | 9/2007 | Servis |
| 2007/0221594 | A1 | 9/2007 | Pierro |
| 2007/0222348 | A1 | 9/2007 | Kobayashi |
| 2007/0278168 | A1 | 12/2007 | Li |
| 2008/0000861 | A1 | 1/2008 | Muellerleile |
| 2008/0000863 | A1 | 1/2008 | DiBello |
| 2008/0047474 | A1 | 2/2008 | Scholz |
| 2008/0053345 | A1 | 3/2008 | Newbould et al. |
| 2008/0053932 | A1 | 3/2008 | Newbould et al. |
| 2008/0061018 | A1 | 3/2008 | Keller |
| 2008/0083514 | A1 | 4/2008 | Munson |
| 2008/0093431 | A1 | 4/2008 | Rosen et al. |
| 2008/0093519 | A1 | 4/2008 | Olson |
| 2008/0098680 | A1 | 5/2008 | McConnell et al. |
| 2008/0098683 | A1 | 5/2008 | Trabue et al. |
| 2008/0099417 | A1 | 5/2008 | Zandt |
| 2008/0197091 | A1 | 8/2008 | Lim et al. |
| 2008/0237162 | A1 | 10/2008 | Lynch |
| 2008/0245755 | A1 | 10/2008 | Carter |
| 2008/0245937 | A1 | 10/2008 | Connor |
| 2008/0272078 | A1 | 11/2008 | Belokin et al. |
| 2008/0296245 | A1 | 12/2008 | Punzel et al. |
| 2008/0302744 | A1 | 12/2008 | Rosenberg |
| 2008/0308516 | A1 | 12/2008 | Li |
| 2008/0314850 | A1 | 12/2008 | Haarmann |
| 2009/0001036 | A1 | 1/2009 | Thieman |
| 2009/0014401 | A1 | 1/2009 | Tallman |
| 2009/0090828 | A1 | 4/2009 | Junkins |
| 2009/0091228 | A1 | 4/2009 | Tupper et al. |
| 2009/0100730 | A1 | 4/2009 | Nathanson et al. |
| 2009/0101610 | A1 | 4/2009 | Clark et al. |
| 2009/0134290 | A1 | 5/2009 | Begic et al. |
| 2009/0145866 | A1 | 6/2009 | Panosian et al. |
| 2009/0213598 | A1 | 8/2009 | Terry |
| 2009/0241451 | A1 | 10/2009 | Griffiths |
| 2009/0241455 | A1 | 10/2009 | Griffiths et al. |
| 2009/0241456 | A1 | 10/2009 | Griffiths |
| 2009/0249592 | A1 | 10/2009 | Thieman |
| 2009/0249727 | A1 | 10/2009 | Kosch |
| 2009/0272055 | A1 | 11/2009 | Griffiths |
| 2009/0273259 | A1 | 11/2009 | Whitney et al. |
| 2009/0294392 | A1 | 12/2009 | Stafford et al. |
| 2009/0294612 | A1 | 12/2009 | Cline |
| 2010/0012799 | A1 | 1/2010 | Sexton |
| 2010/0018141 | A1 | 1/2010 | Kelly |
| 2010/0028592 | A1 | 2/2010 | Barkdoll et al. |
| 2010/0032394 | A1 | 2/2010 | Wang |
| 2010/0038330 | A1 | 2/2010 | Zu |
| 2010/0050548 | A1 | 3/2010 | Krieger |
| 2010/0050556 | A1 | 3/2010 | Burns |
| 2010/0064629 | A1 | 3/2010 | Hogan et al. |
| 2010/0089844 | A1 | 4/2010 | Rotolo |
| 2010/0096347 | A1 | 4/2010 | Theobald et al. |
| 2010/0096350 | A1 | 4/2010 | Ma et al. |
| 2010/0122505 | A1 | 5/2010 | Jakiel |
| 2010/0123063 | A1 | 5/2010 | Bauchet et al. |
| 2010/0132268 | A1 | 6/2010 | Vardaro |
| 2010/0140199 | A1 | 6/2010 | Fenger |
| 2010/0146884 | A1 | 6/2010 | Lu et al. |
| 2010/0170174 | A1 | 7/2010 | Wangdak |
| 2010/0175332 | A1 | 7/2010 | Henriott |
| 2010/0181274 | A1 | 7/2010 | Vargo et al. |
| 2010/0206825 | A1 | 8/2010 | Johnston et al. |
| 2010/0223857 | A1 | 9/2010 | Sutton et al. |
| 2010/0237755 | A1 | 9/2010 | Zalewski |
| 2010/0252520 | A1 | 10/2010 | Hsu |
| 2010/0253196 | A1 | 10/2010 | Nye |
| 2010/0258517 | A1 | 10/2010 | Moritz et al. |
| 2010/0264104 | A1 | 10/2010 | Winter |
| 2010/0276241 | A1 | 11/2010 | Malone |
| 2010/0288891 | A1 | 11/2010 | Tisbo |
| 2010/0289389 | A1 | 11/2010 | Crabtree, II |
| 2010/0327134 | A1 | 12/2010 | Lundrigan et al. |
| 2011/0011813 | A1 | 1/2011 | Kao |
| 2011/0017690 | A1 | 1/2011 | Wang |
| 2011/0024585 | A1 | 2/2011 | Brinkdopke et al. |
| 2011/0025180 | A1 | 2/2011 | Ilich et al. |
| 2011/0100939 | A1 | 5/2011 | Friesch |
| 2011/0302865 | A1 | 12/2011 | Kliegle et al. |
| 2011/0303798 | A1 | 12/2011 | Bader et al. |
| 2012/0117910 | A1* | 5/2012 | Chuang ........................ 52/588.1 |
| 2014/0138332 | A1* | 5/2014 | Loree et al. ................ 211/87.01 |

FOREIGN PATENT DOCUMENTS

| | | |
|---|---|---|
| AU | 7429987 | 12/1987 |
| AU | 2290992 | 2/1993 |
| AU | 2304395 | 11/1995 |
| AU | 2238599 | 8/1999 |
| AU | 5300800 | 12/2000 |
| AU | 2002225549 | 6/2003 |
| AU | 2002310129 | 12/2003 |
| AU | 2003100924 | 1/2004 |
| AU | 2005294885 | 4/2006 |
| AU | 2007203111 | 1/2008 |
| AU | 2009207799 | 7/2009 |
| AU | 2008202994 | 1/2010 |
| AU | 2008207671 | 4/2010 |
| AU | 2009202862 | 2/2011 |
| CA | 2454325 | 1/2005 |
| EP | 0005901 | 12/1979 |
| EP | 0014790 | 9/1980 |
| EP | 0130234 | 1/1985 |
| EP | 0215769 | 3/1987 |
| EP | 0253683 | 1/1988 |
| EP | 0255094 | 2/1988 |
| EP | 0263736 | 4/1988 |
| EP | 0324304 | 7/1989 |
| EP | 0327685 | 8/1989 |
| EP | 0346002 | 12/1989 |
| EP | 0390547 | 10/1990 |
| EP | 0437903 | 7/1991 |
| EP | 0519349 | 12/1992 |
| EP | 0565039 | 10/1993 |
| EP | 0565081 | 10/1993 |
| EP | 0585496 | 3/1994 |
| EP | 0613112 | 8/1994 |
| EP | 0626488 | 11/1994 |
| EP | 0738485 | 10/1996 |
| EP | 0814218 | 12/1997 |
| EP | 0841029 | 5/1998 |
| EP | 0868872 | 10/1998 |
| EP | 0908633 | 4/1999 |
| EP | 1021978 | 7/2000 |
| EP | 1037546 | 9/2000 |
| EP | 1060683 | 12/2000 |
| EP | 1083341 | 3/2001 |
| EP | 1100363 | 5/2001 |

(56) References Cited

FOREIGN PATENT DOCUMENTS

| | | |
|---|---|---|
| EP | 1167244 | 1/2002 |
| EP | 1195480 | 4/2002 |
| EP | 1232705 | 8/2002 |
| EP | 1260156 | 11/2002 |
| EP | 1164900 | 4/2003 |
| EP | 1316279 | 6/2003 |
| EP | 1407696 | 4/2004 |
| EP | 1424028 | 6/2004 |
| EP | 1442684 | 8/2004 |
| EP | 1449453 | 8/2004 |
| EP | 1241965 | 11/2004 |
| EP | 1477088 | 11/2004 |
| EP | 1488847 | 12/2004 |
| EP | 1496171 | 1/2005 |
| EP | 1516559 | 3/2005 |
| EP | 1597986 | 11/2005 |
| EP | 1694171 | 8/2006 |
| EP | 1715113 | 10/2006 |
| EP | 1727110 | 11/2006 |
| EP | 1808102 | 7/2007 |
| EP | 1857023 | 11/2007 |
| EP | 1982617 | 10/2008 |
| EP | 2000053 | 12/2008 |
| EP | 2004015 | 12/2008 |
| EP | 2062502 | 5/2009 |
| EP | 2064970 | 6/2009 |
| EP | 2107177 | 10/2009 |
| EP | 2124677 | 12/2009 |
| EP | 2138070 | 12/2009 |
| EP | 2144839 | 1/2010 |
| EP | 2174567 | 4/2010 |
| EP | 2174569 | 4/2010 |
| EP | 2180105 | 4/2010 |
| EP | 2181623 | 5/2010 |
| EP | 2191757 | 6/2010 |
| EP | 2211665 | 8/2010 |
| EP | 2237706 | 10/2010 |
| EP | 2238872 | 10/2010 |
| EP | 2239395 | 10/2010 |
| EP | 2243396 | 10/2010 |
| EP | 2250946 | 11/2010 |
| GB | 1009174 | 11/1965 |
| GB | 2332138 | 6/1999 |
| JP | H11141517 | 5/1999 |
| WO | WO 93/00846 | 1/1993 |
| WO | WO 95/29613 | 11/1995 |
| WO | WO 99/35941 | 7/1999 |
| WO | WO 00/07485 | 2/2000 |
| WO | WO 00/74524 | 12/2000 |
| WO | WO 02/096669 | 12/2002 |
| WO | WO 03/044296 | 5/2003 |
| WO | WO 2006/041315 | 4/2006 |
| WO | WO 2007/096658 | 8/2007 |
| WO | WO 2008/083988 | 7/2008 |
| WO | WO 2009/065391 | 5/2009 |
| WO | WO 2009/092604 | 7/2009 |

OTHER PUBLICATIONS http://www.amazon.com/StoreWall-Standard-Panel-Grey/dp/B006I2MTHG/ref=sr_1_3?ie=UTF8&qid=1342122114&; last visited May 21, 2013.

http://www.storewall.com/onlinestore/wall-panels/standard-wall-panel.html; last visited May 21, 2013.

http://www.amazon.com/Jifram-Easy-Living-01000021-Slatwall/dp/B004BKJZRO/ref=sr_1_1?s=home-garden&ie=UTF8&qid=1342123476&sr=1-1; last visited May 21, 2013.

http://www.amazon.com/dp/B002AR2Y64; last visited May 23, 2013.

* cited by examiner

WALL MOUNT ORGANIZATION SYSTEM

TECHNICAL FIELD

This application relates generally to workspace organization systems, and more particularly to wall-mounted systems for use in workspace organization.

BACKGROUND OF THE INVENTION

Office workers typically use a desk or table as a primary workspace on which to perform routine office-related functions. However, desks have a limited surface area and are therefore prone to becoming cluttered with the myriad items frequently used in an office (e.g., writing instruments, paper supplies, electronic devices, binders, etc.). Such desk clutter tends to inhibit work efficiency and productivity. Accordingly, workspace organization systems are commonly used to arrange and organize the various desktop items so as to maximize the amount of free or available surface area of the desk. However, the process of installing conventional workspace organization systems to a desired wall surface and subsequently dismounting the workspace organization systems from the wall, such as for periodic cleaning or repair, can be highly cumbersome, labor-intensive, and time-consuming. Additionally, conventional workspace organization systems provide limited design flexibility and customization. There is a need for a highly customizable workspace organization system configured to store, mount, and organize the specific desktop items of the user.

SUMMARY OF THE INVENTION

The present application relates generally to workspace organization systems, and more particularly to wall-mounted systems for use in workspace organization. In one embodiment, a system configured to couple to a wall includes a mount configured to be detachably coupled to the wall, the mount including a frame having opposing front and rear surfaces, and a panel detachably coupled to the mount, the panel configured to detachably support at least one accessory. In one embodiment, the mount further includes at least one adhesive member coupled to the rear surface of the frame, and at least one bumper biased rearward beyond the at least one adhesive member, the at least one bumper configured to pivot between an engaged position and a disengaged position wherein the bumper extends beyond the at least one adhesive member. In another embodiment, the at least one accessory includes a portion, the panel includes a plurality of spaced apart horizontal slats, the panel includes a plurality of channels defined by adjacent slats, and each of the plurality of channels are configured to detachably receive the portion of the at least one accessory.

In one embodiment, the mount further includes at least one hook protruding forward from the front surface of the frame, the panel further includes at least one corresponding hook receptacle, and the at least one hook is detachably engageable with the at least one corresponding hook receptacle. In yet another embodiment, the frame further includes at least one standoff protruding forward from the front surface of the frame, the standoff forming an oblique angle relative to the rear surface, and wherein the standoff is configured to receive a fastener configured to couple the mount to the wall. In one embodiment, each of the at least one adhesive member includes a hook portion releasably engageable with a loop portion, wherein one of the hook and loop portions is coupled to the rear surface of the frame and the other is configured to be adhered to the wall.

In one embodiment, the at least one adhesive member includes transfer tape. In yet another embodiment, the panel includes a middle panel including a plurality of horizontal slat rails, with adjacent horizontal slat rails spaced apart by a first distance, and a plurality of vertical support members interconnecting the plurality of horizontal slat rails, and a face panel joined to the middle panel, the face panel including a plurality of spaced apart slats, each slat including a vertical face panel having a generally flat front surface and a rear surface opposite the front surface, and a pair of legs spaced apart by a second distance, the legs extending orthogonally from the rear surface of the vertical face panel, wherein the second distance is substantially equal to the first distance. In one embodiment, the panel includes a dry erase board, a push pin board, a magnetic surface, or a mirror.

In one embodiment, the at least one hook includes a depression, the at least one corresponding hook receptacle includes a tab, and the depression is configured to receive the tab. In yet a further embodiment, the mount further includes a level that is coupled to the frame. In another embodiment, the panel further includes an upper edge, a lower edge, an L-shaped flange disposed on the upper edge of the panel configured to be spaced apart from the wall by a first distance, an inverted L-shaped flange on the lower edge of the panel configured to be spaced apart from the wall by a second distance, and wherein the first distance is greater than the second distance. In one embodiment, each of the plurality of vertical face panels overhangs the corresponding pair of legs, the overhanging portions defining a top lip and a bottom lip opposite the top lip. In another embodiment, the face panel further includes a plurality of lobes projecting rearward from the top lip. In one embodiment, the accessory is a bin accessory, a document holder accessory, a hook accessory, a drawer shelf accessory, a shelf accessory, or a bulldog clip accessory.

In one embodiment, an interlock connector configured to detachably couple an accessory to a panel includes a base, a tongue extending from the base in a first direction, the tongue having a first end pivotally attached to the base and a free second end opposite the first end, wherein the tongue is configured to pivot between a first position and a second position, and wherein the tongue is naturally biased in a third position between the first and second positions, and a plurality of tabs extending from the base in a second direction opposite the first direction, each of the tabs having an outwardly projecting shoulder portion. In one embodiment, the plurality of tabs on the interlock connector are configured to be received in a plurality of openings in the accessory. In one embodiment, at least one of the shoulder portions is configured to releasably engage a portion of the openings in the accessory. In another embodiment, the plurality of tabs includes first and second tabs disposed on opposite ends of the base and a third tab disposed between the first and second tabs.

In yet another embodiment, the interlock connector includes first and second legs coupled to the base extending in a third direction. In one embodiment, the third direction is generally orthogonal to at least one of the first and second directions. In another embodiment, the first and second legs are spaced apart by a notch sized to permit the tongue to pivot into the first position. In one embodiment, both of the first and second legs include a horizontal flange, and a vertical flange extending upward from the horizontal flange. In one embodiment, the tongue further includes an upper end, and a bulbous lip extending transversely across the upper end of the tongue. In one embodiment, the accessory includes a rear surface, the first and second legs each include a rear surface, and the rear surfaces of the first and second legs are configured to abut the rear surface of the accessory. In one embodiment, the accessory is a bin accessory, a document holder accessory, a hook accessory, a drawer shelf accessory, a shelf accessory, or a bulldog clip accessory.

In one embodiment, an interlock receptacle configured to detachably couple an accessory having a rear surface to a panel includes a horizontal ledge extending rearward from the rear surface of the accessory, the horizontal ledge having a fixed end and a free end opposite the fixed end, a vertical tooth extending downward from the free end of the horizontal ledge, and a plurality of openings extending through the ledge. In one embodiment, the interlock receptacle includes a plurality of spaced apart gussets extending between the horizontal ledge and the vertical tooth. In another embodiment, the plurality of openings are generally rectangular in cross-section. In yet another embodiment, the openings are disposed between the gussets. In one embodiment, the vertical tooth includes a front surface, the horizontal ledge includes a lower surface, a recess is defined between the rear surface of the accessory, the front surface of the vertical tooth, and the lower surface of the horizontal ledge, and the recess is configured to detachably secure the accessory to the panel. In yet a further embodiment, the accessory is a bin accessory, a document holder accessory, a hook accessory, a drawer shelf accessory, a shelf accessory, or a bulldog clip accessory.

In one embodiment, a method of manufacturing a panel configured to couple to a wall includes forming a middle panel, forming a face panel, and joining the middle panel to the face panel to form the panel. In one embodiment, the step of forming the middle panel is liquid injection molding, rapid prototyping, or machining. In another embodiment, the step of forming the face panel is liquid injection molding, rapid prototyping, or machining. In one embodiment, the step of joining the middle panel to the face panel is ultrasonic welding, friction stir welding, radio frequency (RF) welding, adhesive fastening, or mechanical fastening.

This summary is provided to introduce a selection of concepts that are further described below in the detailed description. This summary is not intended to identify key or essential features of the claimed subject matter, nor is it intended to be used in limiting the scope of the claimed subject matter.

BRIEF DESCRIPTION OF THE DRAWINGS

Embodiments of a wall system according to the present invention are described with reference to the following figures. The same reference numerals are used throughout the figures to reference like features and components.

DETAILED DESCRIPTION

Figure 1A:
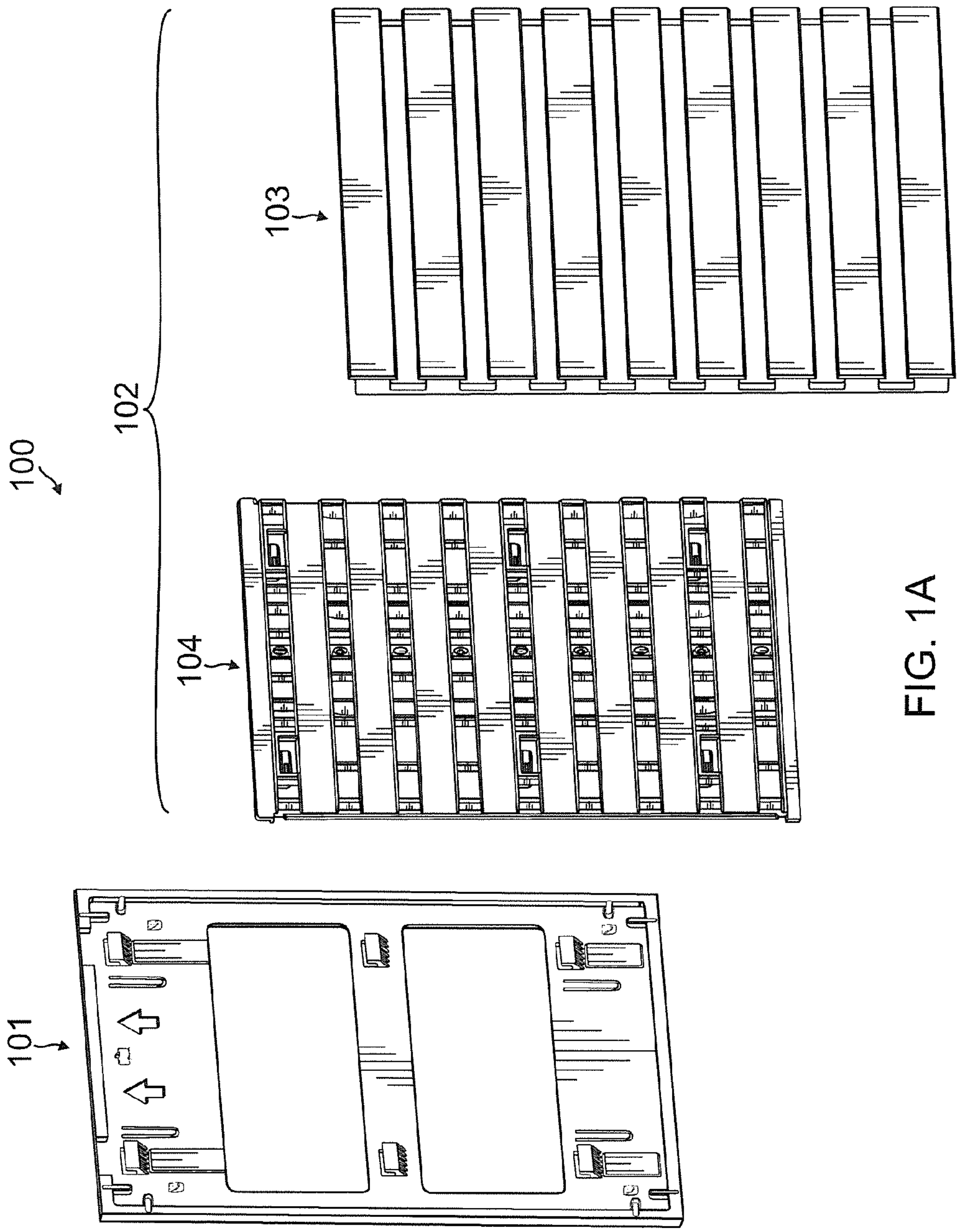
FIGS. 1A and 1B are exploded front and rear perspective views, respectively, of an embodiment of a wall system having a face panel, a middle panel, and a mount according to the present invention.
Figure 1B:
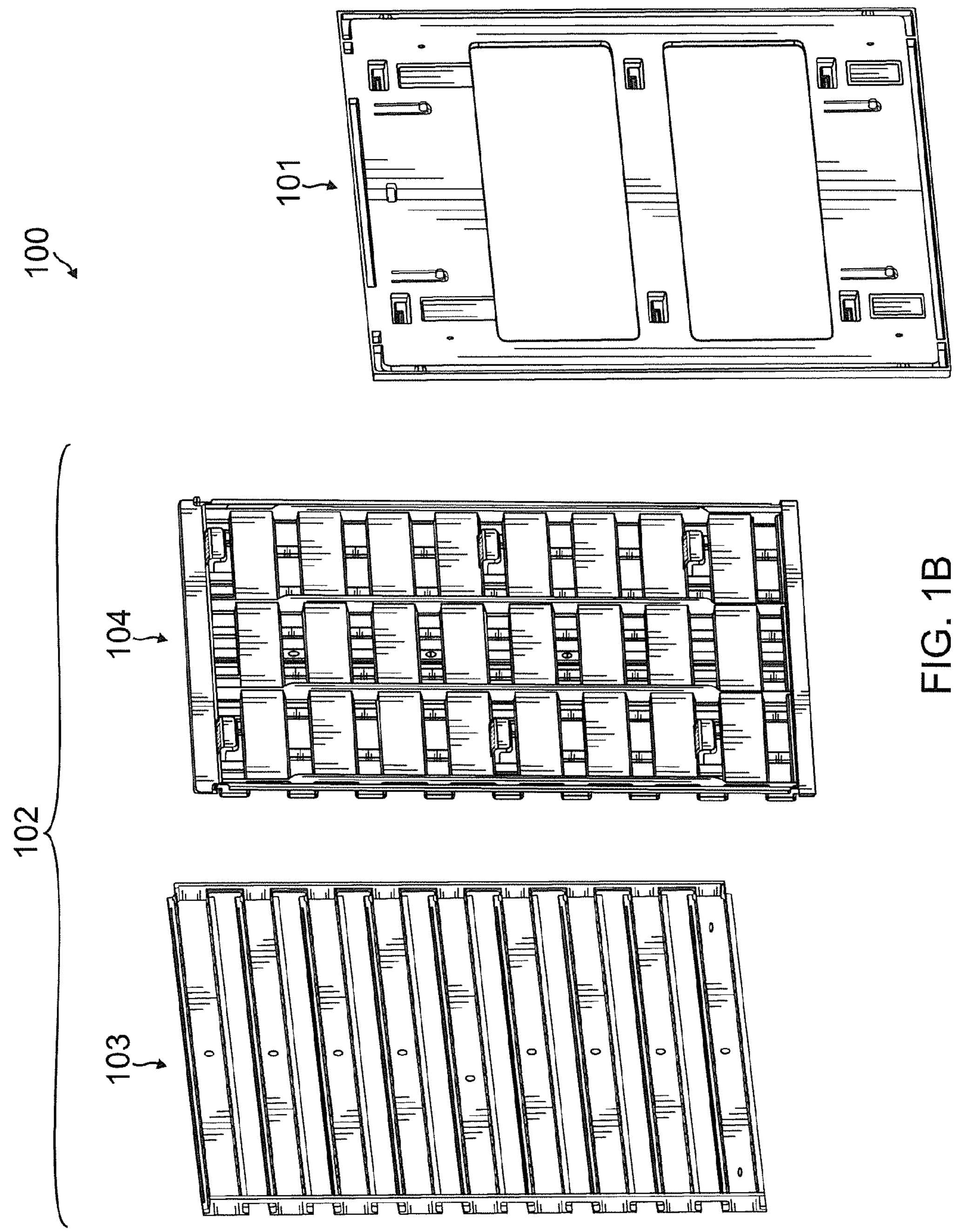

The present invention relates generally to workspace organization systems, and more particularly to wall-mounted systems for use in workspace organization. In an embodiment of the present invention illustrated in FIGS. 1A and 1B, the wall system 100 includes a mount 101 and a panel 102 detachably connectable to the mount 101. In the illustrated embodiment, the panel 102 includes a face panel 103 and a middle panel 104 disposed between the face panel 103 and the mount 101. The mount 101 is configured to be securely attached to an exposed wall surface or other similar surface. A variety of accessories are configured to be detachably mounted to the panel 102 in an organized and readily accessible manner. The wall system 100 of the present invention is also configured to secure and arrange a variety of organization-type accessories (e.g., containers, shelves, drawers, bins, etc.) capable of housing a variety of desktop items and office supplies (e.g., files, pens, staples, etc.) therein or thereon. Additionally, it will be appreciated that the wall system 100 of the present invention is provided with a modular construction such that panels 102 having various dimensions, configurations, and functionality can be attached to the mount to provide the user with flexibility and versatility to store and arrange a variety of different desktop items. In one embodiment, the dimensions of the panels 102 are substantially the same as the dimensions of the mount 101, although the present invention is not limited to wall systems 100 wherein the dimensions of the mounts 101 are substantially the same as the dimensions of the panels 102. The wall system 100 can also be used either alone or in combination with additional wall systems 100 to store, display, and organize various desktop items. In this manner, a plurality of wall systems 100 can be secured to the same exposed wall surface, some of which can have varying configurations, and arranged in any desired manner, thereby providing the versatility, customizability, and flexibility to secure a variety of different products. As used herein, the term "plurality" refers to two or more of the listed elements, items, or features.

Figure 2C:
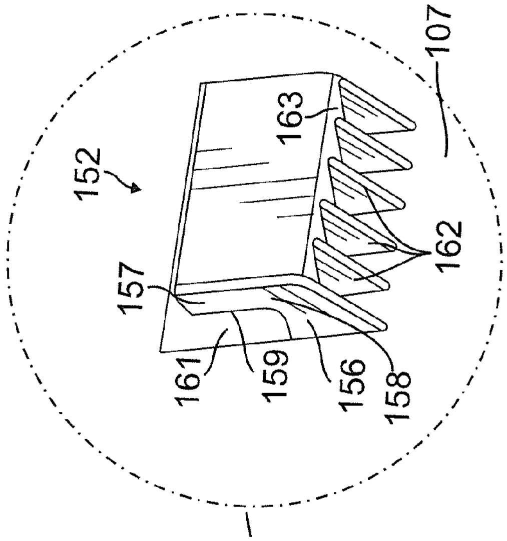
FIG. 2C is an enlarged view of a hook shown in FIG. 2A.
Figure 2A:
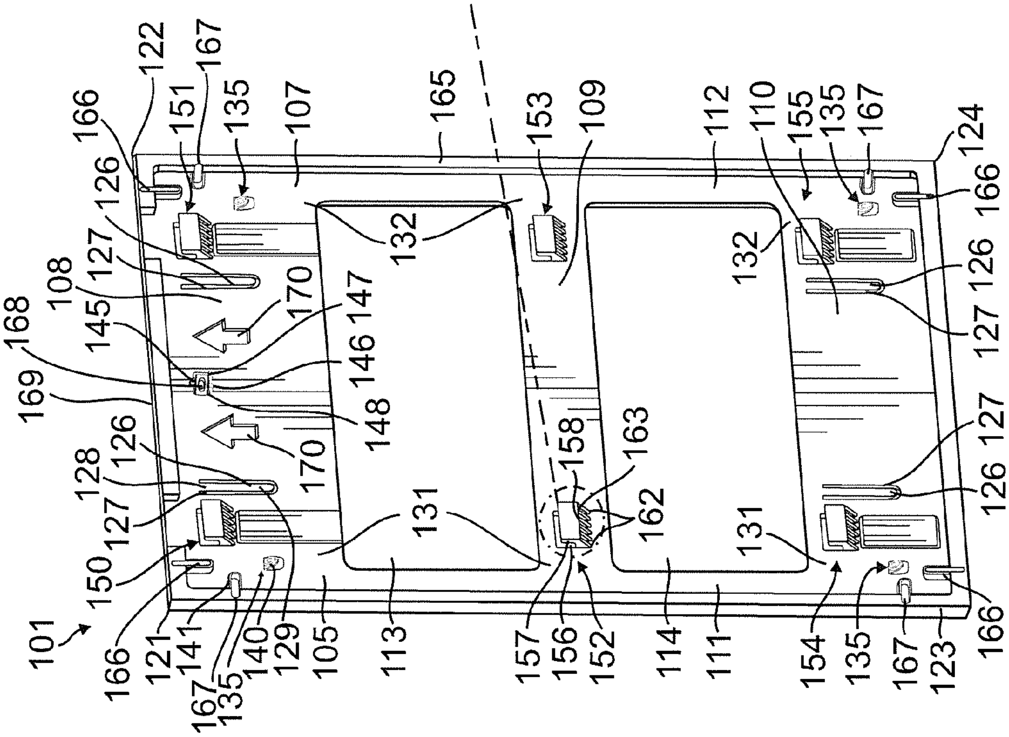
FIGS. 2A and 2B are front and rear perspective views, respectively, of the mount shown in FIGS. 1A and 1B.
Figure 2D:
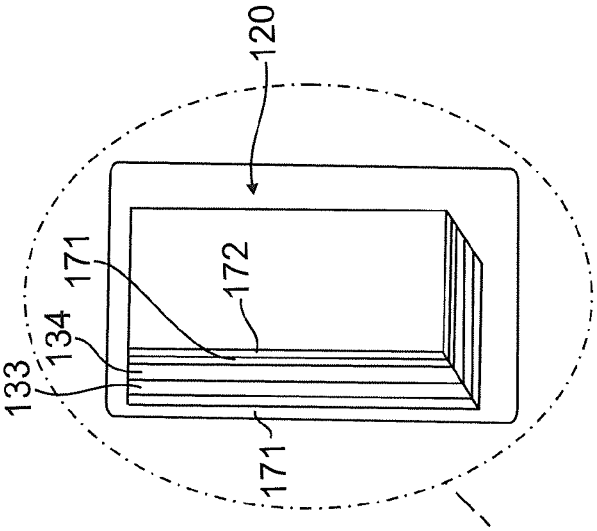
FIG. 2D is an enlarged view of a hook-and-loop type fastener shown in FIG. 2B.
Figure 2B:
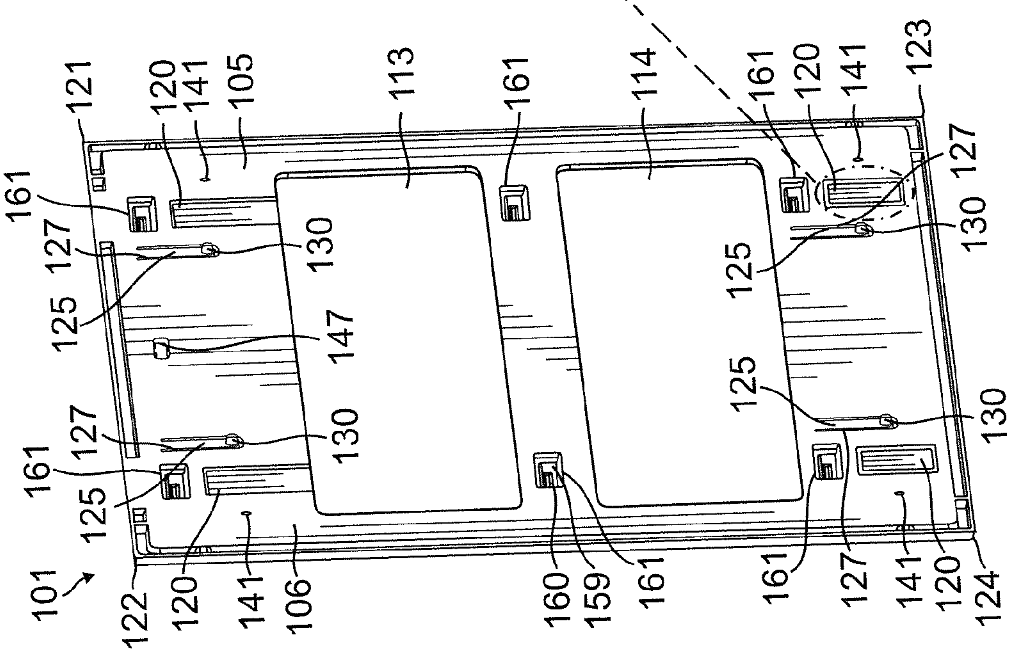

With reference now to the embodiment illustrated in FIGS. 2A and 2B, the mount 101 includes a generally rectangular frame 105 having a rear surface 106 configured to abut the exposed wall surface and a front surface 107 configured to abut a portion of the panel 102. The frame 105 includes three spaced apart horizontal legs 108, 109, 110 and two vertical legs 111, 112 interconnecting opposite ends 131, 132 of the horizontal legs 108, 109, 110. Together, the legs 108, 109, 110, 111, 112 of the frame 105 define upper and lower central openings 113, 114, respectively, in the frame 105. In the illustrated embodiment, each of the central openings 113, 114 is generally rectangular in cross-section. It will be appreciated that the openings 113, 114 lighten the mount 101 and enable the user to grasp the frame 105 when positioning the mount 101 along the wall, as described below.

With reference now to FIGS. 2B and 2D, the frame 105 can also include a plurality of hook-and-loop type fasteners 120 attached to the rear surface 106 of the frame 105. Each hook-and-loop type fastener 120 includes a hook portion 133 separably engageable with a loop portion 134. In the illustrated embodiment, the frame 105 includes four hook-and-loop type fasteners 120 disposed near the corners 121, 122, 123, 124 of the frame 105. It will be appreciated, however, that the frame 105 can include fewer or more hook-and-loop type fasteners 120 (e.g., from two and ten) depending upon the desired strength of the attachment between the mount 101 and the wall and the resulting load-bearing capacity of the wall system 100. One of the hook portion 133 and the loop portion 134 are configured to be adhered to the wall (173 in FIGS. 14C and 14D), and the corresponding one of the hook portion 133 and the loop portion 134 are configured to be adhered to the rear surface 106 of the frame 105. Each hook-and-loop type fastener 120 also includes an adhesive backing layer 171 covered by a protective layer 172 (e.g., a protective paper liner or film). One adhesive backing layer 171 is configured to secure one of the hook portion 133 and the loop portion 134 to the wall (173 in FIGS. 14C and 14D). Another adhesive backing layer 171 is configured to secure the other one of the hook portion 133 and the loop portion 134 to the mount 101. In the illustrated embodiment, the loop portion 134 is configured to adhere to the wall 173 and the hook portion 133 is adhered to the mount 101. The protective layers 172 on the hook-and-loop fasteners 120 are configured to be removed prior to securing the mount 101 to the wall 173 with the hook-and-loop fasteners 120.

Figure 14A:
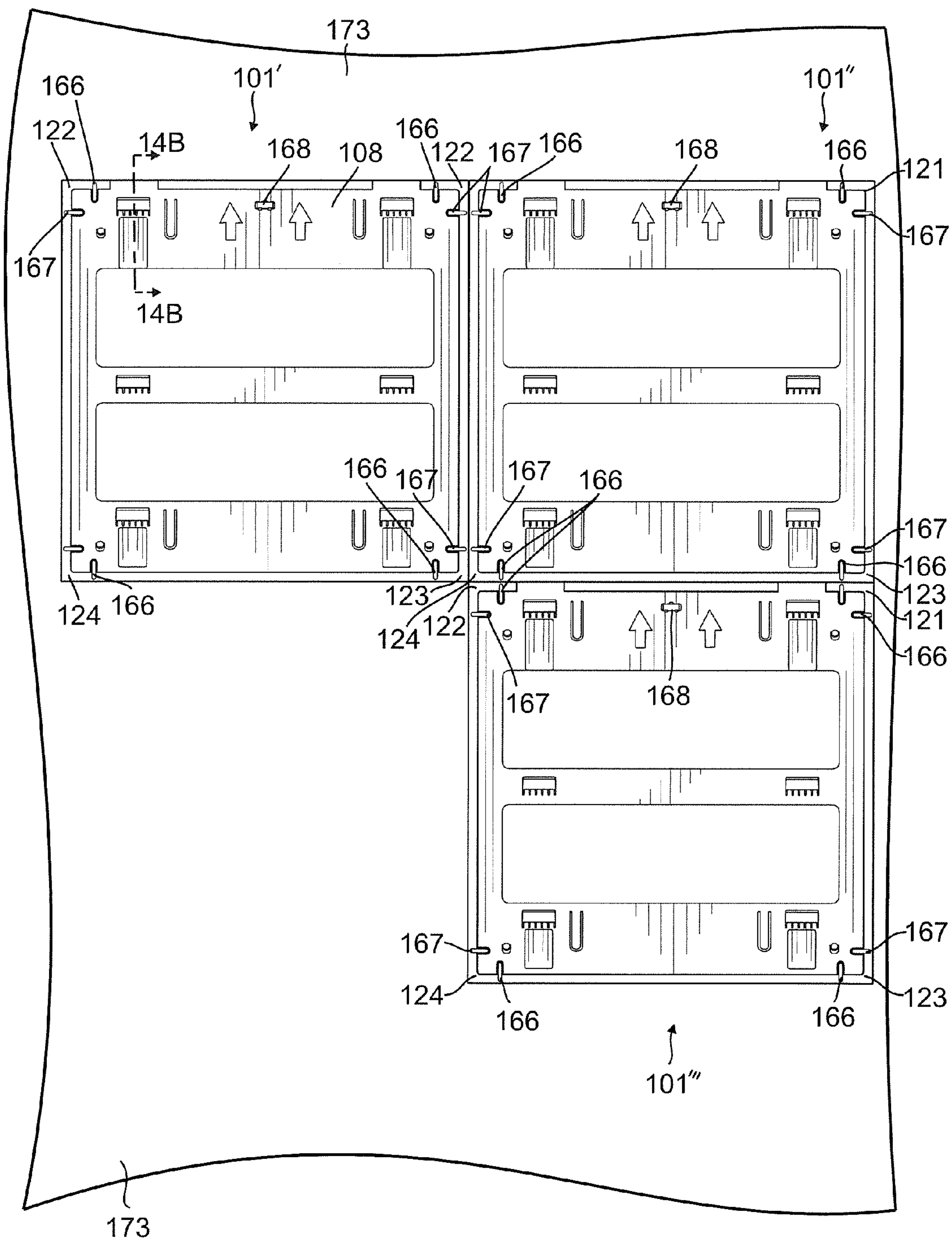
FIGS. 14A and 14B are a front view and a rear view, respectively, of a plurality of the mounts shown in FIGS. 2A and 2B mounted to a wall.
Figure 14B:
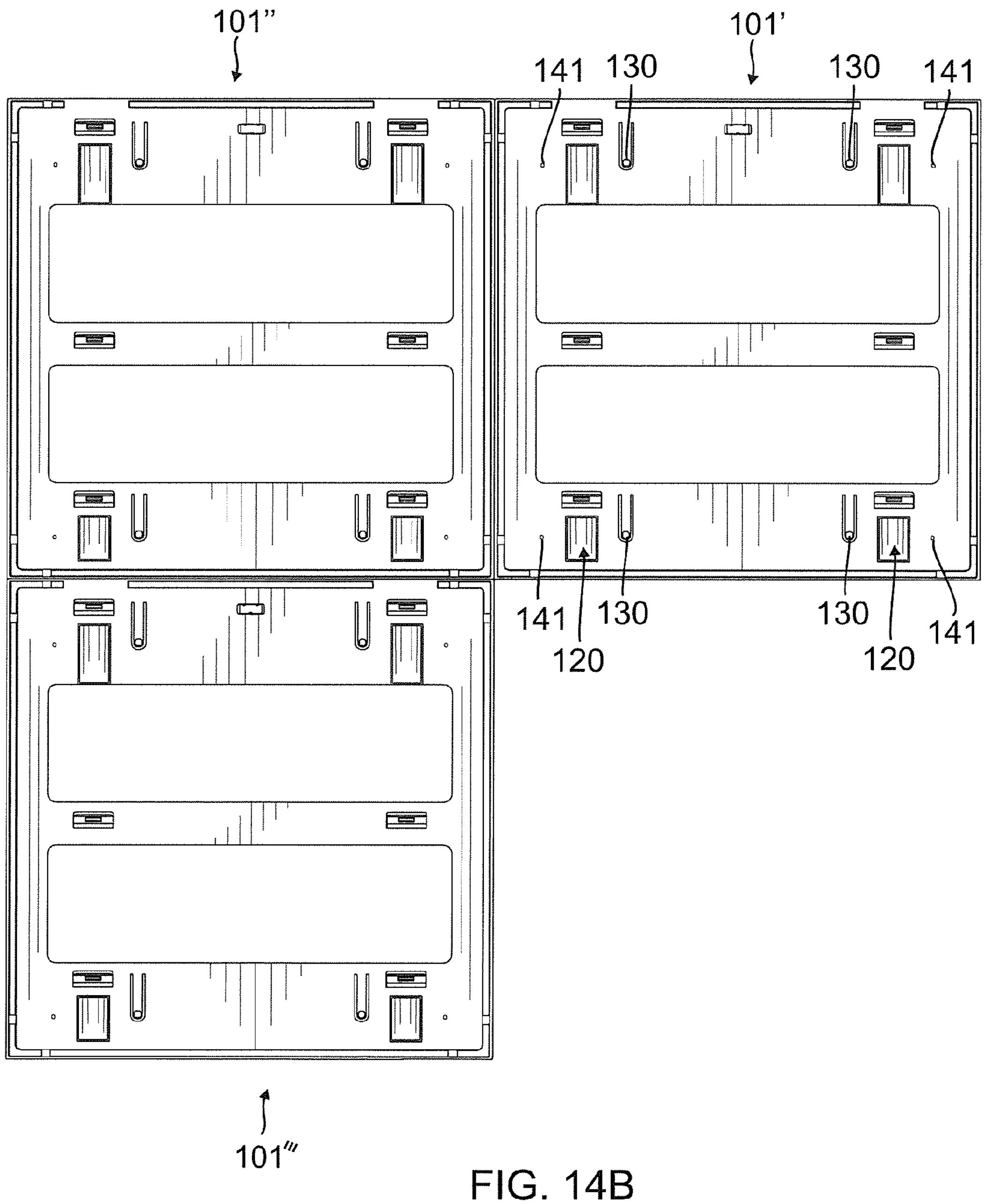
Figure 14C:
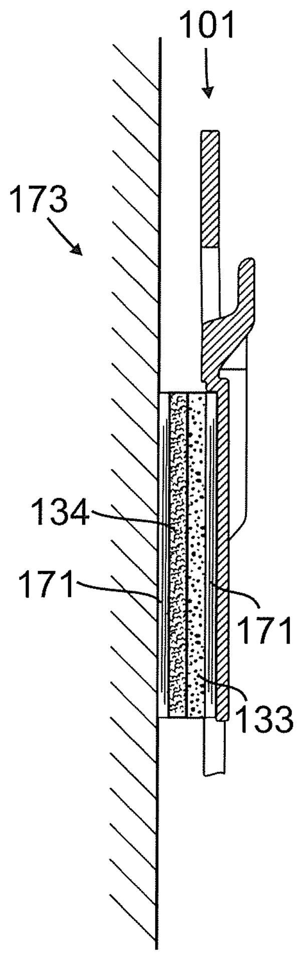
FIG. 14C is a cross-section through a portion of the mount and the wall shown in FIG. 14A taken along lines B-B, showing the mount attached to the wall by a hook-and-loop type fastener.
Figure 14D:
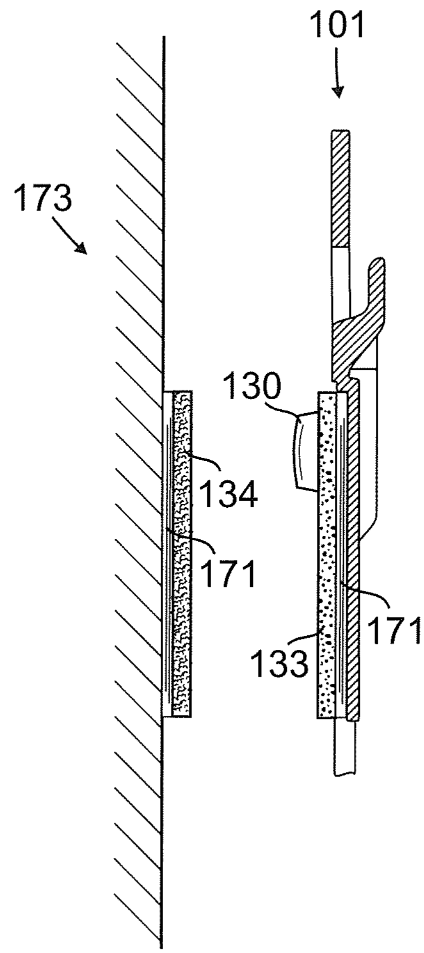
FIG. 14D is a cross-section through a portion of the mount and wall as shown in FIG. 14C, showing the mount detached from the wall.

It will be appreciated that the hook-and-loop type fasteners 120 are configured to enable the user to reposition the mount 101 along the wall by applying sufficient force to separate the hook portions 133 from the loop portions 134 (as shown in FIG. 14D) and then reengage the hook portions 133 with the corresponding loop portions 134 (as shown in FIG. 14C) after the mount 101 has been repositioned. That is, even after the hook-and-loop fasteners 120 are adhered to the wall (173 in FIGS. 14C and 14D), the mount 101 can be repositioned along the wall 173, provided sufficient overlap between the hook and loop portions 133, 134, respectively, of the fasteners 120 is maintained (i.e., the hook portions 133 can be offset from the corresponding loop portions 134 and still provide a sufficiently strong connection between the mount 101 and the wall 173). Additionally, the adhesive backings 171 on the hook-and-loop fasteners 120 are configured to be detached from the wall 173, thereby enabling the user to reposition the mount 101 along the wall 173 or to another wall surface entirely. In alternate embodiments, the mount 101 can include other types of fasteners, including pressure-sensitive adhesives such as silicone-based adhesives, double-sided tape, and adhesive putty (e.g., power tack manufactured by Ningbo Songhe Stationary Co., Ltd.). In one embodiment, the mount 101 includes fabricating tape in which a first adhesive side of the tape configured to engage the wall 173 includes removable adhesive and a second adhesive side of the tape secured the mount 101 includes permanent adhesive. In one embodiment, the mount 101 can include transfer tape to secure the mount 101 to the wall 173, such as transfer tape model number FT 8306 (Spec. #87184) manufactured by Avery Dennison Corporation. Transfer tape FT 8306 is a double-coated polyester tape having a 0.5 mm-thick polyethylene terephthalate (PET) layer, a 2.1 mm-thick layer of permanent rubber-based adhesive on one side of the PET layer, and a 0.8 mm-thick layer of removable acrylic adhesive on an opposite side of the PET layer. In one embodiment, the permanent rubber-based adhesive layer is configured to be permanently bonded to the mount 101 and the removable acrylic adhesive layer is configured to be removably adhered to the wall 173 such that the mount 101 can be adhered to the wall 173 and subsequently removed and repositioned along the wall 173. Additionally, any suitable type of hook-and-loop type fasteners 120, such as directional and non-directional hook-and-loop fasteners, is contemplated by the present disclosure.

With continued reference to FIGS. 2A and 2B, the mount 101 also includes a plurality of moveable bumpers 125 on the frame 105 configured to aid the user in positioning and securing the mount 101 to the wall with the hook-and-loop fasteners 120. In the illustrated embodiment, the frame 105 includes four bumpers 125 located near the four hook-and-loop fasteners 120, although the frame 105 can include any suitable number of bumpers 125 depending upon the number of hook-and-loops type fasteners 120 provided with the mount 101. Each bumper 125 includes an elongated, flexible finger 126 at least partially defined by a U-shaped slit 127 in the frame 105. Each finger 126 includes an upper end 128 flexibly attached to the frame 105 and a lower free end 129 opposite the upper end 128. The lower free ends 129 of the fingers 126 include a rearwardly projecting knob 130, as shown in FIG. 2B. The knobs 130 of the bumpers 125 are naturally biased rearward and extend beyond the adhesive surface of the hook-and-loop fasteners 120 to prevent premature and inadvertent adhesion of the hook-and-loop fasteners 120 to the wall 173. Additionally, the free ends 129 of the bumpers 125 are configured to pivot about the connected ends 128 in both the forward and rearward directions, the significance of which is explained below.

When the mount 101 is positioned against the wall 173 with slight pressure, only the knobs 130 on the free ends 129 of the bumpers 125 engage the wall 173. Consequently, the mount 101 can be brought close to the wall surface without engaging the hook-and-loop fasteners 120, thereby enabling the user to move the mount 101 into the desired position along the wall surface without inadvertently securing the hook-and-loop fasteners 120 to the wall surface. Contact between the knobs 130 and the wall 173 can also provide a tactile and auditory indication to the user that the mount 101 is positioned close to the wall surface. When sufficient pressure is applied to overcome the biasing force of the bumpers 125, the free ends 129 of the fingers 126 deflect forward and the adhesive backing layers 171 of the hook-and-loop fasteners 120 are drawn into direct contact with the wall 173. In this manner, the hook or loop portions 133, 134 of the fasteners 120 are attached to the wall 173 and releasably secured to the corresponding hook or loop portions 133, 134 attached to the rear surface 106 of the frame 105, thereby securing the mount 101 to the wall 173 (see FIG. 14C).

If subsequent removal of the mount 101 from the wall is required, the user can grasp the periphery of the frame 105 and apply sufficient force away from the wall until the hook portions 133 are drawn out of engagement with the corresponding loop portions 134 of the hook-and-loop type fasteners 120, as shown in FIG. 14D. When the mount 101 is detached from the wall 173, the bumpers 125 are configured to return to their naturally biased position extending rearward beyond the adhesive backing layer 171 of the hook-and-loop type fasteners 120, thereby enabling the user to reattach the mount 101 to the wall without prematurely or inadvertently attaching the hook-and-loop fasteners 120 to the wall 173 until the mount 101 is in the desired position and orientation.

Figure 5C:
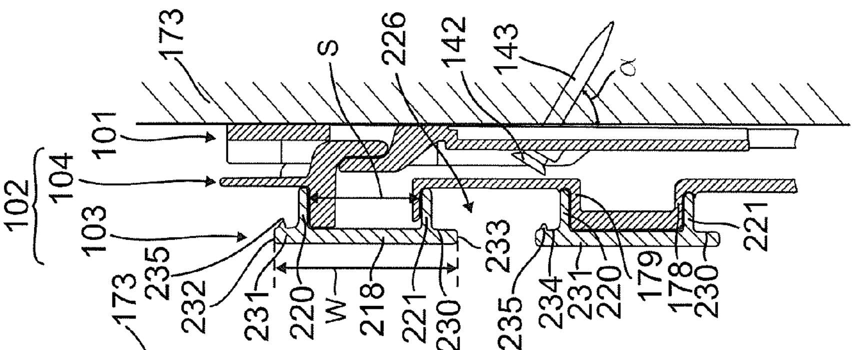
FIGS. 5B and 5C are a cross-sectional view and an enlarged, fragmentary, cross-sectional view, respectively, of the wall system shown in FIG. 5A taken along lines A-A.

With continued reference to FIGS. 2A and 2B, the mount 101 also includes a plurality of standoffs 135 on the frame 105 configured to receive fasteners 136 (e.g., nails, screw) securing the mount 101 to the wall 173 (shown in FIG. 5C). The fasteners 136 extending through the standoffs 135 are configured to supplement the hook-and-loop fasteners 120. Additionally, the hook-and-loop fasteners 120 are configured to hold the mount 101 in the desired position and orientation while the fasteners 136 are inserted through the standoffs 135. Otherwise, it could be awkward or cumbersome to maintain the mount 101 in the desired position or orientation while simultaneously installing the fasteners 136 through the standoffs 135 and into the wall 173. In the illustrated embodiment, the mount 101 includes four standoffs 135 disposed near the corners 121, 122, 123, 124 of the frame 105, although the frame 105 can include any other suitable number of standoffs 135 depending upon the desired load-bearing capacity of the wall system 100.

With continued reference to FIG. 2A each standoff 135 includes a canted surface 140 projecting forward from the front surface 107 of the frame 105. In the illustrated embodiment, the canted surface 140 of each standoff 135 forms a declination angle $\alpha$, such as 45°, relative to the front surface 107 of the frame 105. In alternate embodiments, the declination angle $\alpha$ can range from about 30° to about 60°. Each standoff 135 also includes an opening 141, such as a through hole, configured to receive the fastener 136 securing the mount 101 to the wall 173 (see FIG. 5C). In the illustrated embodiment, the opening 141 extends orthogonal to the canted surface 140 such that the opening 141 forms the same declination angle $\alpha$ relative to the wall surface (i.e., the openings 141 in the standoffs 135 are angled downward toward the wall at angle α). To install the fasteners 136, the hook-and-loop type fasteners 120 are first secured to the wall 173, as described above, and then the fasteners 136 are inserted through the openings 141 in the standoffs 135. When the fasteners 136 are installed, head portions 142 of the fasteners 136 abut the canted surfaces 140 of the standoffs 135, and shaft portions 143 of the fasteners 136 extend through the openings 141 and into the wall 173, as shown in FIG. 5C. It will be appreciated that orienting the fasteners 136 at a downward angle α relative to the wall surface provides increased load-bearing capacity of the wall system 100 relative to fasteners 136 extending perpendicular into the wall surface. Together, the hook-and-loop fasteners 120 and the fasteners (e.g., nails) 136 secure the mount 101 to the wall 173 and support the panel 102, any accessories (300, 365, 372, 515, 530, 580, 595, 640, 640' in FIG. 15) mounted on the panel 102, and any desktop items (e.g., stapler 900) housed within or on such accessories 300, 365, 372, 515, 530, 580, 595, 640, 640', as described in further detail below.

With continued reference to FIG. 2A, the mount 101 also includes a plurality of arcuate spring fingers 145, 146, 147 extending forward from the front surface 107 of the frame 105. In the illustrated embodiment, the mount 101 includes an upper finger 145 and two lower fingers 146, 147 opposite the upper finger 145. The spring fingers 145, 146, 147 are located on the upper horizontal leg 108 of the frame 105 and centrally disposed between the two bumpers 125 on the upper horizontal leg 108 of the frame 105. The spring fingers 145, 146, 147 are configured to receive and support a cylindrical vial-type level (e.g., a tubular spirit or bubble level) 168 on the mount 101. In the illustrated embodiment, the mount 101 also includes a rectangular opening 148 in the frame 105 separating the upper and lower fingers 145, 146, 147. The rectangular opening 148 is configured to receive a portion of the level 168 such that the level 168 is recessed in the mount 101 and does not contact the panel 102 when it is attached to the mount 101. Accordingly, the user can slightly press the mount 101 against the wall to contact the knobs 130 on the free ends 129 of the bumpers 125 against the wall 173, as described above, and then apply sufficient force to secure the hook-and-loop fasteners 120 to the wall 173 when the level 168 indicates that a top edge 169 of the mount 101 is substantially horizontal.

With continued reference to the embodiment illustrated in FIG. 2A, the mount 101 also includes a plurality of upturned hooks 150, 151, 152, 153, 154, 155 projecting forward from the front surface 107 of the frame 105. The upturned hooks 150, 151, 152, 153, 154, 155 are configured to receive corresponding hook receptacles 195, 196, 197, 198, 199, 200 on the middle panel 104 (see FIG. 3B) to detachably secure the panel 102 to the mount 101. In the illustrated embodiment, the mount 101 includes six hooks 150, 151, 152, 153, 154, 155, including two hooks 150, 151 on the upper leg 108 near corners 121, 122 of the frame 105, two hooks 154, 155 on the lower leg 110 near the corners 123, 124 of the frame 105, and two hooks 152, 153 on the middle leg 109 laterally aligned with the hooks 150, 151, 154, 155 on the upper and lower legs 108, 110, respectively, of the frame 105. Each of the hooks 150, 151, 152, 153, 154, 155 includes a flange 156 extending generally perpendicular from the frame 105 and a lip 157 extending upward from a forward end 158 of the flange 156. Together, the flange 156 and lip 157 portions define a generally L-shaped hook. As illustrated in FIG. 2B, a rear surface 159 of each lip 157 (i.e., the portion of the lip 157 facing the front surface 107 of the frame 105) also includes a depression 160 configured to engage a corresponding tab 210 (see FIG. 3A) on each of the hook receptacles 195, 196, 197, 198, 199, 200 on the panel 102. The mount 101 also includes voids 161 in the frame 105 aligned with the lip portions 157 of the hooks 150, 151, 152, 153, 154, 155. Additionally, each of the L-shaped hooks 150, 151, 152, 153, 154, 155 includes a plurality of gussets 162 configured to increase the load-bearing capacity of the hooks 150, 151, 152, 153, 154, 155. The gussets 162 are generally triangular and extend between a lower surface 163 of the flange 156 and the front surface 107 of the frame 105. In the illustrated embodiment, each hook 150, 151, 152, 153, 154, 155 includes six equally spaced gussets 162, although the hooks 150, 151, 152, 153, 154, 155 can include more or fewer gussets 162 depending upon the desired load-bearing capacity of the mount 101.

With continued reference to FIG. 2A, the mount 101 also includes a forwardly projecting ridge 165 extending around a majority of the periphery of the frame 105. Each corner 121, 122, 123, 124 of the mount 101 also includes a vertical tab 166 and a horizontal tab 167 extending inward from the ridge 165 extending around the periphery of the frame 105. Together, the ridge 165 and the tabs 166, 167 are configured to ensure proper alignment between multiple mounts 101 secured to the wall 173, as described in more detail below with reference to FIG. 14A. The vertical tabs 166 are configured to ensure proper lateral alignment between two or more mounts 101 installed directly above one another, and the horizontal tabs 167 are configured to ensure proper vertical alignment between two or more mounts 101 installed directly next to one another.

With continued reference to FIG. 2A, the mount 101 can also include markings on the frame 105, such as embossed or printed words or symbols, indicating the proper orientation of the mount 101. In the illustrated embodiment, the frame 105 includes two arrow-shaped depressions or debosses 170 indicating the upper end of the mount 101 (i.e., the end of the mount 101 which should define the upper, horizontal leg 108 of the frame 105 when the mount 101 is secured to the wall 173) such that the U-shaped hooks 150, 151, 152, 153, 154, 155 are properly oriented to engage and secure the corresponding elements on the panel 102. Together, the arrow-shaped depressions 170 and the level 168 are configured to aid the user in securing the mount 101 to the wall in the proper orientation.

As briefly mentioned above with reference to FIGS. 1A and 1B, the panel 102, which includes the face panel 103 and the middle panel 104 secured to the face panel 103, is configured to be detachably secured to the mount 101. More specifically, the panel 102 is configured to be detachably secured to the L-shaped hooks 150, 151, 152, 153, 154, 155 on the mount 101. Additionally, the panel 102 is generally coextensive with the mount 101 such that the panel 102 completely conceals the mount 101 when the panel 102 is attached to the mount 101.

Figure 3B:
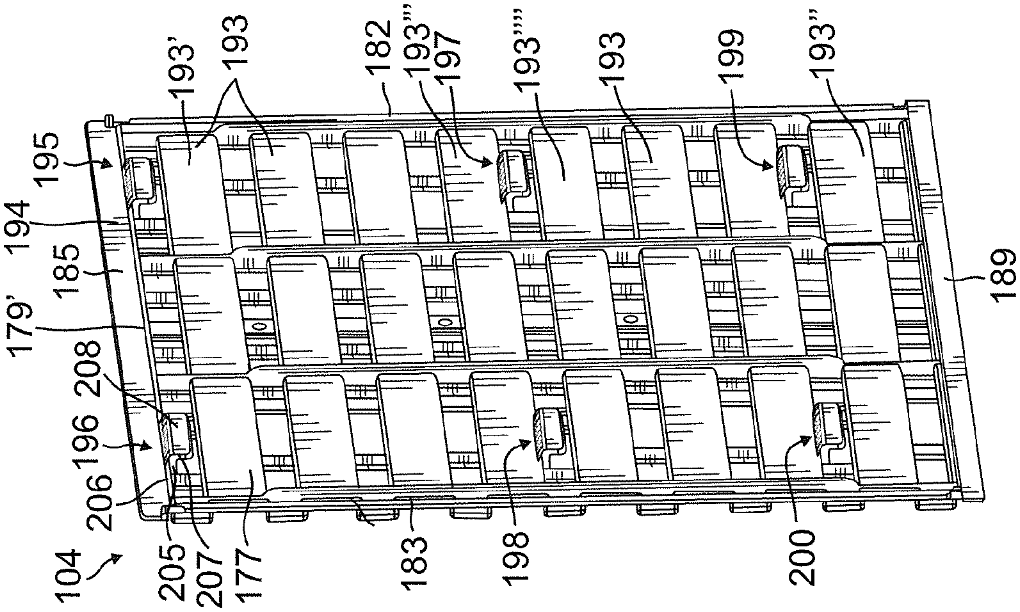
FIGS. 3A and 3B are front and rear perspective views, respectively, of the middle panel shown in FIGS. 1A and 1B.
Figure 3A:
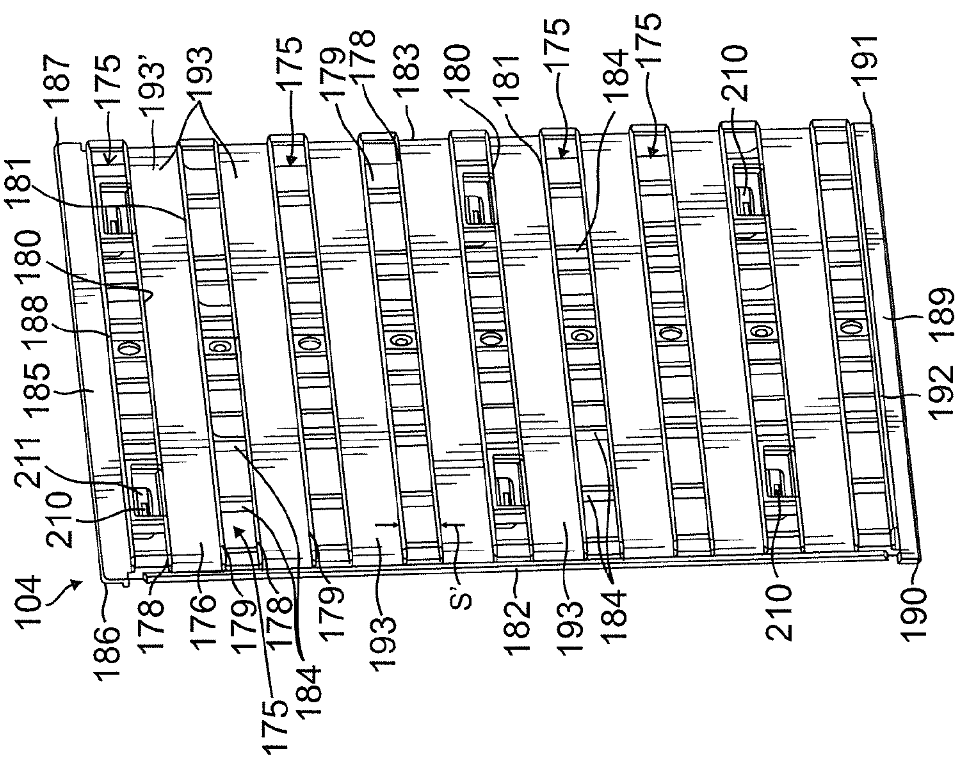

With reference now to the embodiment illustrated in FIGS. 3A and 3B, the middle panel 104 includes a plurality of spaced apart horizontal slats 175. Each slat 175 includes opposing lower and upper slat rails 178, 179, respectively, which are interconnected by a plurality of vertical support members 184 extending between adjacent slat rails 178, 179. In the illustrated embodiment, the middle panel 104 includes nine spaced apart horizontal slats 175, although the middle panel 104 can include any other suitable number of slats 175, depending upon the configuration of the face panel 103 and the various accessories the face panel 103 is configured to support, as will become apparent below. The middle panel 104 also includes a plurality of plates 193 disposed between the slats 175 and extending between adjacent lower and upper slat rails 178, 179, respectively. The plates 193 include opposing flat front and rear surfaces 176, 177, respectively. The opposing lower and upper slat rails 178, 179, respectively, of each slat 175 extend along upper and lower edges 180, 181, respectively, of the plates 193 (i.e., the lower and upper slat rails 178, 179, respectively, extend lengthwise along the upper and lower edges 180, 181 of the plates 193). The slats 175 also extend between a pair of opposing side surfaces 182, 183. Additionally, the slat rails 178, 179 extend forward beyond the plates 193 such that a portion of the slat rails 178, 179 overhangs the front surface 176 of the plates 193. The slats 175 are configured to support the face panel 103, as described below.

Still referring to FIGS. 3A and 3B, an upwardly protruding L-shaped flange 185 with rounded or chamfered corners 186, 187 is formed along an upper edge 188 of the middle panel 104, and a downwardly protruding inverted L-shaped flange 189 with rounded or chamfered corners 190, 191 is formed along a lower edge 192 of the middle panel 104. When two or more wall systems 100 are aligned directly above one another on a wall surface (see FIGS. 14F-14H), the upper and lower flanges 185, 189 cooperate to form a structure having substantially the same shape and size as the plates 193 and slat rails 178, 179 described above. Accordingly, when multiple wall systems 100 are secured to the wall 173 and vertically abut one another, the upper and lower flanges 185, 189 are configured to ensure continuity between adjacent wall systems 100. Specifically, the flanges 185, 189 cooperate to ensure that the spacing between the lowermost slat 215" on wall system 100" and the uppermost slat 215'" on wall system 100'" is substantially the same as the spacing between any two adjacent slats 215 on either of the wall systems 100", 100'", as will be described further below with reference to FIG. 14F.

With continued reference to FIG. 3B, the middle panel 104 also includes a plurality of hook receptacles 195, 196, 197, 198, 199, 200 configured to engage the L-shaped hooks 150, 151, 152, 153, 154, 155 on the mount 101. In the illustrated embodiment, the middle panel 104 includes six hook receptacles 195, 196, 197, 198, 199, 200 corresponding to the six L-shaped hooks 150, 151, 152, 153, 154, 155 on the mount 101. The six hook receptacles 195, 196, 197, 198, 199, 200 on the middle panel 104 include two upper hook receptacles 195, 196 disposed between the uppermost plate 193' and the upper flange 185, two lower hook receptacles 199, 200 disposed between the lowermost plate 193" and the lower flange 189, and two middle hook receptacles 197, 198 disposed between adjacent plates 193'", 193"" and laterally aligned with the upper and lower hook receptacles 195, 196, and 199, 200, respectively. The hook receptacles 197, 198, 199, 200 on the middle panel 104 each include a generally horizontal flange 205 projecting rearward from the rear surface 177 of the plates 193. The hook receptacles 195, 196 both include a generally horizontal flange 205 projecting rearward from a rear surface 194 of the uppermost upper slat rail 179' on the middle panel 104. Each of the horizontal flanges 205 includes a fixed end 206 attached to the middle panel 104 and a free end 207 opposite the fixed end 206. Each of the hook receptacles 195, 196, 197, 198, 199, 200 also includes a lip 208 extending downward from the free end 207 of the horizontal flange 205. Together, the flange and lip portions 205, 208, respectively, define a generally inverted L-shaped hook receptacle. Additionally, each of the hook receptacles 195, 196, 197, 198, 199, 200 includes a forwardly protruding tab 210 on a front surface 211 of the lips 208, as shown in FIG. 3A. The tabs 210 are configured to engage the depressions 160 (see FIG. 2B) on the hooks 150, 151, 152, 153, 154, 155 when the panel 102 is attached to the mount 101, as described below.

Figure 4B:
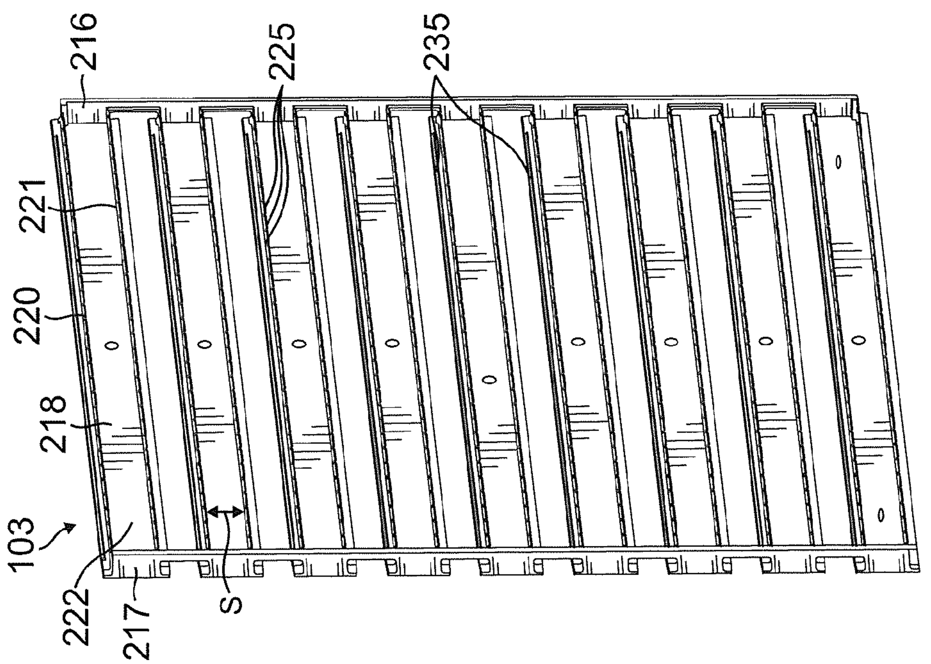
FIGS. 4A and 4B are front and rear perspective views, respectively, of the face panel shown in FIGS. 1A and 1B.
Figure 4A:
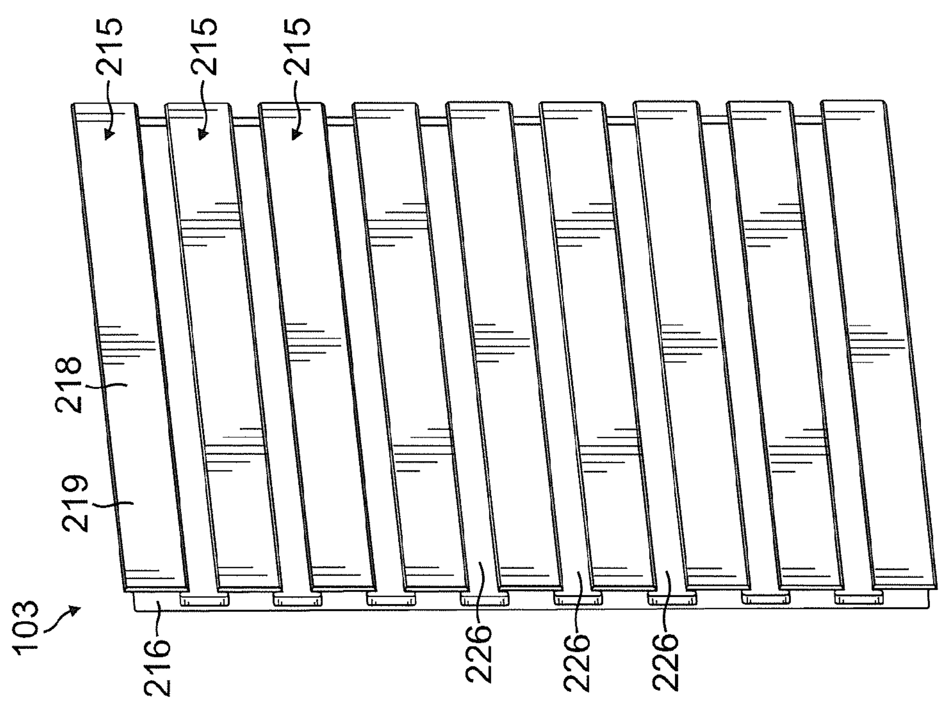
Figure 5B:
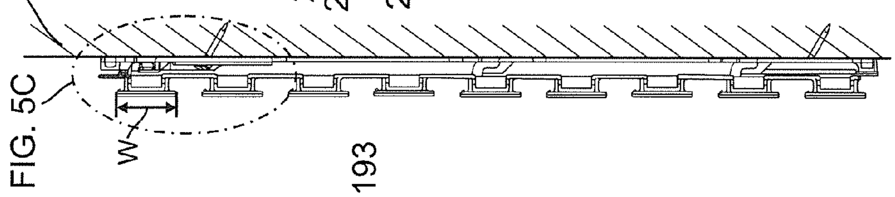

As briefly described above, the panel 102 includes the face panel 103 coupled to the middle panel 104. More specifically, the face panel 103 is configured to engage the slat rails 178, 179 on the middle panel 104 to form the panel 102. With reference now to the embodiment illustrated in FIGS. 4A and 4B, the face panel 103 includes a plurality of spaced apart horizontal slats 215 extending between a pair of opposing side surfaces 216, 217. The spaced apart horizontal slats 215 are interconnected by the opposing side surfaces 216, 217. In the illustrated embodiment, the number of slats 215 on the face panel 103 corresponds to the number of slats 175 on the middle panel 104. Each slat 215 includes a vertical face panel 218 having a generally flat front surface 219 and a pair of rearwardly projecting spaced apart legs 220, 221 extending orthogonally from a rear surface 222 of the face panel 218, as illustrated in FIG. 4B. The spacing S between the vertical legs 220, 221 on each vertical face panel 218 is substantially equal to the spacing S' (see FIG. 3A) between adjacent slat rails 178, 179 of the slats 175 on the middle panel 104 such that the legs 220, 221 are configured to engage the slat rails 178, 179 on the middle panel 104 with a press fit connection, as illustrated in FIGS. 5B and 5C. That is, the legs 220, 221 on the face panel 103 are spaced apart such that the legs fit 220, 221 over the slat rails 178, 179 on the middle panel 104 and the legs 220, 221 can be subsequently connected to slat rails 178, 179, such as by ultrasonic welding, friction stir welding, radio frequency (RF) welding, adhesive, or mechanical fasteners (e.g., snap-fit mechanisms). The legs 220, 221 also include a plurality of vertical notches 225 disposed along the length of the legs 220, 221. Together, adjacent slats 215 on the face panel 103 define lateral channels 226 therebetween having a generally U-shaped transverse cross-section, as illustrated in FIG. 5C. The lateral channels 226 on the face panel 103 are configured to secure a variety of accessories (e.g., bins, clips, shelves, etc.), as described in detail below. Additionally, the plates 193 on the middle panel 104 are configured to align with the channels 226 on the face panel 103 such that the wall 173 on which the wall system 100 is mounted is not exposed through the channels 226 when the face panel 103 and the middle panel 104 are connected to the mount 101, as shown in FIG. 5A.

Figure 5A:
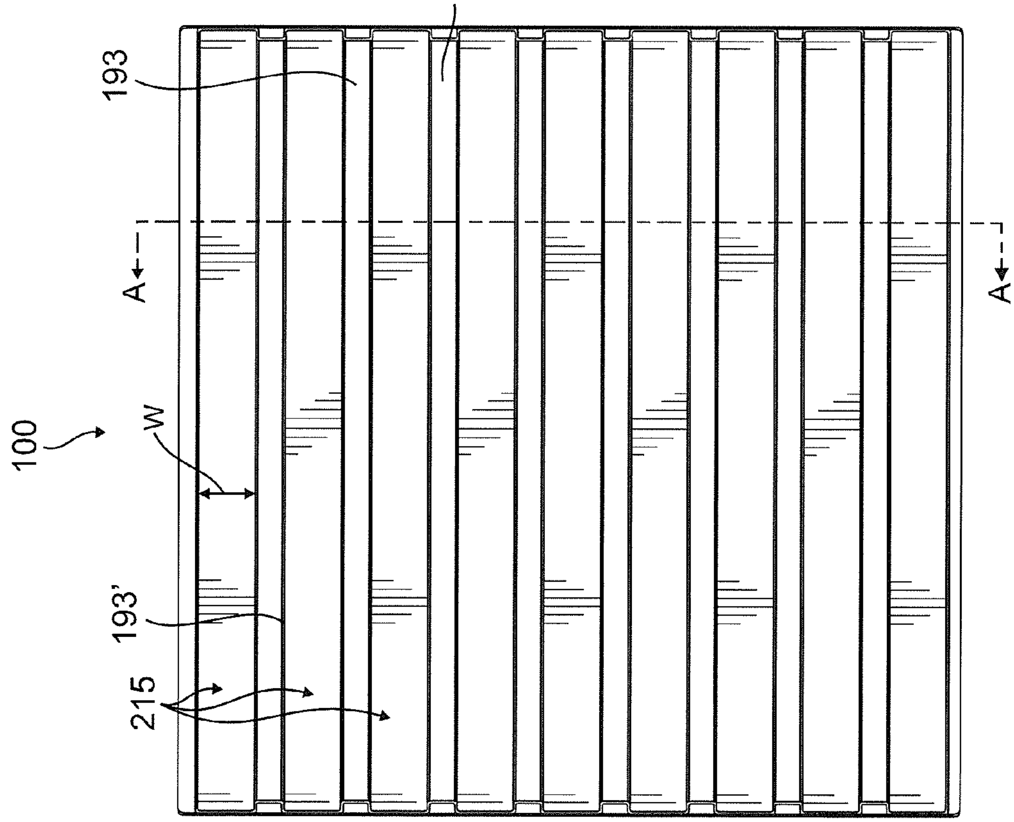
FIG. 5A is a front elevational view of the wall system shown in FIGS. 1A and 1B.

With reference now to FIGS. 5A-5C, the width W of each vertical face panel 218 is greater than the spacing S between the opposing legs 220, 221 on each slat 215 such that each vertical face panel 218 overhangs the corresponding legs 220, 221, thereby defining a bottom lip 230 and a top lip 231 on each slat 215 which extend into the channels 226 between the slats 215. That is, the upper leg 220 on each slat 215 is spaced below an upper edge 232 of the corresponding vertical face panel 218 to define the top lips 231, and the corresponding lower leg 221 is spaced above a lower edge 233 of the vertical face panel 218 to define the bottom lips 230 (shown most clearly in FIG. 5C). Additionally, a rear surface 234 of each top lip 231 includes a plurality of rearwardly projecting ridges or lobes 235 (see also FIG. 4B) extending into the U-shaped channels 226 between adjacent slats 215. The plurality of lobes 235 are configured to engage various accessories mounted on the panel 102, as described below. In one embodiment, the lobes 235 are disposed in a fixed-length interval along the top lips 231. In another embodiment, the lobes 235 are a continuous ridge extending along the top lips 231. The lobes 235 are configured to provide a tactile indication of the lateral position of the various accessories attached to the panel 102. Accordingly, the lobes 235 enable the user to laterally align various accessories mounted on different slats 215 and to incrementally slide the accessories along the channels 226, thereby reducing the risk of inadvertently sliding the accessory off the end of the panel 102. The lobes 235 are also configured to prevent the various accessories from inadvertently disengaging the channels 226.

In one embodiment, the middle panel 104 and the face panel 103 are &lined as separate pieces and joined together to form a unitary panel 102 in a subsequent manufacturing operation, such as by ultrasonic welding, friction stir welding, radio frequency (RF) welding, applying adhesive, and/or mechanically fastening (e.g., fastening with snap-fit mechanisms). In one embodiment, the legs 220, 221 extending rearwardly from the vertical face panels 218 on the face panel 103 are welded to the slat rails 178, 179 on the middle panel 104, thereby joining the face panel 103 and the middle panel 104 to form the panel 102. In an alternate embodiment, the middle panel 104 and the face panel 103 can be formed as a single unitary structure, such as by rapid prototyping using additive manufacturing (e.g., laser sintering or stereolithography) or injection molding.

Figure 16:
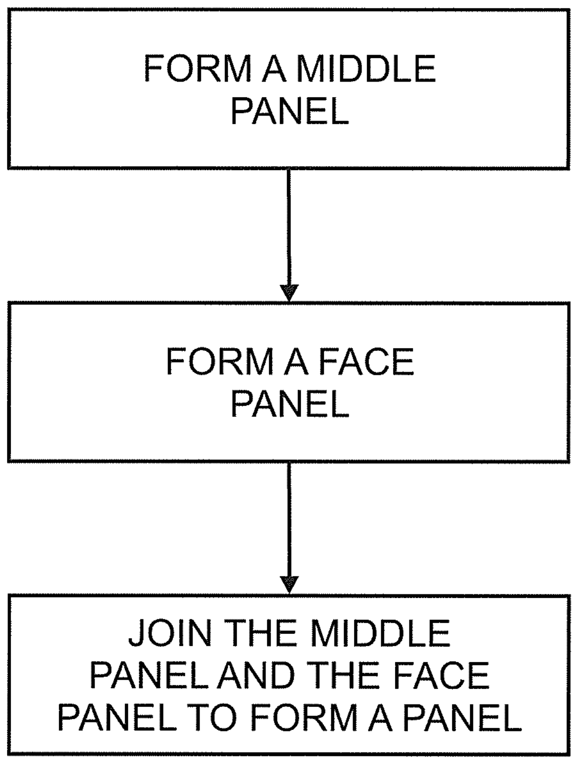
FIG. 16 is a flowchart showing the steps of manufacturing the middle panel and the face panel and joining the middle panel to the face panel to form the panel.

With reference to FIG. 16, a method 800 of manufacturing the panel 102 is shown. In one embodiment, the method 800 includes a task 810 of forming the middle panel 104, such as by liquid injection molding, rapid prototyping, machining, or any other suitable process. In one embodiment, the method 800 includes a task 820 of forming the face panel 103, such as by liquid injection molding, rapid prototyping, machining, or any other suitable process. In one embodiment, the middle panel 104 and the face panel 103 are formed by the same manufacturing process, although in alternate embodiments the face panel 103 and the middle panel 104 may be formed by different manufacturing processes. In one embodiment, the method 800 includes the task 830 of joining the face panel 103 to the middle panel 104 to form the panel 102, such as by ultrasonic welding, friction stir welding, radio frequency (RF) welding, applying adhesive, and/or mechanically fastening (e.g., fastening with snap-fit mechanisms) the face panel 103 to the middle panel 104. While in one embodiment, the method 800 of manufacturing the panel 102 may include each of the tasks described above and shown in FIG. 16, in other embodiments of the present invention, one or more of the tasks described above and shown in FIG. 16 may be absent and/or additional tasks may be performed. For instance, in one embodiment, the middle panel 104 and the face panel 103 may be formed initially as a single unitary structure, such as by rapid prototyping using additive manufacturing, and therefore the task 830 of joining the middle panel 104 and the face panel 103 may be absent from one embodiment of the method 800 of manufacturing the panel 102. Furthermore, in the method 800 of manufacturing the panel 102 according to one embodiment, the tasks may be performed in the order depicted in FIG. 16. However, the present invention is not limited thereto and, in a method 800 of manufacturing the panel 102 according to other embodiments of the present invention, the tasks described above and shown in FIG. 16 may be performed in any other suitable sequence. For instance, the task 820 of forming the face panel 103 may be performed before the task 810 of forming the middle panel 104, or the face panel 103 and the middle panel 104 may be formed simultaneously.

Although the face panel 103 has been described with reference to a slat wall design, numerous alternate designs can be incorporated into the face panel 103 without departing from the scope and spirit of the present invention. For instance, in alternate embodiments, the face panel 103 can be a dry erase board, push pin board, magnetic surface, mirror, or other similar surface (see 700, 701 in FIG. 15) in order to provide the wall system 100 with a variety of different uses and functions. Moreover, it will be appreciated that the two-piece construction of the panel 102 (i.e., the middle panel 104 attached to the face panel 103) enables the usage of a common or universal middle panel 104 configured to connect to a variety of different face panels 103, as described above. The panel 102, which includes the face panel 103 connected to the middle 104, can be made of any suitably strong material, such as acrylonitrile butadiene styrene (ABS), polypropylene (PP) polycarbonate, high-density polyethylene (HDPE), polyvinyl chloride (PVC), or polystyrene (PS).

Figure 6A:
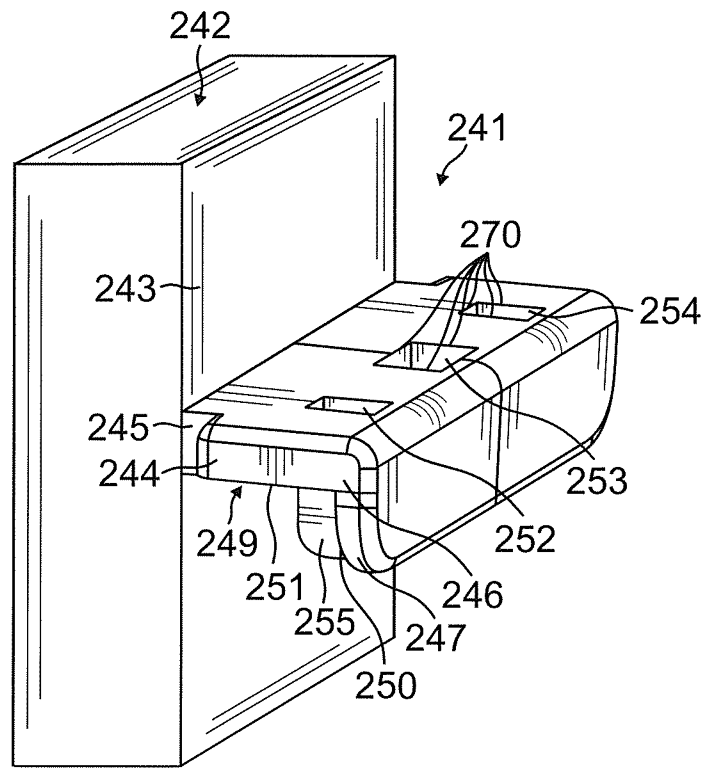
FIG. 6A is rear perspective view of an embodiment of an interlock receptacle coupled to a generic accessory.
Figure 6B:
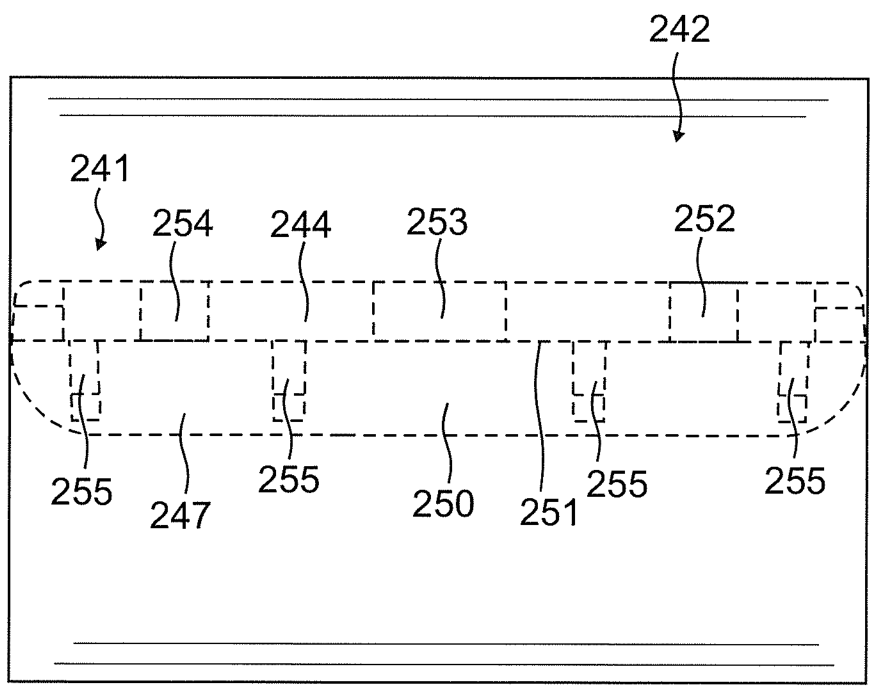
FIGS. 6B, 6C, 6D, 6E, 6F and 6G are a front view, rear view, right side view, left side view, bottom view, and top view, respectively, of the interlock receptacle and the generic accessory shown in FIG. 6A.
Figure 6C:
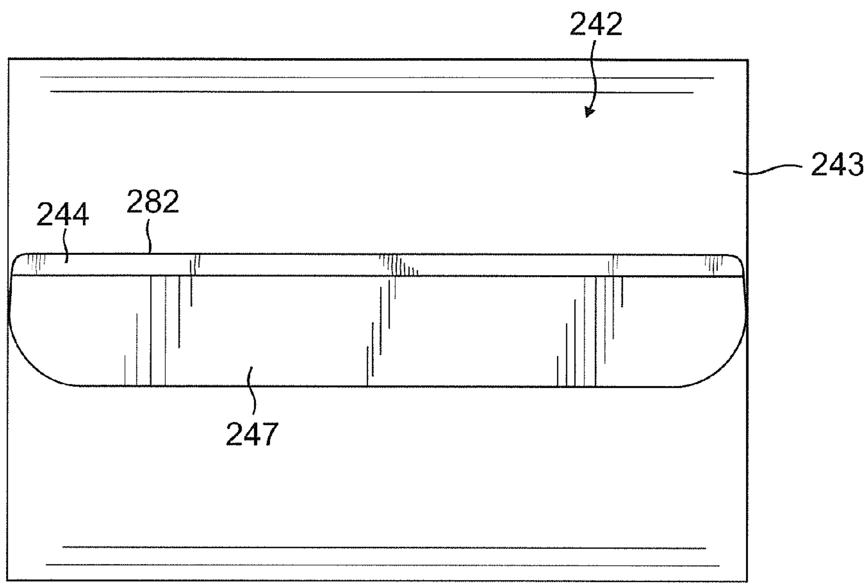
Figure 6D:
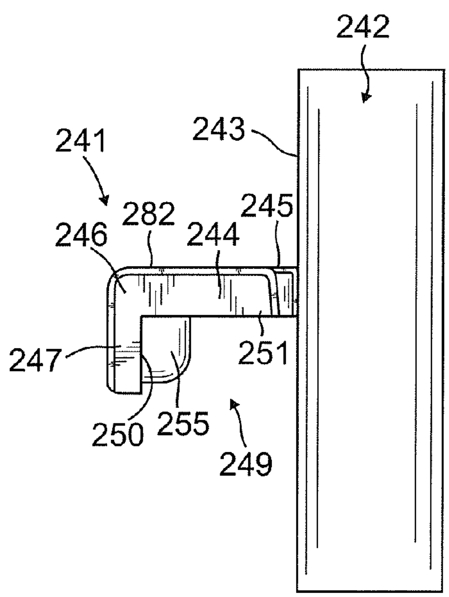
Figure 6E:
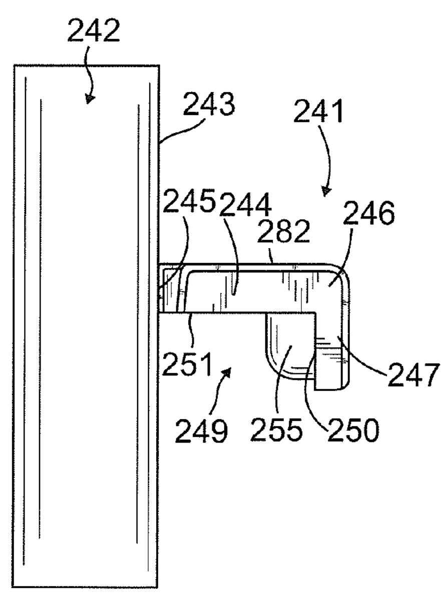
Figure 6F:
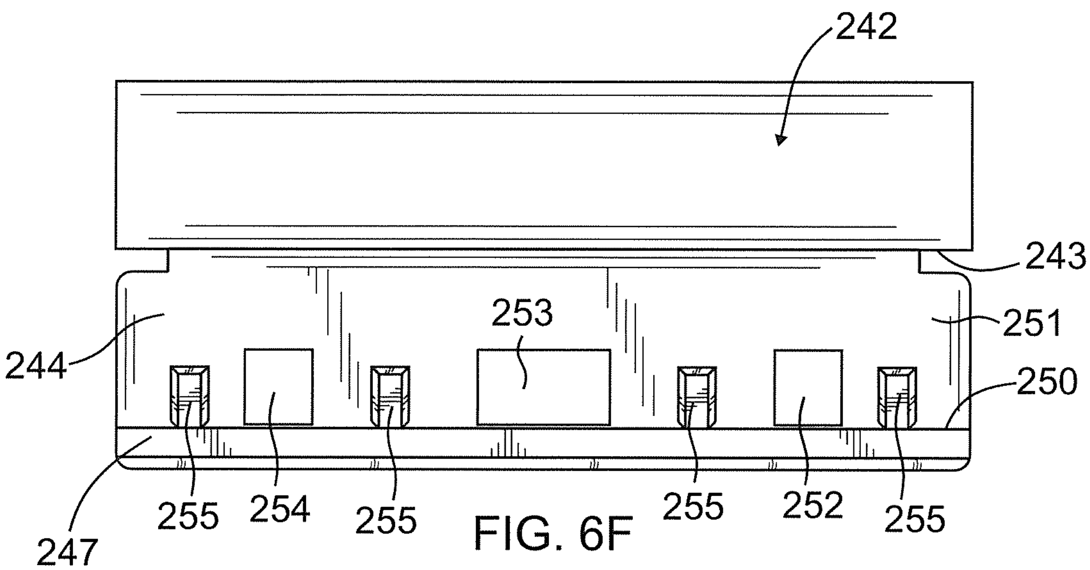
Figure 6G:
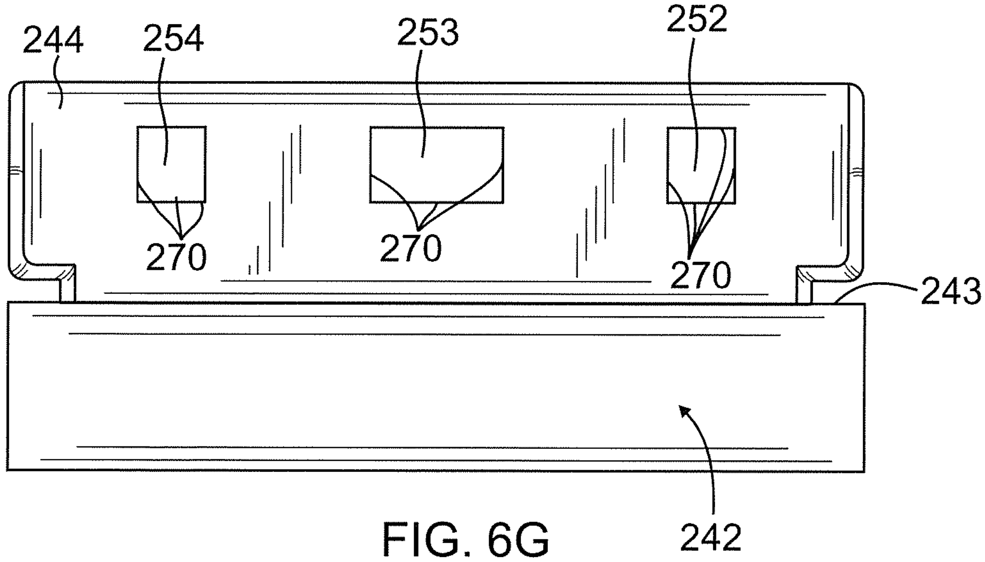
Figure 6H:
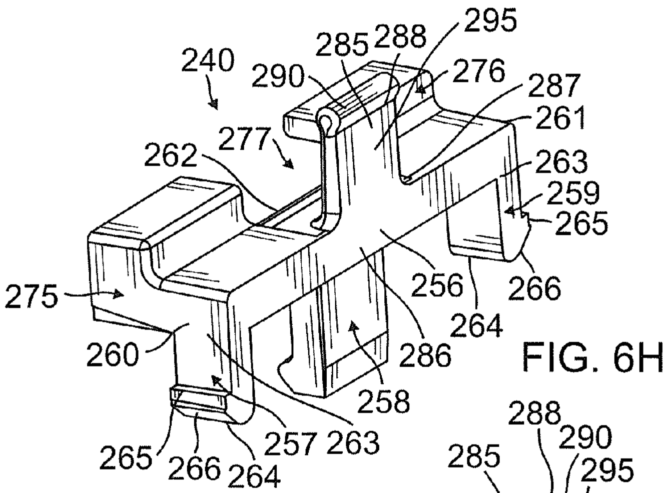
FIG. 6H is a rear perspective view of an embodiment of an interlock connector.
Figure 6J:
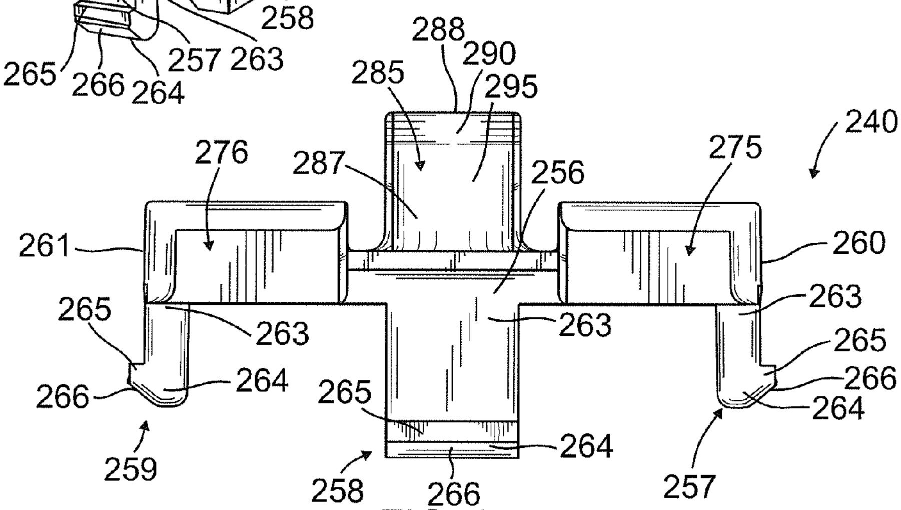
FIGS. 6J, 6K, 6L, 6M, 6N, and 6P are a front view, rear view, right side view, left side view, top view, and bottom view, respectively, of the interlock connector shown in FIG. 6H.
Figure 6K:
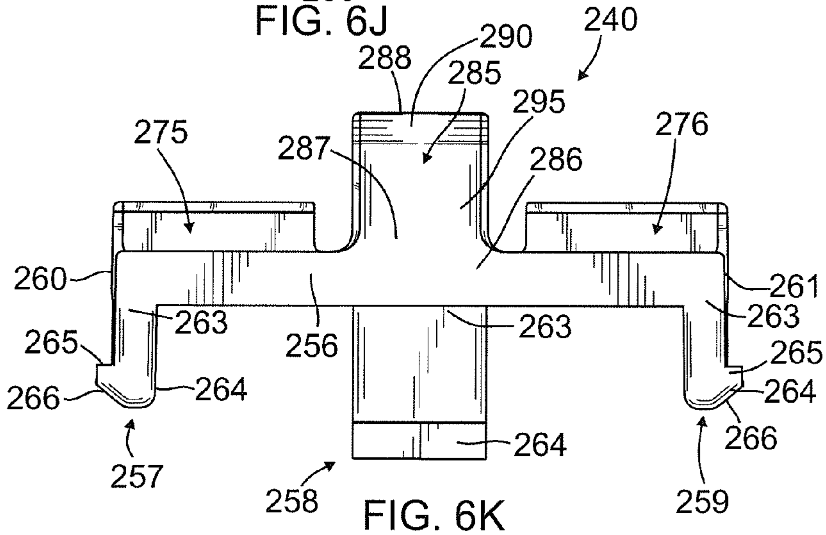
Figure 6L:
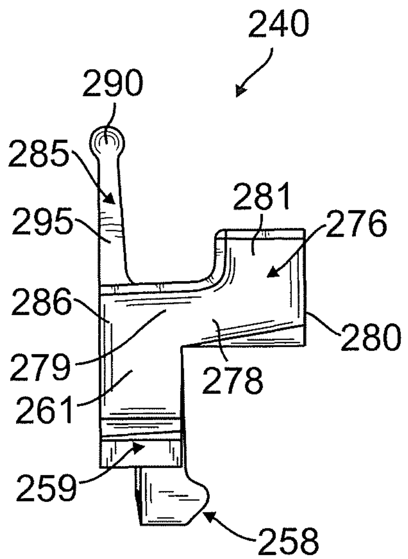
Figure 6M:
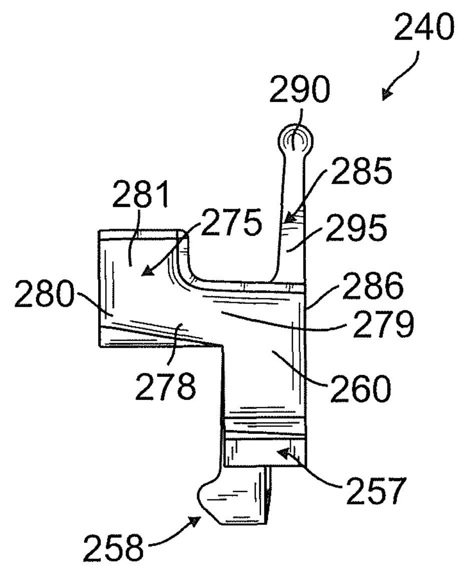
Figure 6N:
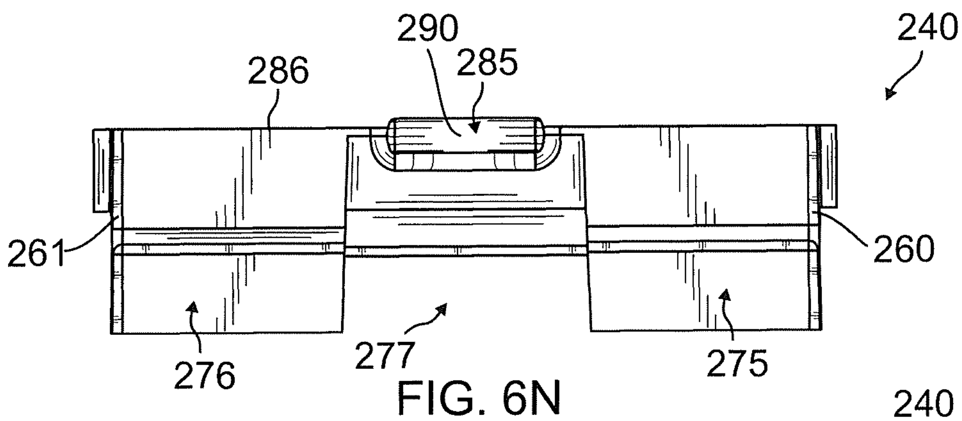
Figure 6P:
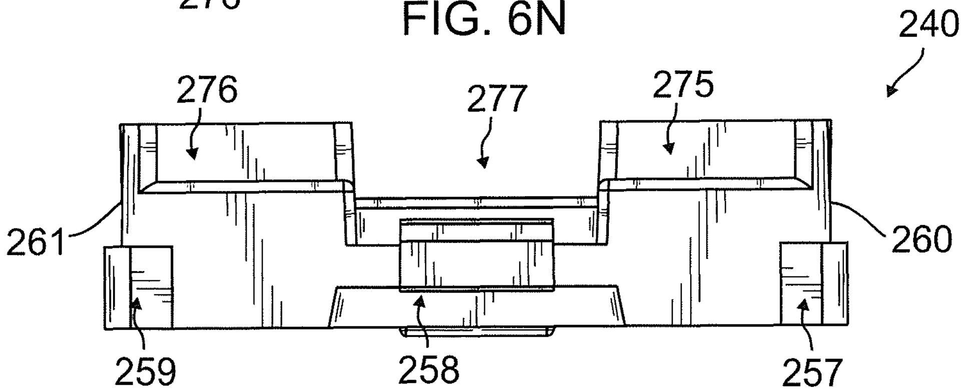
Figure 6Q:
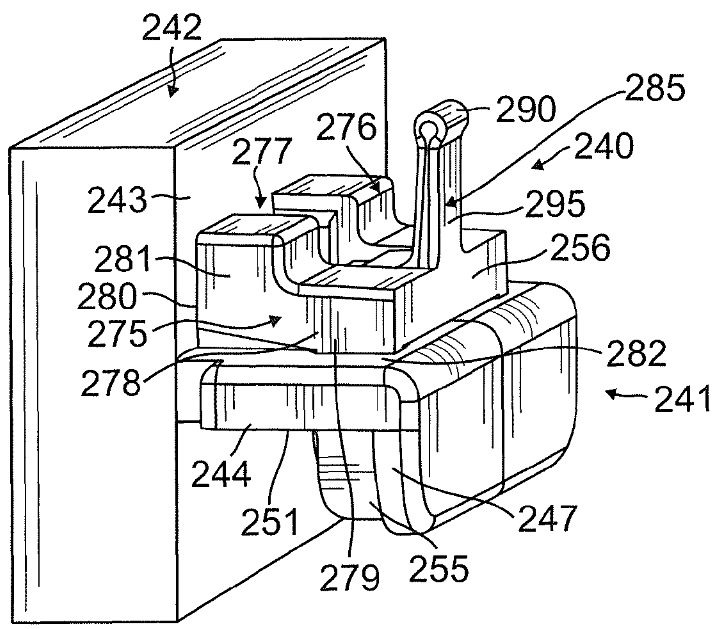
FIG. 6Q is a rear perspective view of the interlock connector in FIG. 6B connected to the interlock receptacle shown in FIG. 6A.
Figure 6R:
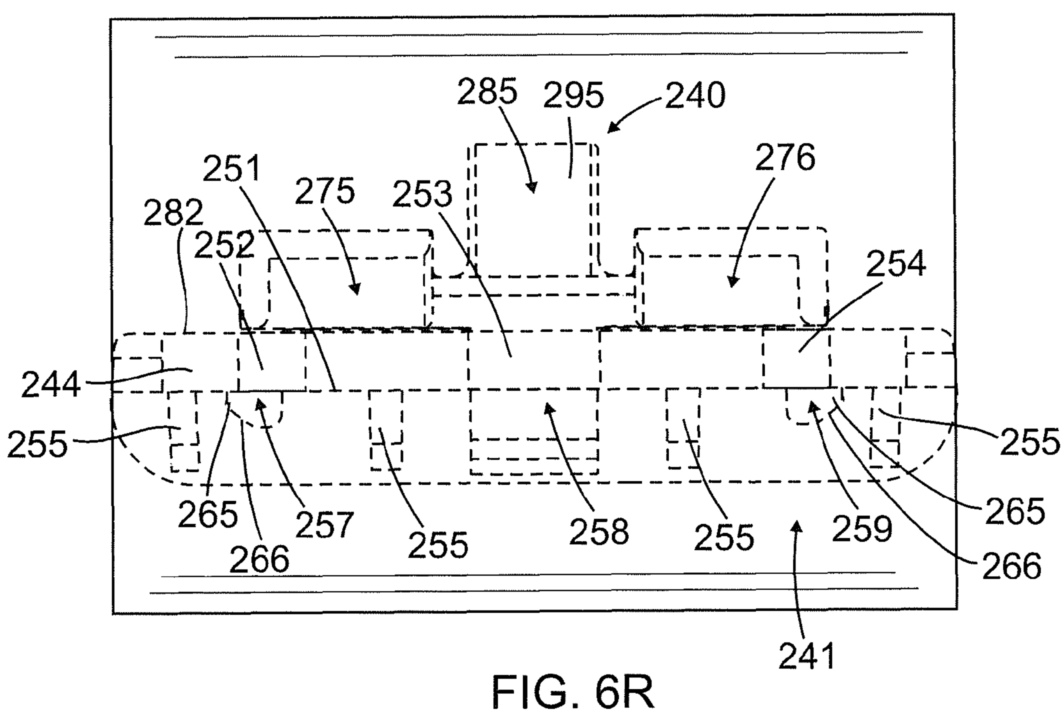
FIGS. 6R, 6S, 6T, 6U, 6V, and 6W are a front view, back view, right side view, left side view, bottom view, and top view, respectively, of the interlock connector and the interlock receptacle shown in FIG. 6Q.
Figure 6S:
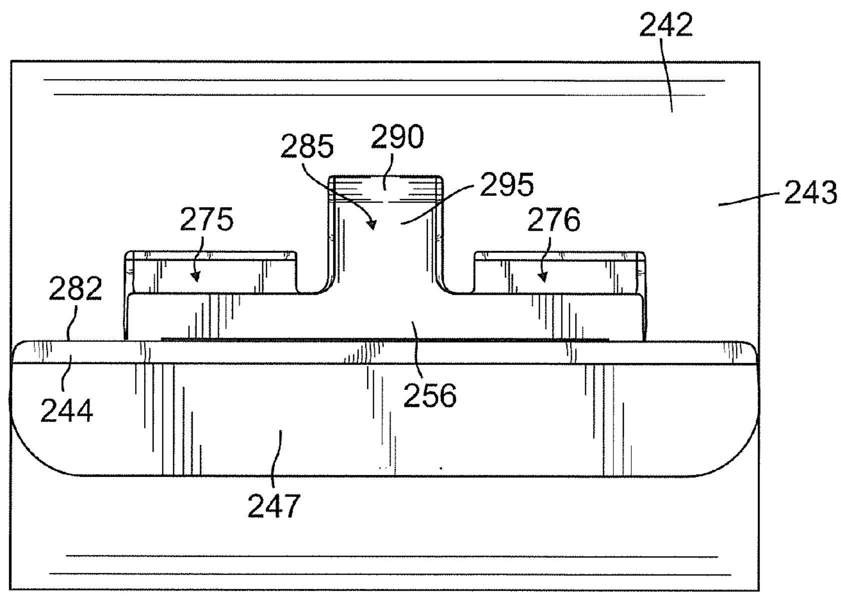
Figure 6T:
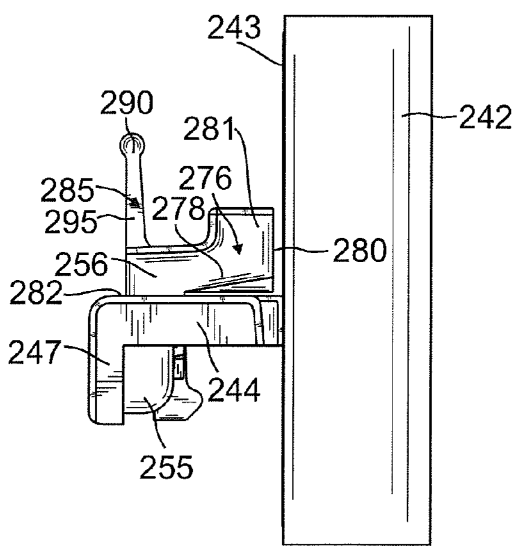
Figure 6U:
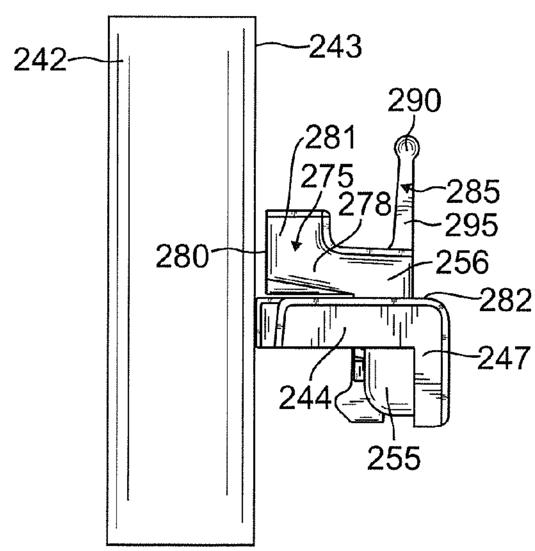
Figure 6V:
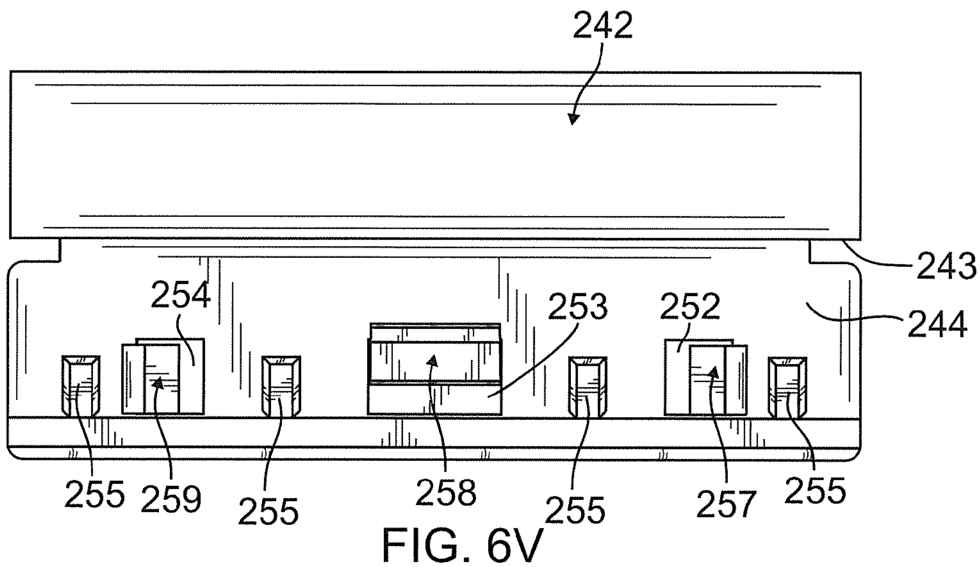
Figure 6W:
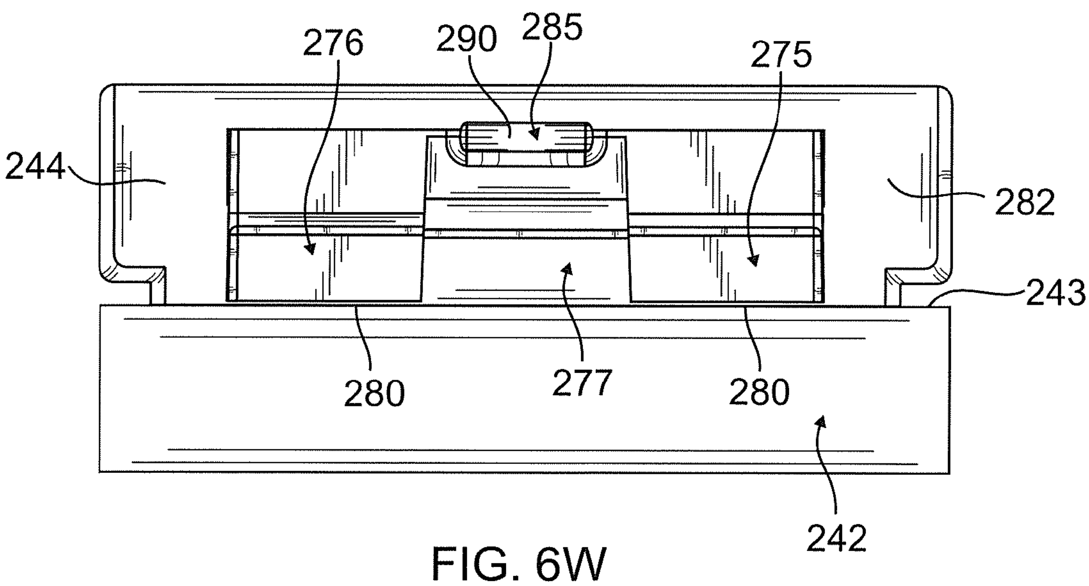

With reference now to FIGS. 6H-6W, an interlock connector 240 is provided to detachably secure various bin, clip, and shelf accessories (300, 365, 372, 515, 530, 580, 595, 640, 640' in FIG. 15), described in detail below, to the panel 102. The interlock connector 240 is configured to connect the various accessories and extend into the channels 226 between adjacent slats 215 on the face panel 103, thereby detachably securing the accessories to the panel 102. Each of the accessories (300, 365, 372, 515, 530, 580, 595, 640, 640' in FIG. 15) described below includes an interlock receptacle 241 configured to receive a portion of the interlock connector 240. A generic accessory 242 having an interlock receptacle 241 is illustrated in FIGS. 6A-6G. When the interlock connector 240 is connected to the interlock receptacle 241 on the accessory 242, as illustrated in FIG. 6Q-6W, the generic accessory 242 is configured to be detachably secured to the panel 102. Together, the interlock connector 240 and the interlock receptacle 241 on the accessory are configured to be inserted into the channels 226 between adjacent slats 215 on the panel 102, thereby detachably securing the accessory 242 to the panel 102, as described in further detail below. The interlock connector 240 can be made of any suitably strong material, such as polyoxymethylene (POM), acetal plastic, nylon, or polypropylene (PP).

Each of the various accessories (300, 365, 372, 515, 530, 580, 595, 640, 640' in FIG. 15) described below can include one or more interlock receptacles 241 having the same configuration for engaging the interlock connector 240. It will be appreciated that providing the various accessories with the same interlock receptacle 241 design enables each the accessories to be secured to the panel 102 with the same interlock connector 240 design. Accordingly, a common or universal interlock connector 240 can be used to secure a variety of different accessories to the panel 102, provided the various accessories include one or more interlock receptacles 241 having the same configuration. It will also be appreciated that providing an interlock connector 240 as a separate member from the accessories enables the convenient replacement of a damaged or worn interlock connector 240 without having to replace the entire accessory. However, the present disclosure is not limited to accessories having a separate interlock connector 240, and in alternate embodiments the interlock connector 240 can be integral with the various accessories described below. Each of the various accessories (300, 365, 372, 515, 530, 580, 595, 640, 640' in FIG. 15) can be made of any suitably strong material, such as acrylonitrile butadiene styrene (ABS), polypropylene (PP) polycarbonate, high-density polyethylene (HDPE), polyvinyl chloride (PVC), or polystyrene (PS). However, the back binder clip 532 of the bulldog clip accessory 530, described below with reference to FIGS. 10A-10D, and the J-shaped hook 584 of the hook accessory 580, described below with reference to FIGS. 11A-11D, can be made of a slightly stronger or more resilient material, such as polyoxymethylene (POM), acetal plastic, nylon, or polypropylene (PP).

With reference now to FIGS. 6A-6G, the generic accessory 242 includes an interlock receptacle 241 projecting rearward from a rear surface 243 of the generic accessory 242. The interlock receptacle 241 includes a horizontal ledge 244 extending rearward from the rear surface 243 of the accessory 242. The horizontal ledge 244 includes a fixed end 245 connected to the rear surface 243 of the accessory 242 and a free end 246 opposite the fixed end 245. The interlock receptacle 241 also includes a vertical tooth 247 extending downward from the free end 246 of the horizontal ledge 244. Together, the vertical tooth 247 and the horizontal ledge 244 define an inverted L-shaped interlock receptacle 241. In the illustrated embodiment, the interlock receptacle 241 also includes three rectangular openings 252, 253, 254 extending down through the horizontal ledge 244. The rectangular openings 252, 253, 254 are configured to receive portions of the interlock connector 240, as described below. The interlock receptacle 241 also defines a recess 249 between the rear surface 243 of the generic accessory 242, a front surface 250 of the tooth 247, and a lower surface 251 of the horizontal ledge 244. The recess 249 is configured to receive one of the tops lips 231 formed by the slats 215 on the face panel 103 when the accessory 242 is attached to the panel 102, as illustrated in FIG. 7C. Additionally, the interlock receptacle 241 includes a plurality of spaced apart gussets 255 (e.g., from two to eight) extending between the front surface 250 of the tooth 247 and the lower surface 251 of the horizontal ledge 244. The gussets 255 are configured to increase the load-bearing capacity of the interlock receptacle 241.

With reference now to the embodiment illustrated in FIGS. 6H-6P, the interlock connector 240 includes a rectangular base 256 and three spaced apart tabs 257, 258, 259 projecting downward from the base 256. In the illustrated embodiment, the interlock connector 240 includes two opposing outer tabs 257, 259 on opposite sides 260, 261 of the base 256 and a middle tab 258 centrally disposed between the outer tabs 257, 259. In the illustrated embodiment, the middle tab 258 is disposed along a front surface 262 of the base 256. Each of the tabs 257, 258, 259 includes an upper end 263 connected to the base 256 and a lower end 264 opposite the upper end 263. Each of the tabs 257, 258, 259 also include an outwardly projecting shoulder portion 265 and a ramp surface 266 tapering between the wider shoulder portion 265 and the narrower lower end 264 of the tab 257, 258, 259. In the illustrated embodiment, the middle tab 258 is longer than the opposing outer tabs 257, 259, such that shoulder portion 265 of the middle tab 258 is configured to engage a lobe 235 on the panel 102 when the accessory (300, 365, 372, 515, 530, 580, 595, 640, 640' in FIG. 15) is secured to the panel 102, as described below with reference to FIG. 7C.

With reference now to FIGS. 6Q-6W, the interlock connector 240 is shown secured to the interlock receptacle 241 on the generic accessory 242. The tabs 257, 258, 259 on the interlock connector 240 are shown extending down through the rectangular openings 252, 253, 254, respectively, in the interlock receptacle 241, thereby securing the interlock connector 240 to the generic accessory 242. To attach the interlock connector 240 to the interlock receptacle 241, the tabs 257, 258, 259 on the interlock connector 240 are inserted down through the rectangular openings 252, 253, 254, respectively, in interlock receptacle 241. As the tabs 257, 258, 259 are inserted through the openings 252, 253, 254, respectively, in the interlock receptacle 241, the ramp surfaces 266 of the tabs 257, 258, 259 slide against the inner walls 270 (see FIGS. 6A and 6G) of the rectangular openings 252, 253, 254, thereby causing the tabs 257, 258, 259 to elastically deflect inward towards each other. After the shoulder portions 265 of the tabs 257, 258, 259 have passed through the rectangular openings 252, 253, 254, respectively, the restorative force supplied by the elastically deformed tabs 257, 258, 259 tends to cause the tabs 257, 258, 259 to return to their original static position. When the interlock connector 240 is received in the interlock receptacle 241, the shoulder portions 265 of the opposing outer tabs 257, 259 abut the lower surface 251 of the horizontal ledge 244, thereby preventing the interlock connector 240 from inadvertently disengaging the interlock receptacle 241 on the accessory 242, as best shown in FIG. 6R. That is, the shoulder portions 265 of the opposing outer tabs 257, 259 overhang the lower surface 251 of the horizontal ledge 244 when the interlock connector 240 is attached to the interlock receptacle 241. Additionally, the tabs 257, 258, 259 can provide a tactile and auditory indication that the interlock connector 240 is properly received in the interlock receptacle 241 when the tabs 257, 258, 259 snap into engagement with the rectangular openings 252, 253, 254, respectively, in the interlock receptacle 241. Although the interlock receptacle 241 is described above with reference to three openings 252, 253, 254, the interlock receptacle 241 may include any suitable number of openings depending upon the number of tabs 257, 258, 259 on the interlock connector 240.

With continued reference to FIGS. 6H-6W, the interlock connector 240 also includes two opposing legs 275, 276 extending forwardly (i.e., toward the accessory 242) from the base 256. In the illustrated embodiment, the legs 275, 276 are spaced apart by a notch 277. Each of the legs 275, 276 includes a horizontal flange 278 having a rear end 279 connected to the base 256 and a forward end 280 opposite the rear end 279. Each of the legs 275, 276 also includes a vertical flange 281 extending upward from the forward end 280 of the horizontal flange 278. Together, the horizontal and vertical flanges 278, 281, respectively, define two L-shaped legs 275, 276 on the opposite sides 260, 261 of the base 256. When the interlock connector 240 is received in the interlock receptacle 241 on the accessory 242, as shown in FIGS. 6Q-6W, the horizontal flanges 278 of the legs 275, 276 are configured to rest on or abut an upper surface 282 of the horizontal ledge 244 on the interlock receptacle 241 and the vertical flanges 281 are configured to abut a portion of the rear surface 243 of the generic accessory 242. The abutment between the L-shaped legs 275, 276 and the horizontal ledge 244 and the accessory 242, respectively, is configured to prevent the accessory 242 from pivoting or rocking relative to the interlock connector 240, which could otherwise inadvertently dislodge the interlock connector 240 from the interlock receptacle 241.

With continued reference to FIG. 6H-6W, the interlock connector 240 also includes a tongue 285 configured to detachably engage the bottom lip 230 formed by the slats 215 on the panel 102 when the accessory 242 is secured to the panel 102, as illustrated in FIG. 7C. In the illustrated embodiment, the tongue 285 is disposed on a rear surface 286 of the base 256. The tongue 285 includes a thin elongated projection 295 extending upward from the base 256. The tongue 285 includes a lower end 287 flexibly attached to the base 256 and a free upper end 288 opposite the lower end 287. As described in detail below in reference to FIGS. 7A-7D, the tongue 285 is configured to pivot such that the interlock connector 240 can be attached and subsequently detached from the panel 102. The free upper end 288 of the tongue 285 is configured to pivot (arrows 289, 291 in FIGS. 7B and 7D, respectively) about the lower connected end 287 in both the forward and rearward directions. The upper end 288 of the tongue 285 also includes a bulbous lip 290 extending transversely across the tongue 285. The total height H of the interlock connector 240 between the upper bulbous lip 290 of the tongue 285 and the lower ends 264 of the tabs 257, 258, 259 is greater than the distance D between adjacent slats 215 on the panel 102, as illustrated in FIG. 7C. Accordingly, the tongue portion 285 of the interlock connector 240 is configured to deflect forward (arrow 289 in FIG. 7B) to permit the interlock connector 240 to be inserted into the channels 226 between adjacent slats 215 on the panel 102. Additionally, the tongue 285 on the interlock connector 240 is configured to deflect rearward (arrow 291 in FIG. 7D) to permit the interlock connector 240 to be drawn out of the channels 226, as described in detail below.

Figure 7A:
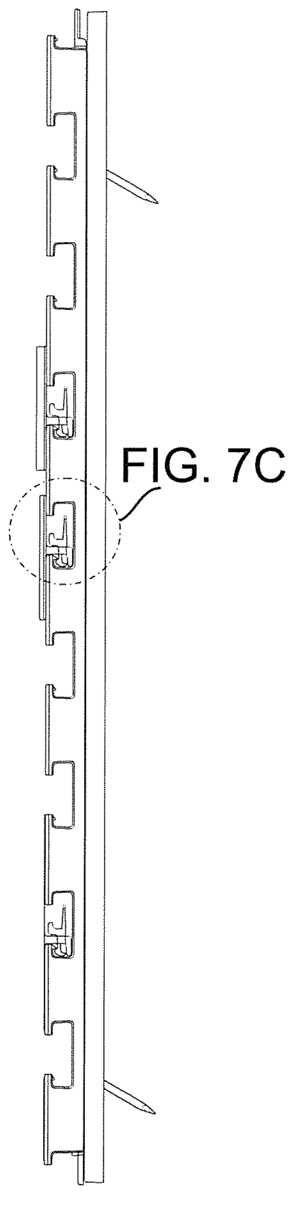
FIG. 7A is a side view of the generic accessory and the interlock connector connected to the interlock receptacle on the generic accessory, as shown in FIG. 6U, attached to the wall system shown in FIG. 5A.
Figure 7B:
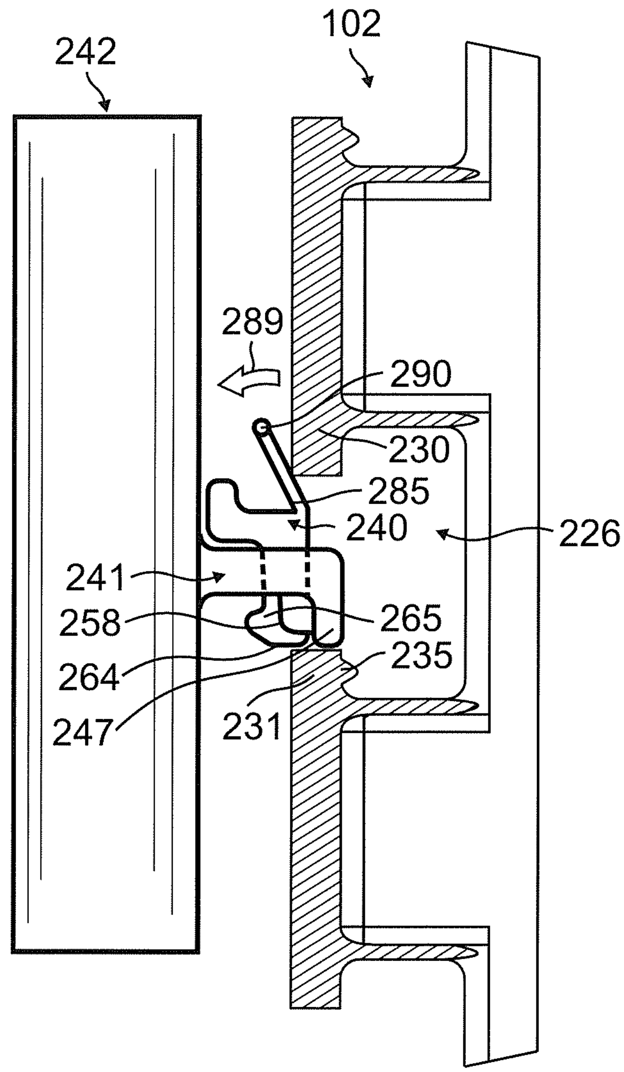
FIG. 7B is an enlarged side view of the generic accessory and the interlock connector connected to the interlock receptacle on the generic accessory, as shown in FIG. 7A, being attached to the wall system shown in FIG. 5A.
Figure 7C:
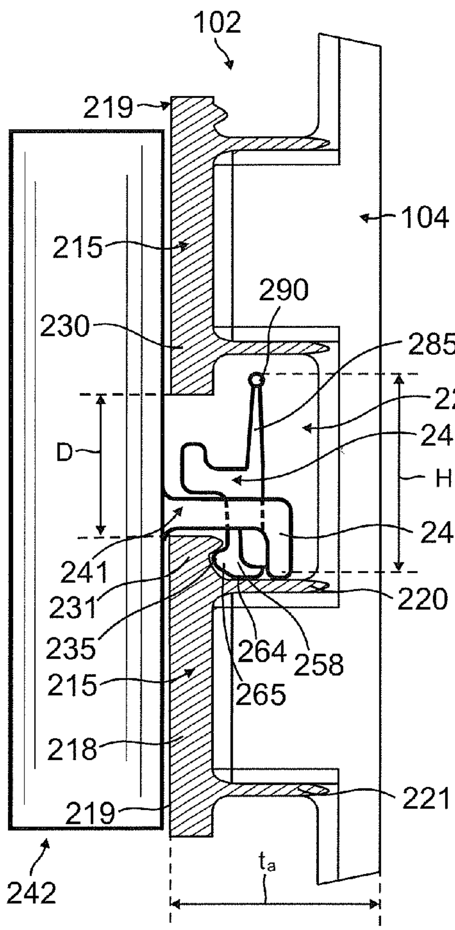
FIG. 7C is an enlarged side view of FIG. 7A, showing the generic accessory and the interlock connector connected to the interlock receptacle on the generic accessory and attached to the wall system.

With reference now to FIG. 7A, the generic accessory 242 having an interlock connector 240 attached to the interlock receptacle 241 on the accessory 242 is shown being inserted into the desired one of the channels 226 between two adjacent slats 215 on the panel 102. As illustrated in FIG. 7A, the tooth 247 on the interlock receptacle 241 is positioned above the top lip 231 and then the interlock connector 240 is inserted into the channel 226. As the interlock connector 240 is inserted into the channel 226, the bulbous lip 290 on the tongue 285 contacts the vertical face panel 218 on the slat 215. When sufficient pressure is applied to overcome the biasing force of the tongue 285, the free end 288 of the tongue 285 elastically deflects forward (i.e., toward the accessory 242) (arrow 289), thereby enabling the interlock connector 240 to pass through the gap between the adjacent slats 215 and into the channel 226. It will be appreciated that the notch 277 (shown in FIGS. 6H and 6Q) between the legs 275, 276 on the interlock connector 240 is configured to permit the tongue 285 to sufficiently deflect forward (arrow 289) such that the tongue 285 can pass into one of the channels 226 between the slats 215.

After the tongue 285 has passed behind the bottom lip 230 of the panel 102, the user can lower the accessory 242 until the lower edges 264 of the middle tab 258 rests on the upper slat leg 220 on the panel 102. Moreover, after the tongue 285 has passed behind the bottom lip 230 of the panel 102, the restorative force supplied by the elastically deformed tongue 285 tends to cause the tongue 285 to return to its upright, vertical position, as shown in FIG. 7C. As described above, when the tongue 285 is in the upright, vertical position, the height H of the interlock connector 240 is greater than the distance D between adjacent slats 215 on the panel 102 (i.e., the gap between the bottom and top lips 230, 231, respectively, on the slats 215). Accordingly, when the interlock connector 240 is received in one of the channels 226 between the slats 215, the tongue portion 285 of the interlock connector 240 is configured to engage the bottom lip 230 and the tabs 257, 258, 259 of the interlock connector 240 are configured to engage the top lip 231 on the panel 102, thereby retaining the interlock connector 240 in the channel 226 and securing the accessory 242 to the panel 102.

When the accessory 242 is secured to the panel 102, as illustrated in FIG. 7C, the shoulder portion 265 of the middle tab 258 on the interlock connector 240 is configured to engage one of the lobes 235 along the top lip 231 of the panel 102. As described above, the lobes 235 are configured to provide an auditory and tactile indication of the lateral position of the accessory 242 along the slats 215 of the panel 102. Accordingly, when the interlock connector 240 is received into one of the channels 226 between adjacent slats 215, the user can adjust the lateral position of the accessory 242 along the slat 215 until one of the lobes 235 engages shoulder 265 on the middle tab 258 of the interlock connector 240. In this manner, the user can position the various accessories 242 along the panel 102 in an organized manner. In the embodiment in which the lobe 235 is a continuous ridge, the shoulder 265 on the middle tab 258 is configured to engage the lobe 235, as shown in FIG. 7C, to prevent the interlock connector 240 from inadvertently disengaging the panel 102.

Figure 7D:
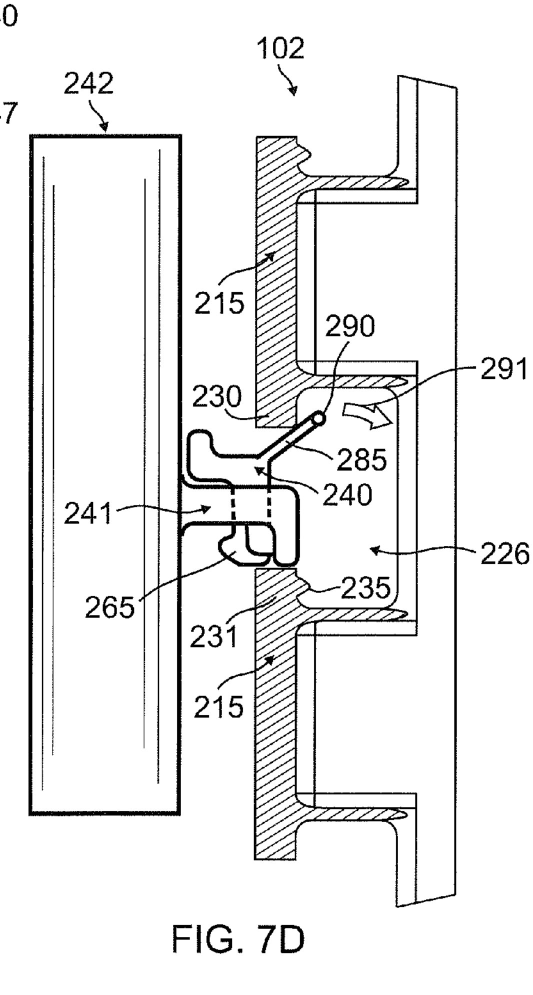
FIG. 7D is an enlarged side view of the generic accessory and the interlock connector connected to the interlock receptacle on the generic accessory, as shown in FIG. 7A, being detached from the wall system shown in FIG. 5A.

With reference now to FIG. 7D, if subsequent removal of the accessory 242 from the panel 102 is required, the user can grasp the accessory 242 and apply sufficient force away from the panel 102 until the tongue portion 285 of the interlock connector 240 is elastically deflected rearward (i.e., away from the accessory 242) (arrow 291) such that the interlock connector 240 passes through the gap between the adjacent slats 215 and is thereby drawn out of engagement with the channel 226. When the accessory 242 and interlock connector 240 are detached from the panel 102, the tongue 285 on the interlock connector 240 is configured to return to its naturally upright position (shown in FIG. 6Q), thereby enabling the user to subsequently reattach the accessory 242 to the panel 102 in any desired location.

Figure 8C:
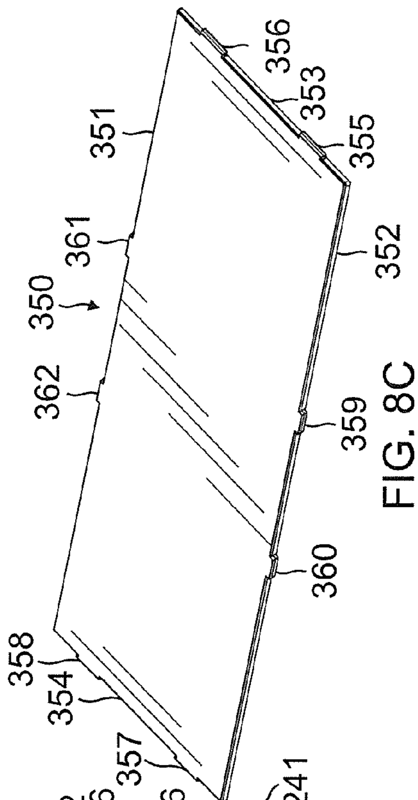
FIG. 8C is a perspective view of an embodiment of a cover.
Figure 8B:
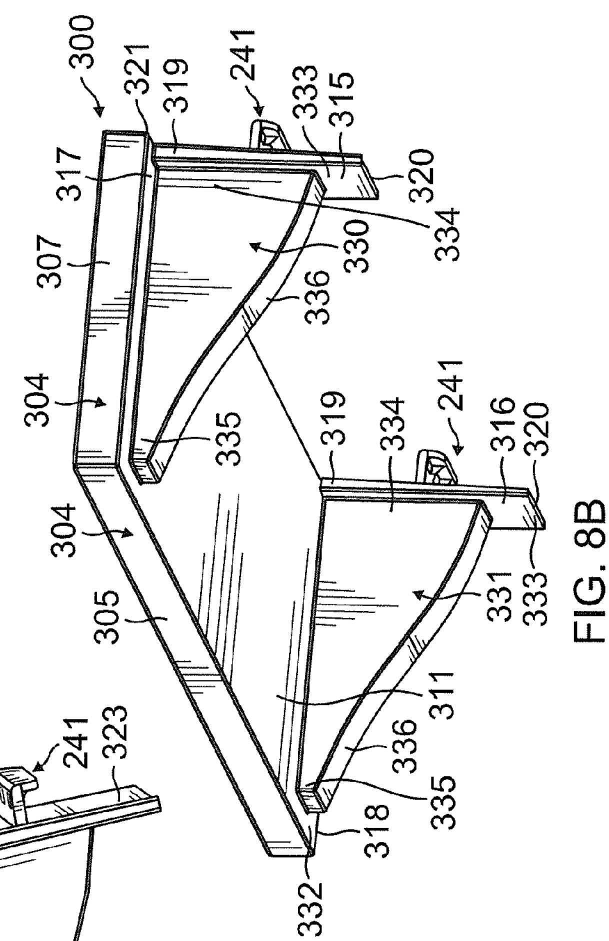
FIGS. 8A and 8B are top rear and bottom front perspective views, respectively, of an embodiment of a shelf accessory.
Figure 8A:
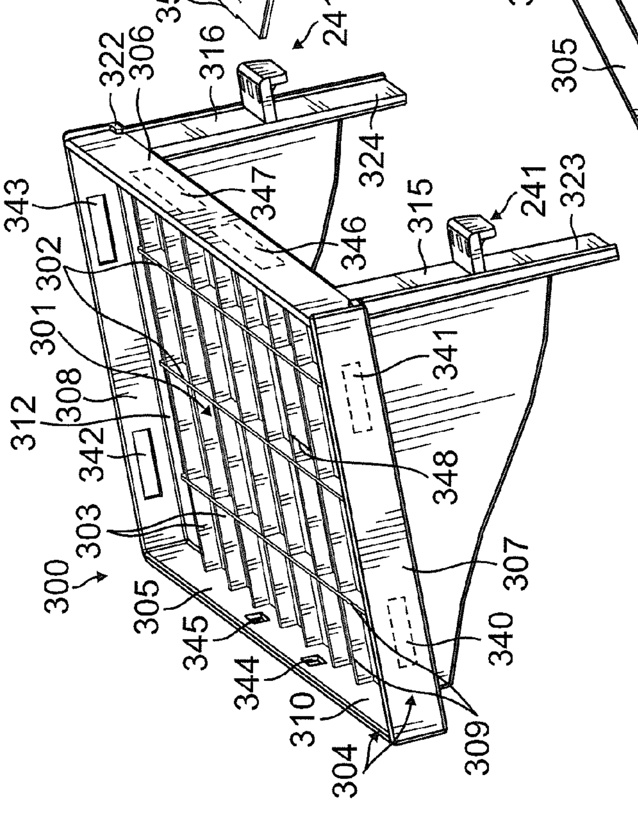

With reference now to FIGS. 8A and 8B, a shelf accessory 300 configured to support a plurality of containers and desktop items is illustrated. The shelf accessory 300 includes a reticulated platform grid 301 having a plurality of spaced apart longitudinal slats 302 interconnected to a plurality of spaced apart lateral slats 303. The platform grid 301 is configured to support the plurality of containers and a variety of desktop items housed therein. The shelf accessory 300 also includes a frame 304 extending around the periphery of the platform grid 301. The frame 304 includes opposing front and rear vertical walls 305, 306, respectively, interconnected by an opposing pair of vertical sidewalls 307, 308 defining a generally rectangular frame 304 surrounding the platform grid 301. In the illustrated embodiment, the walls 305, 306, 307, 308 extend above an upper surface 309 of the platform grid 301, thereby defining a lip 310 configured to retain the various containers and desktop items stored on top of the platform grid 301. The shelf accessory 300 also includes a rectangular base plate 311 underneath the reticulated platform grid 301. The base plate 311 extends between the sidewalls 307, 308 and between the front and rear walls 305, 306. The walls 305, 306, 307, 308 extend upward from an upper surface 312 of the base plate 311.

With continued reference to FIGS. 8A and 8B, the shelf accessory 300 includes two vertical legs 315, 316 extending downward from opposite sides 317, 318, respectively, of the base plate 311. Each of the legs 315, 316 includes a wider upper end 319 connected to the base plate 311 and a relatively thinner lower end 320 opposite the upper end 319. In the illustrated embodiment, the legs 315, 316 are located near rear corners 321, 322, respectively, of the base plate 311. Each vertical leg 315, 316 includes one interlock receptacle 241, described above, projecting rearwardly from rear surfaces 323, 324 of the legs 315, 316, respectively. The interlock receptacles 241 are configured to receive the interlock connector 240 for detachably securing the shelf accessory 300 to the panel 102, as described above. When the shelf accessory 300 is attached to the panel 102, the rear surfaces 323, 324 of the legs 315, 316, respectively, abut the flat front surfaces 219 (shown in FIG. 7B) of the slats 215 on the panel 102. The abutment between the legs 315, 316 and the slats 215 is configured to prevent the shelf accessory 300 from rocking when it is secured to the panel 102.

With continued reference to FIGS. 8A and 8B, the shelf accessory 300 also includes a pair of opposing side support webs or gussets 330, 331. The gussets 330, 331 are configured to support the platform grid 301 and the base plate 311 and thereby increase the load-bearing capacity of the platform grid 301 and the base plate 311. Each gusset 330 extends between a forward portion 332 of the base plate 311 and a lower portion 333 of the corresponding leg 315, 316. In the illustrated embodiment, the gussets 330, 331 taper between a relatively wider portion 334 along the legs 315, 316 and a relatively narrower portion 335 near the front wall 305 of the frame 304. In the illustrated embodiment, the gussets 330, 331 have a scalloped or wavelike profile 336. In alternate embodiment, the gussets 330, 331 can have any other suitable shape, such as triangular, square, arched, or rectangular.

With continued reference to FIG. 8A, the shelf accessory 300 also includes a plurality of notches in the inside surfaces of the walls 305, 306, 307, 308 of the frame 304. In the illustrated embodiment, each of the walls 305, 306, 307, 308 includes two notches. The two notches 340, 341 in the first vertical sidewall 307 are aligned with the two corresponding notches 342, 343 on the opposing vertical sidewall 308. Similarly, the two notches 344, 345 in the front wall 305 are aligned with the two notches 346, 347 in the rear wall 306. The notches 340, 341, 342, 343, 344, 345, 346, 347 are configured to detachably support one or more covers 350, illustrated in FIG. 8C, above the platform grid 301. The one or more covers 350 are configured to create a smooth continuous flat surface above the platform grid 301 such that the shelf accessory 300 can support smaller desktop items, such as pens and staplers, which could otherwise fall through the gaps 348 between the longitudinal and lateral slats 302, 303, respectively, of the support grid 301. The one or more covers 350 are configured to cover substantially all of the support grid 301, although a different proportion of the support grid 301 can be covered by the one or more covers 350 and still fall within the scope and spirit of the present invention.

In the illustrated embodiment of FIG. 8C, the cover 350 is a generally flat rectangular plate having opposing sides 351, 352 and opposing ends 353, 354. The cover 350 also includes a plurality of tabs 355, 356, 357, 358, 359, 360, 361, 362 extending out from the opposing ends 353, 354 and sides 351, 352. The tabs 355, 356, 357, 358, 359, 360, 361, 362 are configured to be received in the corresponding notches 340, 341, 342, 343, 344, 345, 346, 347, respectively, in the walls 305, 306, 307, 308 of the frame 304 such that the cover 350 is supported above the platform grid 301. In the illustrated embodiment, the cover 350 includes four pairs of opposing tabs and the shelf accessory 300 includes four pairs of opposing notches corresponding to the tabs on the cover, although more or fewer tabs and corresponding notches can be provided and still fall within the scope and spirit of the present invention.

With reference now to FIGS. 9A-9D, a drawer shelf accessory 365 configured to house and support a plurality of containers and desktop items is illustrated. The drawer shelf accessory 365 includes opposing top and bottom panels 366, 367, respectively, two opposing side panels 368, 369, and a back panel 370 extending between the top and bottom panels 366, 367, respectively, and the side panels 368, 369. Together, the panels 366, 367, 368, 369, 370 define a cavity 371 configured to house a plurality of drawers 372, shown in FIGS. 9E-9H. In the illustrated embodiment of FIG. 9B, the back panel 370 includes two interlock receptacles 241 extending rearwardly from a rear surface 373 of the back panel 370. The two interlock receptacles 241 are configured to receive two interlock connectors 240 for detachably securing the drawer shelf accessory 365 to the panel 102, as described above. When the drawer shelf accessory 365 is attached to the panel 102, the rear surface 373 of the back panel 370 abuts the flat front surfaces 219 (shown in FIG. 7C) of the slats 215 on the panel 102. The abutment between the back panel 370 and the slats 215 is configured to prevent the drawer shelf accessory 365 from rocking when it is secured to the panel 102.

With continued reference to FIGS. 9A-9D, the side panels 368, 369 extend above the top panel 366, thereby defining opposing side lips 375, 376. Additionally, an upwardly protruding flange 377 extends along a front edge 378 of the top panel 366, thereby defining a forward lip 379. The lips 375, 376, 379 are configured to retain the various containers and desktop items stored on top of the top panel 366.

Figure 9A:
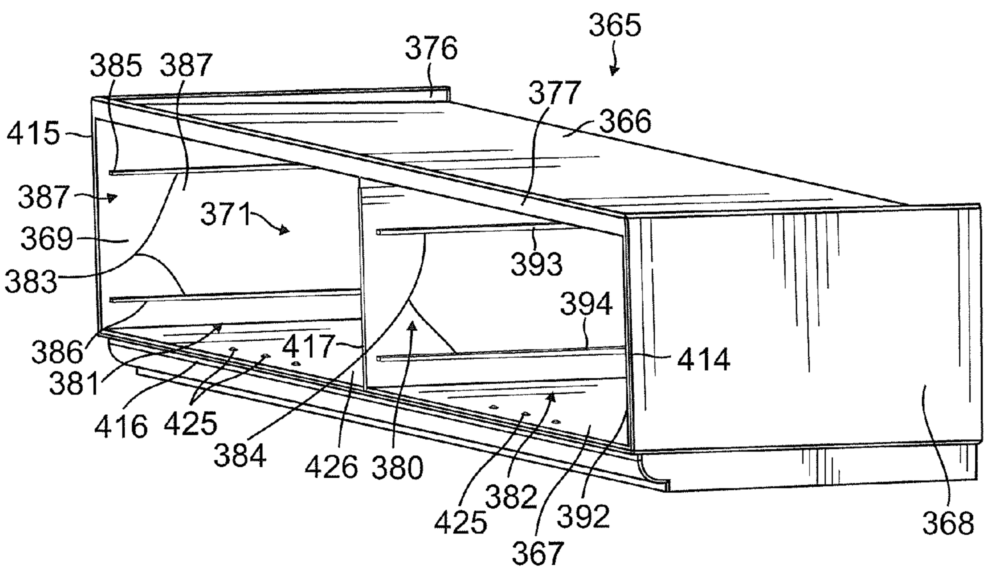
FIGS. 9A and 9C are a top front left perspective view and a top front right perspective view, respectively, of an embodiment of a drawer shelf accessory.
Figure 9B:
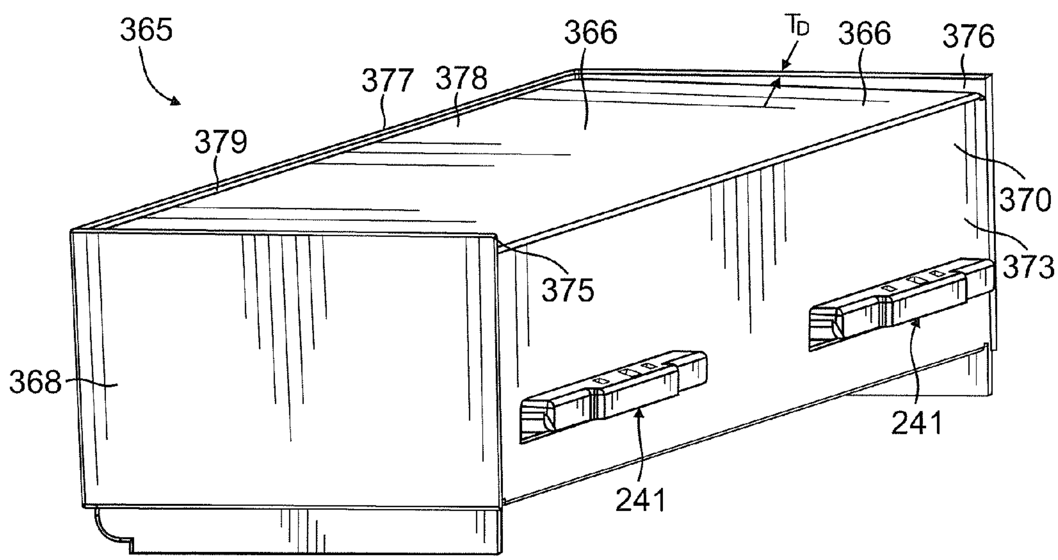
FIG. 9B is top rear left perspective view of the drawer shelf accessory shown in FIGS. 9A and 9C.
Figure 9C:
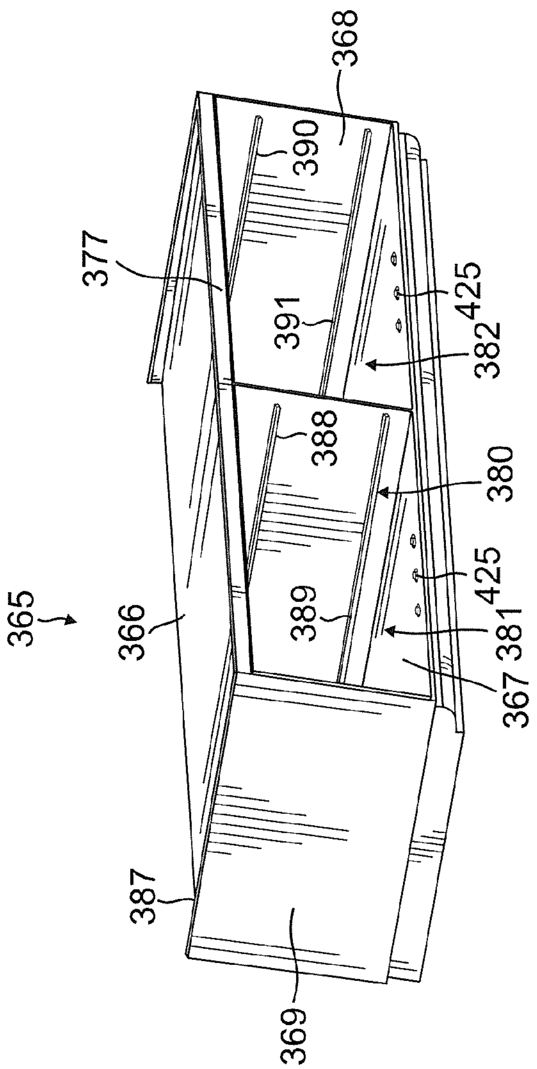
Figure 9D:
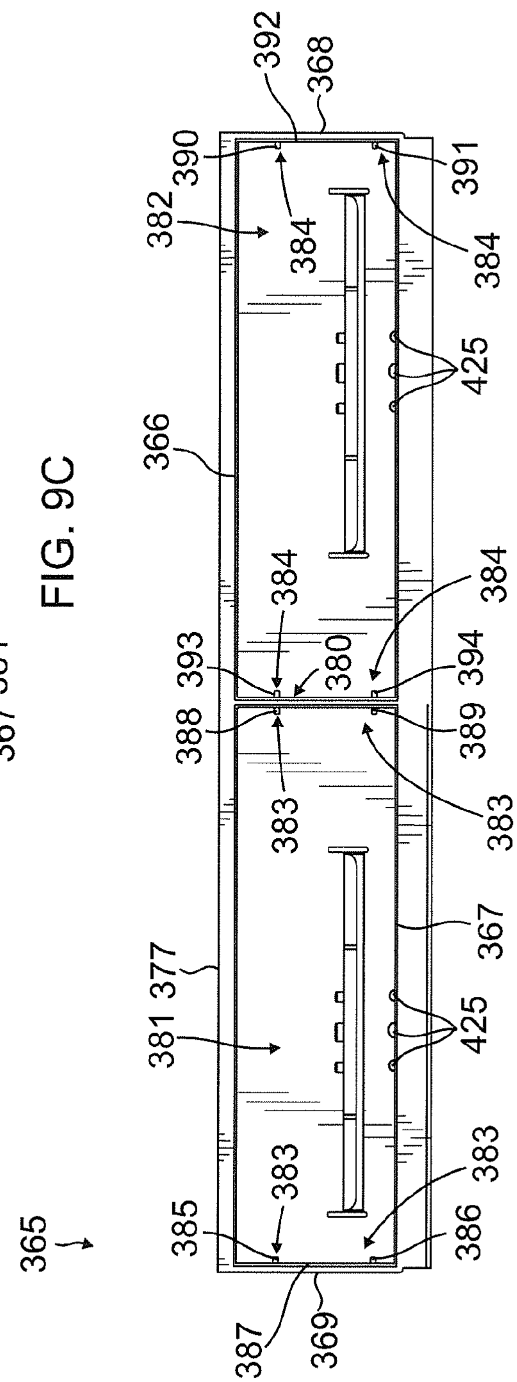
FIG. 9D is a front view of the drawer shelf accessory shown in FIGS. 9A and 9C.
Figure 9E:
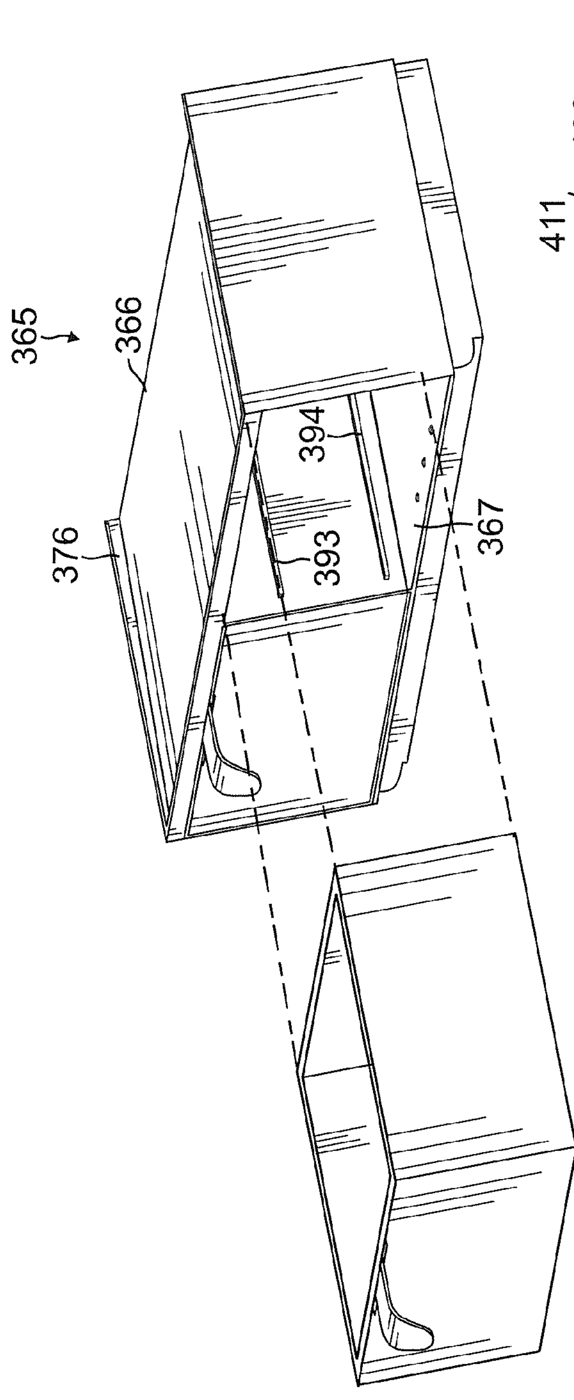
FIG. 9E is a top front left perspective view of the drawer shelf accessory shown in FIGS. 9A and 9C, showing one drawer inserted into the drawer shelf accessory and another drawer removed from the drawer shelf accessory.

Still referring to FIGS. 9A-9D, the drawer shelf accessory 365 also includes a vertical center divider 380 extending between the top and bottom panels 366, 367. In the illustrated embodiment, the divider 380 is centrally disposed between the opposing side panels 368, 369. The vertical center divider 380 divides the cavity 371 into a first compartment 381 and a second compartment 382, both of which are configured to receive and support one drawer 372, as shown in FIG. 9E. In the illustrated embodiment, each of the compartments 381, 382 includes a set of guide rails 383, 384, respectively, configured to slidably support the drawers 372. That is, the guide rails 383, 384 slidably support the drawers 372 as the drawers 372 are slid between open and closed positions within the compartments 381, 382. In the illustrated embodiment, the set of guide rails 383 in the first compartment 381 includes upper and lower horizontal ribs 385, 386, respectively, on an inside surface 387 of the side panel 369 and two corresponding ribs 388, 389 on the vertical center divider 380 extending into the first compartment 381. The horizontal ribs 385, 386 on the side panel 369 are spaced apart and aligned with the ribs 388, 389 on the vertical center divider 380. Similarly, the set of guide rails 384 in the second compartment 382 includes two spaced apart horizontal ribs 390, 391 on an inside surface 392 of the side wall 368 and two corresponding spaced apart horizontal ribs 393, 394 on the vertical center divider 380 extending into the second compartment 382. As best illustrated in FIG. 9D, horizontal ribs 385, 388, 393, and 390 are vertically aligned and horizontal ribs 386, 389, 394, and 391 are vertically aligned.

Figure 9F:
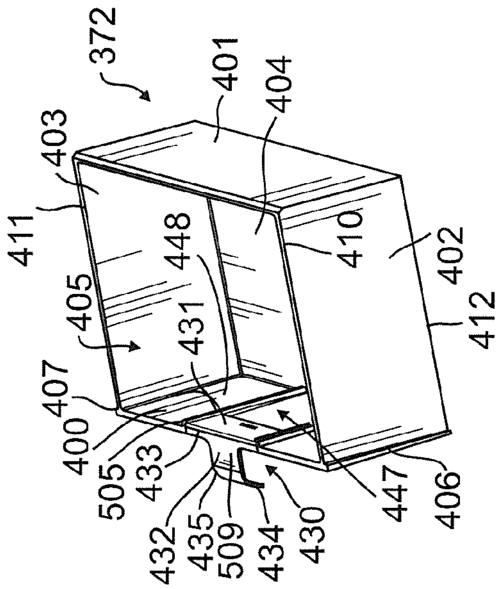
FIGS. 9F and 9H are top rear left perspective view and a bottom front left perspective views, respectively, of an embodiment of the drawer shown in FIG. 9E.
Figure 9H:
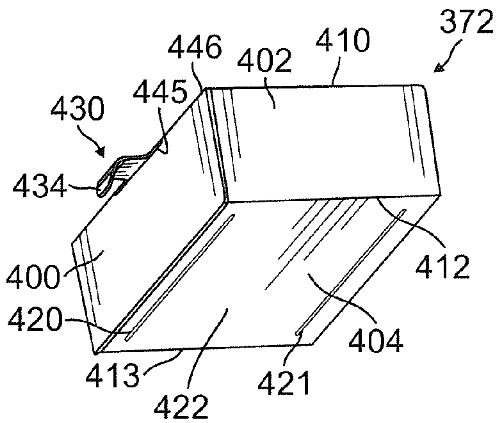
Figure 9G:
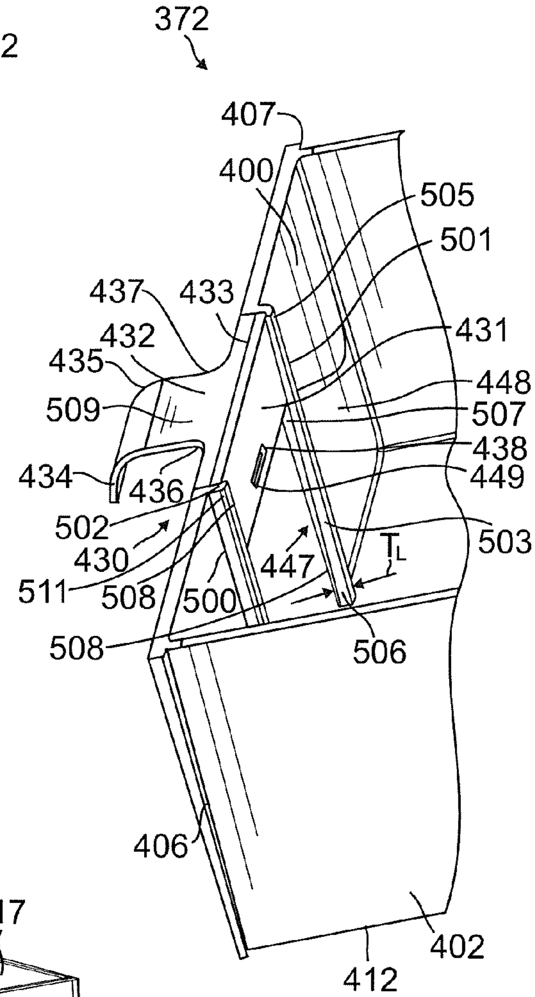
FIG. 9G is an enlarged, partial view of the top rear left perspective view of the drawer shown in FIG. 9F.

With reference now to FIGS. 9F, 9G, and 9H, the drawer 372 includes opposing front and rear panels 400, 401, opposing side panels 402, 403, and a bottom panel 404 extending between the front, rear, and side panels 400, 401, 402, 403. Together, the panels 400, 401, 402, 403, 404 define a cavity 405 configured to house a variety of desktop items therein. In the illustrated embodiment, the front panel 400 extends slightly past the opposing side panels 402, 403, thereby defining lips 406, 407 on opposite sides of the drawer 372.

When the drawers 372 are slidably inserted into the compartments 381, 382 in the drawer shelf accessory 365, as illustrated in FIG. 9E, the upper ribs 385, 388, 390, 393 of the guide rails 383, 384 are configured to slidably engage upper portions 410, 411 of the side panels 402, 403, respectively, of the drawers 372 and the lower ribs 386, 389, 391, 394 are configured to slidably engage lower portions 412, 413 of the side panels 402, 403, respectively. Additionally, when the drawers 372 are completely inserted into the compartments 381, 382, the front panels 400 of the drawers 372 are flush with the upwardly extending flange 377 along the front edge 378 of the top panel 366 and front edges 414, 415, 416, 417, respectively, of the side panels 368, 369, the bottom panel 367, and the center divider 380 (shown in FIG. 9E).

With reference to FIG. 9H, the drawer 372 also includes a pair of transverse ridges 420, 421 protruding downward from a lower surface 422 of the bottom panel 404. In the illustrated embodiment, the drawer 372 includes a front transverse ridge 420 near the front panel 400 and a rear transverse ridge 421 near the rear panel 401. The transverse ridges 420, 421 are configured to engage a series of hemispherical protrusions 425 on an upper surface 426 of the bottom panel 367 of the drawer shelf accessory 365, as shown in FIG. 9E. In the illustrated embodiment, the hemispherical protrusions 425 are disposed near the front edge 416 of the bottom panel 367. When the drawer 372 is in the fully open position (see FIG. 9E), the rear transverse ridge 421 on the drawer 372 contacts the hemispherical depressions 425 on the drawer shelf accessory 365. The contact between the rear transverse ridge 421 and the hemispherical protrusions 425 provides a resistive force which must be overcome to completely remove the drawer 372 from the compartments 381, 382 in the drawer shelf accessory 365. When the drawer 372 is in the fully closed position (see FIG. 9E), the front transverse ridge 420 contacts the hemispherical protrusions 425. The contact between the front transverse ridge 420 and the hemispherical protrusions 425 provides a resistive force which must be overcome to open the drawer 372. Accordingly, the front transverse ridge 420 on the drawer 372 is configured to prevent the drawer 372 from inadvertently opening, and the rear transverse ridge 421 on the drawer 372 is configured to prevent the drawer 372 from inadvertently being completely removed from the compartments 381, 382.

With continued reference to FIGS. 9F, 9G, and 9H, the drawer 372 can also include a handle portion 430 configured to enable the user to slide the drawer 372 along the guide rails 383, 384, thereby opening and closing the drawer 372 into the compartments 381, 382 in the drawer shelf accessory 365. The handle portion 430 includes a vertical leg 431, a horizontal leg 432 extending forward from an upper end 433 of the vertical leg 431, and an arcuate portion 434 extending downward from a free end 435 of the horizontal leg 432. In the illustrated embodiment, the horizontal leg 432 is narrower than the vertical leg 431 such that the handle 430 includes opposing arcuate shoulders 436, 437 on either side horizontal leg 432 transitioning to the wider vertical leg portion 431. The vertical leg 431 of the handle 430 also includes a narrow horizontal slot 438 configured to receive a portion of the drawer 372, as described below. Although the drawer 372 and handle 430 have been described as two separate pieces subsequently connected, in an alternate embodiment the handle portion 430 can be integrally formed with the drawer 372.

With continued reference to FIGS. 9F, 9G, and 9H, the drawer 372 also includes a notch 445 along an upper edge 446 of the front panel 400, a channel 447 along a rear surface 448 of the front panel 400, and a tang 449 extending rearward from the rear surface 448 of the front panel 400 and into the channel 447. Together, the notch 445, the channel 447, and the tang 449 are configured to secure the handle 430 to the drawer 372. The channel 447 is defined by a pair of opposing vertical flanges 500, 501 projecting rearwardly from the rear surface 448 of the front panel 400. In the illustrated embodiment, the vertical flanges 500, 501 extend the entire height of the front panel 400. As shown most clearly in FIG. 9G, each vertical flange 500, 501 includes a ridge 502 extending rearward from the rear surface 448 of the front panel 400 and a lip 503 extending inward from a rear edge 511 of the ridge 502. The thickness $T_L$ of the lips 503 tapers between a narrow upper end 505 and a relatively wider lower end 506 such that the channel 447 formed by the vertical flanges 500, 501 tapers between a wider upper end 507 and a narrower lower end 508.

To attach the handle 430 to the drawer 372, the vertical leg 431 of the handle 430 is configured to extend down into the channel 447. It will be appreciated that the tapered channel 447 is configured to clamp onto the vertical leg 431 of the handle 430 when the vertical leg 431 is sufficiently inserted down into the channel 447 such that a portion of the lips 503 engages the vertical leg 431 of the handle 430. Additionally, the tang 449 on the rear surface 448 of the front panel 400 is configured to extend into the slot 438 in the vertical leg 431 of the handle 430, thereby securing the handle 430 to the drawer 372. When the handle 430 is attached to the drawer 372, the horizontal leg 432 of the handle 430 extends forward and overhangs the upper edge 446 of the front panel 400. Additionally, a portion of the horizontal leg 432 is seated in the notch 445 in the front panel 400 such that an upper surface 509 of the handle 430 is flush with the upper edge 446 of the drawer 372 when the handle 430 is attached to the drawer 372.

Figure 9J:
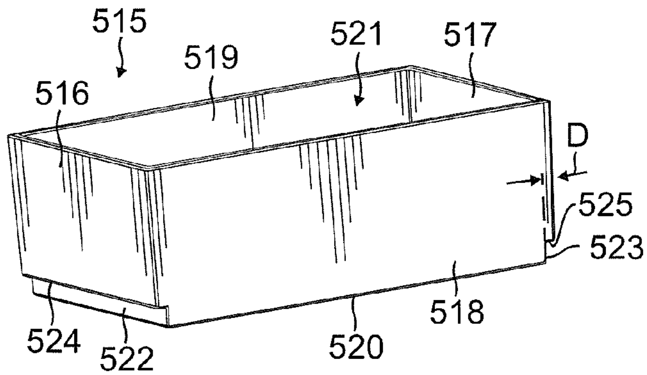
FIG. 9J is a top front left perspective view of an embodiment of a shelf container.
Figure 15:
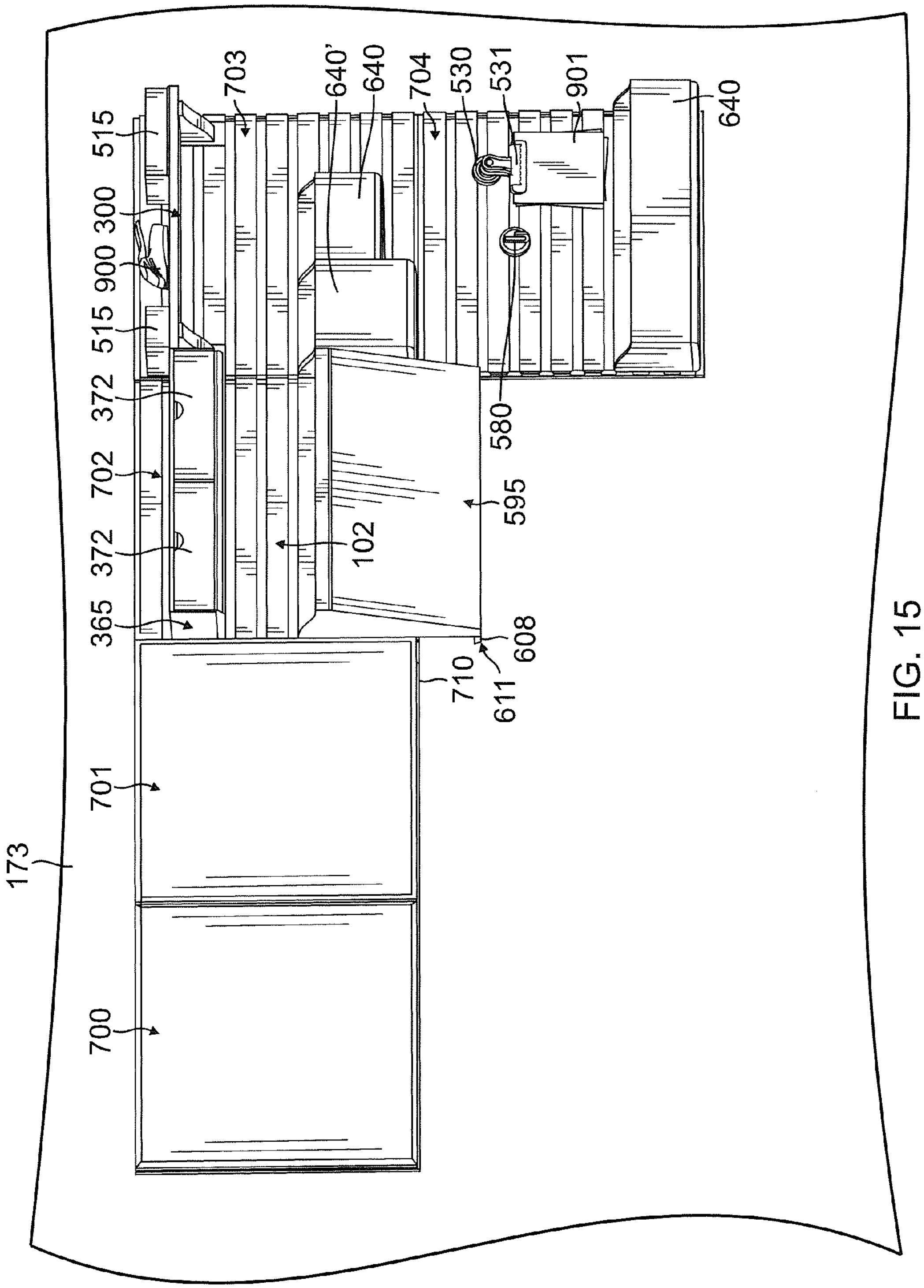
FIG. 15 is a front perspective view of a plurality of wall systems mounted to a wall, the wall systems having the accessories shown in FIGS. 8A-13C attached thereto.

With reference now to FIG. 9J, a shelf container 515 configured to house a plurality of desktop items (e.g., writing instruments) is illustrated. The shelf container 515 is configured to rest on top of the top panel 366 of the drawer shelf accessory 365, as shown in FIG. 15. The shelf container 515 includes opposing front and rear walls 516, 517, opposing sidewalls 518, 519, and a bottom wall 520 extending between the sidewalls 518, 519 and the front and rear walls 516, 517. The front and rear walls 516, 517 and the sidewalls 518, 519 extend upward from the bottom wall 520, thereby defining a cavity 521 having a U-shaped transverse cross-section configured to house the plurality of desktop items. The interfaces between the front and rear walls 516, 517 and the bottom wall 520 also include grooves 522, 523 defining ledges 524, 525 extending along the entire width of the front and rear walls 516, 517, respectively. When the shelf container 515 is positioned on the top panel 366 of the drawer shelf accessory 365, either one of the ledges 524, 525 is configured to receive a portion of one of the lips 375, 376, 379 extending around the periphery of the top panel 366 drawer shelf accessory 365. When one of the lips 375, 376, 379 on the drawer shelf accessory 365 is received in one of the grooves 522, 523 in the shelf container 515, the corresponding one of the ledges 524, 525 overhangs a portion of the lips 375, 376, 379. Moreover, in one embodiment, the depth D of the ledges 524, 525 is substantially equal to the thickness $T_D$ of the lips 375, 376, 379 (shown in FIG. 9B) on the drawer shelf accessory 365 such that the front and rear walls 516, 517 of the shelf container 515 are configured to be substantially flush with the lips 375, 376, 379. In this manner, the lips 375, 376, 379 on the drawer shelf accessory 365 tend to prevent the shelf container 515 from rocking, thereby retaining the shelf container 515 on the top panel 366. It will be appreciated that the shelf container 515 is configured to also be supported on top of the shelf accessory 300, described above with reference to FIGS. 8A-8C.

With reference now to FIGS. 10A-10D, a bulldog clip accessory 530 configured to support a standard bulldog clip 531 and a plurality of papers secured thereto is illustrated. The bulldog clip accessory 530 includes a back binder clip 532 and a cover binder clip 533 configured to attach to the back binder clip 532. The back binder clip 532 includes a flat disk 534 having a front surface 535 and a back surface 536. The back binder clip 532 also includes a mounting post 537 centrally disposed on the disk 534 and projecting forward from the front surface 535 of the disk 534. The mounting post 537 is configured to secure the cover binder clip 533 and the standard bulldog clip 531 to the back binder clip 532, as described in detail below. The mounting post 537 includes a cylindrical shaft portion 538 having a fixed end 539 connected to the disk 534 and a free end 540 opposite the fixed end 539. The mounting post 537 also includes a hemispherical head portion 541 on the free end 540 of the cylindrical shaft portion 538. The diameter $d_h$ of the hemispherical head portion 541 is larger than the diameter $d_s$ of the cylindrical shaft portion 538 such that a step or shoulder 542 is defined between the head and shaft portions 541, 538, respectively, of the mounting post 537. The mounting post 537 also includes a narrow vertical slit 543 extending through the head portion 541 and at least partially through the cylindrical shaft portion 538. The slit 543 defines a pair of opposing jaws 544, 545 naturally biased apart by the slit 543 and configured to compress towards one another, thereby selectively engaging and disengaging the standard bulldog clip 531 and the cover binder clip 533, as described in detail below.

With continued reference to FIGS. 10A-10D, the back binder clip 532 also includes an interlock receptacle 241 projecting from the back surface 536 of the disk 534. The interlock receptacle 241 is configured to receive the interlock connector 240 for detachably securing the bulldog clip accessory 530 to the panel 102, as described above.

Figures 10A, 10B:
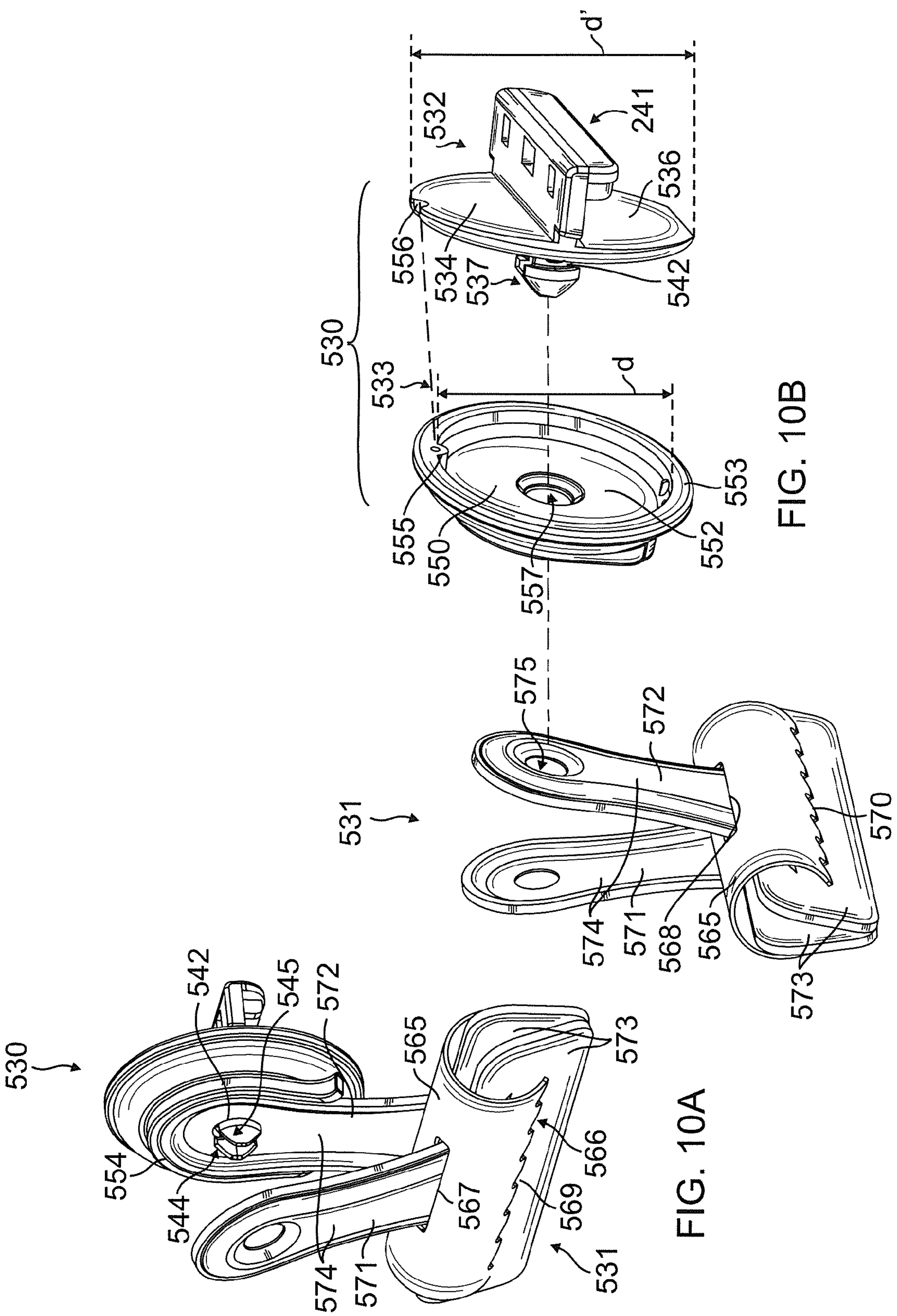
FIG. 10A is a top front left perspective view of an embodiment of a bulldog clip accessory having a pair of opposing jaws engaging a standard bulldog clip.
FIGS. 10B and 10C are top rear left and top front left exploded views, respectively, of the bulldog clip accessory shown in FIG. 10A.

Still referring to FIGS. 10A-10D, the cover binder clip 533 includes a circular shell 550 having opposing front and rear surfaces 551, 552, respectively, an annular flange 553 protruding from the rear surface 552 of the shell 550, and a horseshoe-shaped flange 554 protruding from the front surface 551 of the shell 550. The annular flange 553 is configured to engage a portion of the back binder clip 532 and the horseshoe-shaped flange 554 is configured to engage a portion of the standard bulldog clip 531. The annular flange 553 has an inner diameter d substantially equal to the diameter d' of the disk portion 534 of the back binder clip 532 (see FIG. 10B) such that the annular flange 553 on the cover 533 circumferentially surrounds the disk portion 534 of the back binder clip 532 when the cover 533 is attached to the back binder clip 532, as shown in FIG. 10A. The cover 533 also includes a detent 555 protruding inward from the annular flange 553. The detent 555 is configured to engage an arcuate notch 556 in the disk 534 of the back binder clip 532. The engagement between the detent 555 and the notch 556 is configured to resist rotation of the cover binder clip 533 relative to the back binder clip 532, which could cause the cover binder clip 533 to inadvertently detach from the back binder clip 532. The cover binder clip 533 also includes a hole 557 centrally disposed on the shell 550 configured to receive the mounting post 537 on the back binder clip 532. The diameter $d_c$ of the hole 557 in the cover binder clip 533 is slightly smaller than the diameter $d_h$ of the head portion 541 of the mounting post 537 and substantially equal to the diameter $d_s$ of the cylindrical shaft portion 538 of the mounting post 537, the significance of which is explained below. Additionally, the horseshoe-shaped flange 554 defines a downwardly opening channel 558 having opposing fingers 559, 560 on a lower end of the flange 554. The opposing fingers 559, 560 are naturally biased toward one another. The horseshoe-shaped flange 554 on the cover 533 is configured to secure a portion of the standard bulldog clip 531, as described below.

Figure 10C:
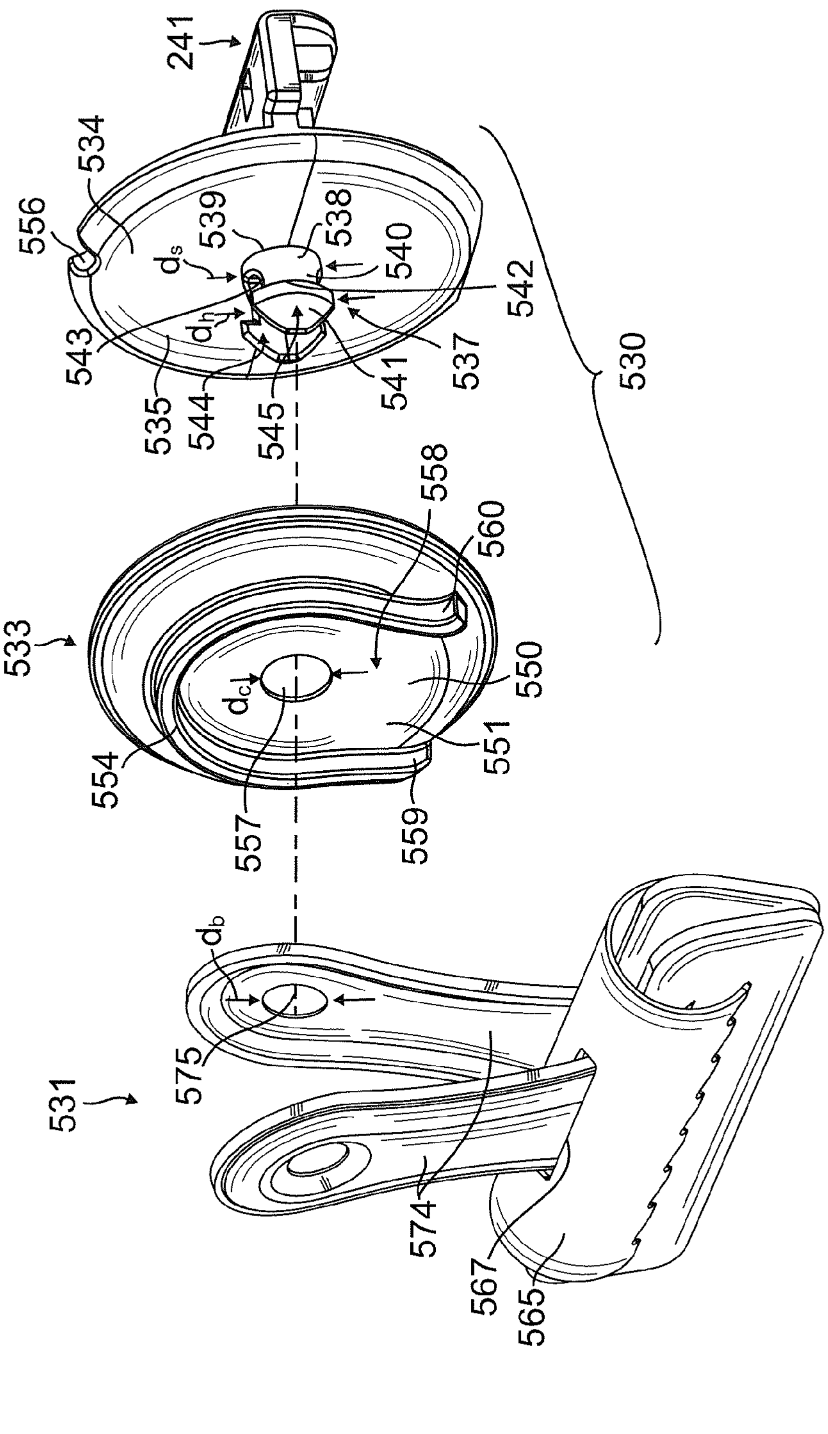
Figure 10D:
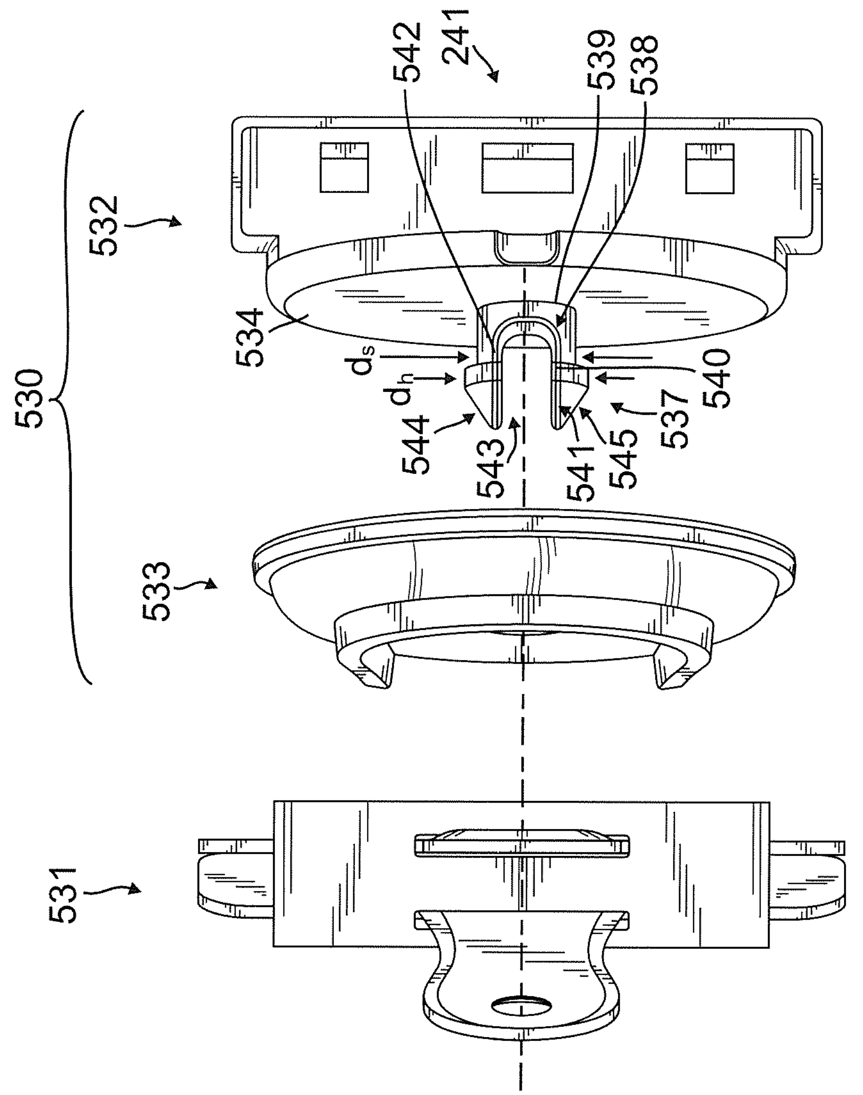
FIG. 10D is a top perspective view of the bulldog clip accessory shown in FIG. 10A.

With continued reference to FIGS. 10A-10C, the standard bulldog clip 531 includes a cylindrical tube 565 having a narrow horizontal slit 566 and two radially spaced apart narrow rectangular openings 567, 568. The narrow horizontal slit 566 in the cylindrical tube 565 defines two opposing edges 569, 570. In the illustrated embodiment, the edges 569, 570 are serrated. The bulldog clip 531 also includes two generally flat plates 571, 572. Each plate 571, 572 includes a wider clamp portion 573 and a narrower handle portion 574 protruding from the clamp portion 573. Additionally, each handle portion 574 includes a hole 575 configured to hang or mount the standard bulldog clip 531. The diameter $d_b$ of the hole 575 in the handle portions 574 is slightly smaller than the diameter $d_h$ of the head portion 541 of the mounting post 537 and substantially equal to the diameter $d_s$ of the cylindrical shaft portion 538 of the mounting post 537 and the diameter $d_c$ of the hole 557 in the cover 533, the significance of which is explained below.

To assemble the standard bulldog clip 531, the handle portions 574 are inserted through the narrow horizontal slit 566 and into a corresponding one of the rectangular openings 567, 568. When the handle portions 574 are inserted through the rectangular openings 567, 568, the clamp portions 573 protrude outward from the horizontal slit 566 in the cylindrical tube 565. Additionally, the narrow horizontal slit 566 is naturally biased in a closed position such that the clamp portions 573 are in direct contact and the handle portions 574 are spaced apart, as shown in FIGS. 10A-10C. To open the standard bulldog clip 531, the user compresses the handle portions 574 towards each other which causes the narrow horizontal slit 566 to circumferentially expand and the clamp portions 573 to separate. In the open position, the user can insert a plurality of papers or other articles between the spaced apart clamp portions 573. To close the standard bulldog clip 531, the user releases the handle portions 574, and the restorative force supplied by the elastically deformed cylindrical tube 565 causes the clamp portions 573 to close and thereby secure the articles.

To assemble and use the bulldog clip accessory 530, the standard bulldog clip 531 is attached to the cover binder clip 533 by inserting one of the handle portions 574 of the standard bulldog clip 531 into the horseshoe-shaped channel 558 in the cover binder clip 533. When one of the handle portions 574 of the standard bulldog clip 531 is inserted into the channel 558, the horseshoe-shaped flange 554 on the cover binder clip 533 surrounds a portion of the handle 574, as shown in FIG. 10A. The hole 575 in the handle portion 574 is then co-axially aligned with the hole 557 in the cover binder clip 533. The mounting post 537 on the back binder clip 532 is then co-axially aligned with the holes 557, 575 in the cover binder clip 533 and the bulldog clip 531, respectively, and then the mounting post 537 is pressed through the holes 557, 575. As the jaws 544, 545 of the mounting post 537 are pushed through the holes 557, 575, larger diameter $d_h$ hemispherical head portion 541 of the mounting post 537 contacts the relatively smaller diameters $d_c$, $d_b$ of the holes 557, 575 in the cover binder clip 533 and the standard bulldog clip 531, respectively, thereby elastically compressing the jaws 544, 545 toward each other. After the head portion 541 of the mounting post 537 has passed through the holes 557, 575 in the cover 533 and the bulldog clip 531, respectively, the jaws 544, 545 return to their naturally biased spaced apart position. In this position, the shoulder portion 542 of the mounting post 537 overlaps a portion of the standard bulldog clip 531, thereby securing the bulldog clip 531 and the cover binder clip 533 to the back binder clip 532, as shown in FIG. 10A. If subsequent removal of the standard bulldog clip 531 from the bulldog clip accessory 530 is desired, the user can compress the jaws 544, 545 toward each other and then draw the mounting post 537 out of the hole 575 in the handle portion 574 of the bulldog clip 531. In one embodiment, the cover binder clip 533 and the back binder clip 532 are joined together to form a unitary bulldog clip accessory 530, such as by ultrasonic welding, friction stir welding, radio frequency (RF) welding, adhesive, or mechanical fasteners (e.g., snap-fit mechanisms).

Figure 10E:
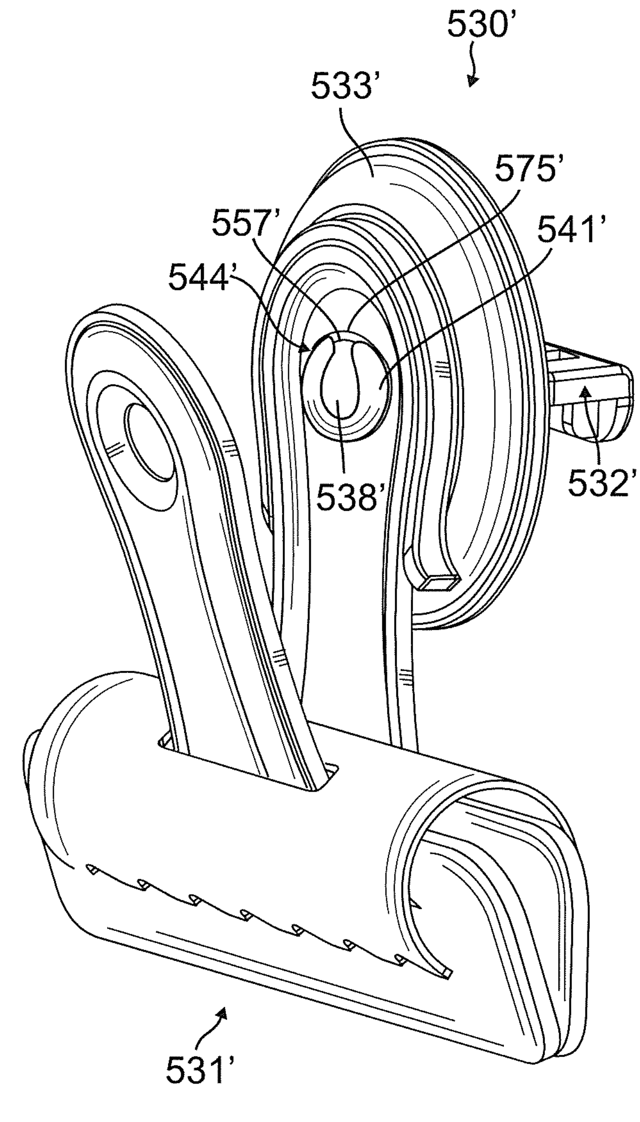
FIG. 10E is a top front left perspective view of an embodiment of a bulldog clip accessory having a heat staked portion engaging a standard bulldog clip.

In an alternate embodiment illustrated in FIG. 10E, a bulldog clip accessory 530' is configured to support a standard bulldog clip 531' and a plurality of papers secured thereto. Similar to the bulldog clip accessory 530 described above, the bulldog clip accessory 530' includes a cover binder clip 533' and a back binder clip 532'. In the embodiment of the bulldog clip accessory 530' illustrated in FIG. 10E, the back binder clip 532' includes a cylindrical protrusion 538' configured to pass through holes 557' and 575' in the cover binder clip 533' and the standard bulldog clip 531', respectively. After a portion of the cylindrical protrusion 538' has passed through holes 557' and 575', the cylindrical protrusion 538' is heat staked. Heat staking the cylindrical protrusion 538' on the back binder clip 532' plastically deforms the cylindrical protrusion 538' and forms an annular lip 541' on the cylindrical protrusion 538' which overlaps the hole 575' in the standard bulldog clip 531' and thereby secures the cover binder clip 533' and the standard bulldog clip 531' to the back binder clip 532'.

Figure 11B:
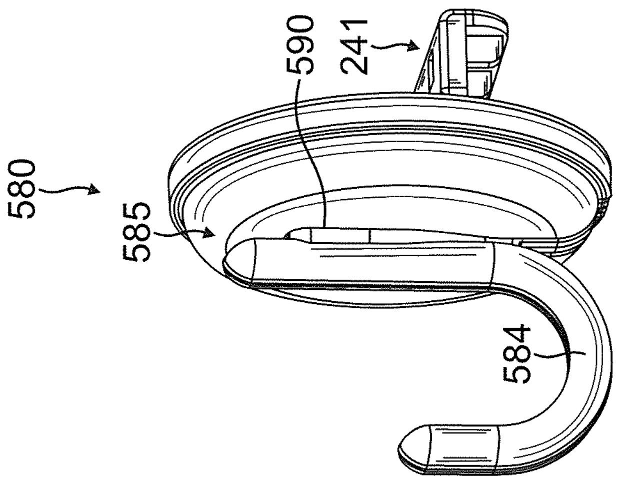
FIGS. 11A and 11B are top rear left and top front left perspective views, respectively, of an embodiment of a hook accessory.
Figure 11A:
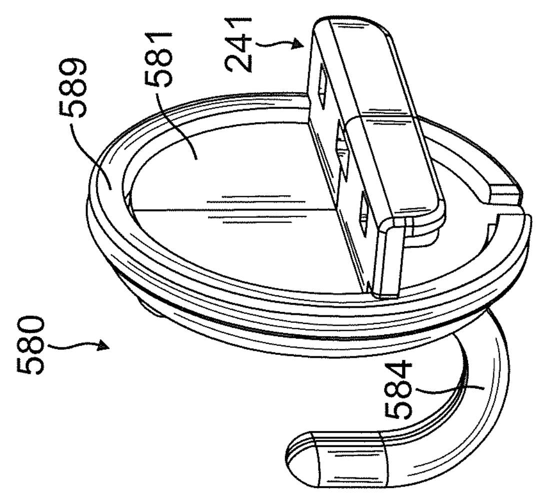
Figure 11C:
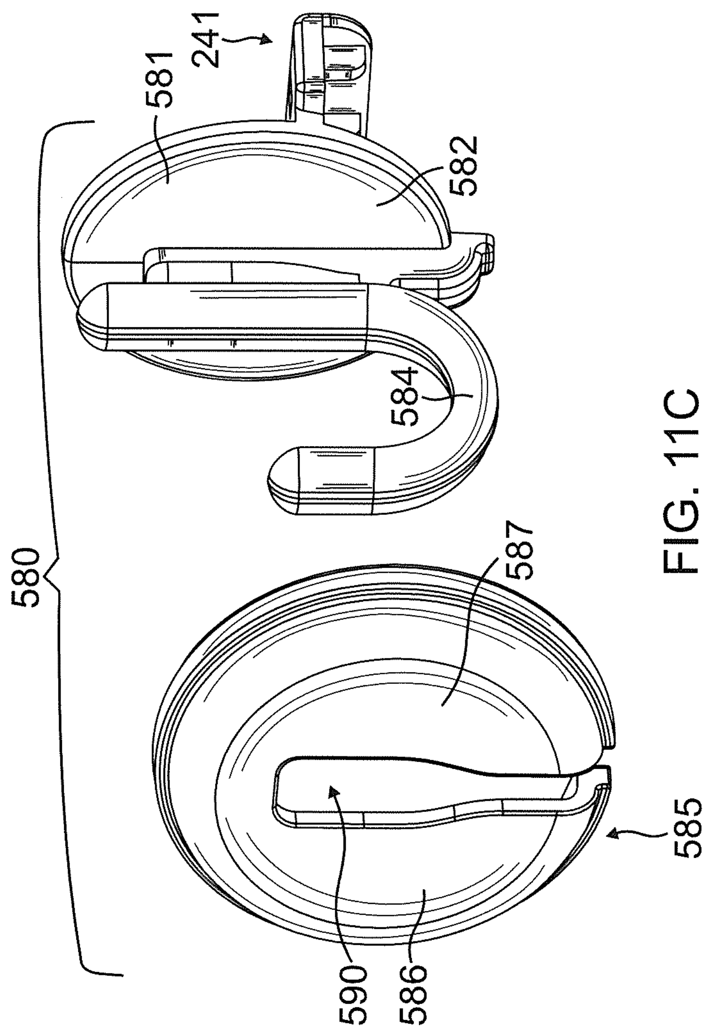
FIGS. 11C and 11D are top front and top rear perspective exploded views, respectively, of the hook accessory shown in FIGS. 11A and 11B.
Figure 11D:
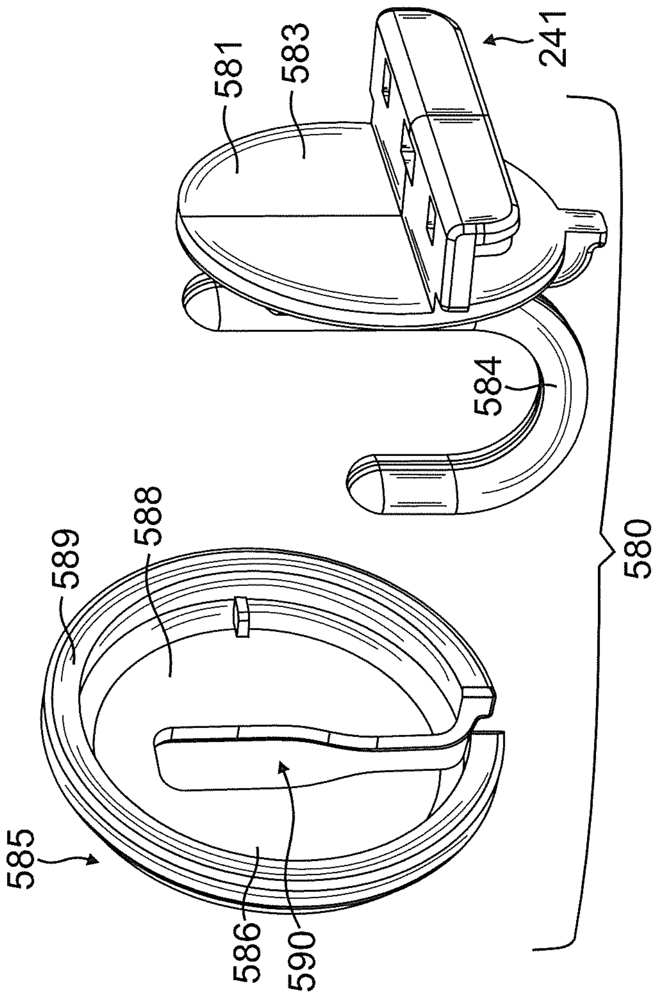

With reference now to FIGS. 11A-11D, a hook accessory 580 configured to support a variety of desktop items is illustrated. The hook accessory 580 includes a disk 581 having opposing front and rear surfaces 582, 583, a J-shaped hook 584 protruding forward from the front surface 582 of the disk 581, and one interlock receptacle 241 projecting rearward from the rear surface 583 of the disk 581. The interlock receptacle 241 is configured to receive an interlock connector 240 for detachably securing the hook accessory 580 to the panel 102, as described above. In the illustrated embodiment, the J-shaped hook 584 is oriented vertically, although the J-shaped hook 584 can have other orientations (e.g., horizontal) depending upon the types of desktop items the hook accessory 580 is configured to support. The hook accessory 580 also includes a cover 585 configured to attach to the disk 581. The cover 585 includes a flat circular portion 586 having front and rear surfaces 587, 588, respectively, and an annular flange portion 589 projecting rearward from the rear surface 588 of the circular portion 586. The cover 585 also includes a slot 590 extending radially from the annular flange 589 and through a portion of the flat circular portion 586 of the cover 585. When the cover 585 is attached to the disk 581, the annular flange 589 surrounds the disk 581 and the J-shaped hook 584 extends through the slot 590 in the cover 585, as shown in FIG. 11B. In one embodiment, the cover 585 and the disk 581 are joined together to form a unitary hook accessory 580, such as by ultrasonic welding, friction stir welding, radio frequency (RF) welding, adhesive, or mechanical fasteners (e.g., snap-fit mechanisms).

Figure 12C:
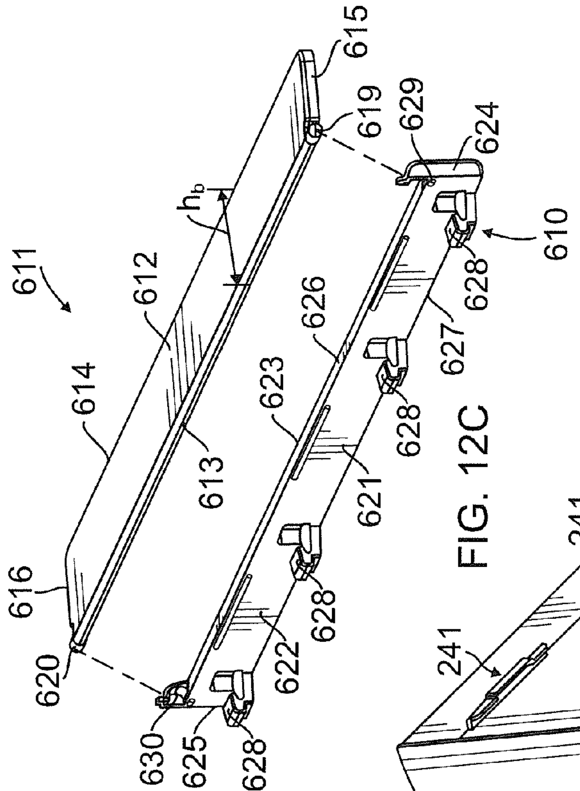
FIG. 12C is an exploded view of the baffle and the connector plate shown in FIGS. 12A and 12B.
Figure 12B:
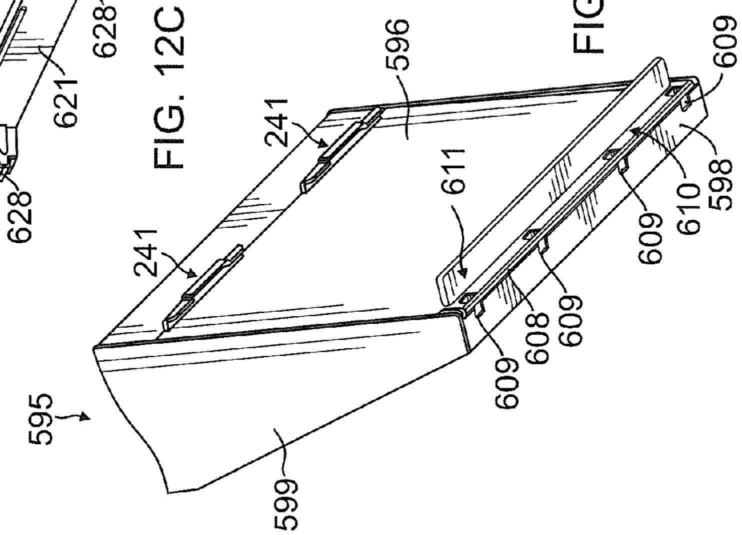
FIGS. 12A and 12B are a top rear left perspective view and a bottom rear left perspective view, respectively, of an embodiment of a document holder accessory having a baffle and a connector plate.
Figure 12A:
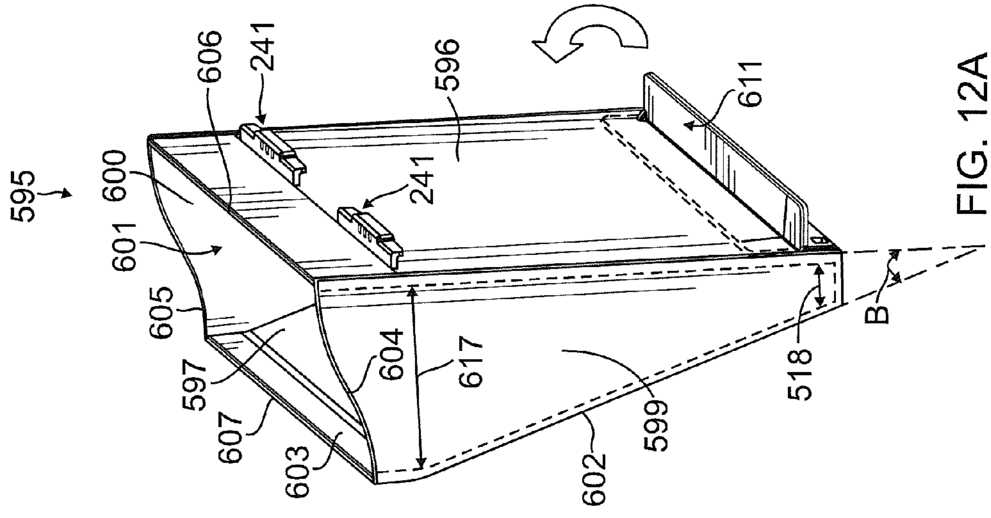

With reference now to FIGS. 12A and 12B, a document holder accessory 595 configured to house a plurality of desktop items is illustrated. The document holder accessory 595 includes a back panel 596, a front panel 597, a bottom panel 598, and a pair of opposing side panels 599, 600 extending between the back, front, and bottom panels, 596, 597, 598, respectively. Together, the panels 596, 597, 598, 599, 600 define a cavity 601 having a wedge-shaped transverse cross-section configured to house the plurality of desktop items. In the illustrated embodiment, the back panel 596 includes two interlock receptacles 241 configured to receive two interlock connectors 240 for detachably securing the document holder accessory 595 to the panel 102, as described above.

With continued reference to FIGS. 12A and 12B, a lower portion 602 of the front panel 597 is angled at an angle β relative to the back panel 596 (e.g., between approximately 15° and approximately 60°) and an upper portion 603 of the front panel 597 is substantially parallel to the back panel 596. Accordingly, an upper portion 617 of the cavity 601 is wider than a lower portion 618 of the cavity 601. The angled front panel 597 tends to tilt the various desktop items forward toward the user (i.e., away from the panel 102 on which the document holder accessory 595 is secured) to facilitate convenient retrieval of the various desktop items stored in the document holder accessory 595. Additionally, the back panel 596 extends above the front panel 597, and upper edges 604, 605 of the side panels 599, 600, respectively, have a wavelike profile tapering between an upper edge 606 of the higher back panel 596 and an upper edge 607 of the relatively lower front panel 597. Providing a lower front panel 597 also can facilitate retrieval of the various desktop items stored in the document holder accessory 595. In the illustrated embodiment of FIG. 12B, a lower edge 608 of the back panel 596 includes four equally spaced notches 609, the purpose of which is explained below.

With reference now to FIGS. 12A-12C, the notches 609 on the lower edge 608 of the back panel 596 are configured to receive a connector plate 610 and a baffle 611 rotatably connected to the connector plate 610. The connector plate 610 and baffle 611 are configured to maintain the document holder accessory 595 in a vertical orientation when the accessory 595 is secured to a lower slat 215 on the panel 102, as described in detail below.

With reference to FIG. 12C, the baffle 611 is a thin rectangular plate 612 having opposing front and rear edges 613, 614, respectively, and opposing side edges 615, 616. The baffle 611 also includes a pair of cylindrical posts 619, 620 extending outward from the opposing side edges 615, 616, respectively. The cylindrical posts 619, 620 are aligned with the front edge 613 of the rectangular plate 612. Similarly, the connector plate 610 is a thin rectangular plate 621 having opposing front and rear surfaces 622, 623, opposing sides 624, 625, and opposing upper and lower edges 626, 627, respectively. The connector plate 610 also includes four equally spaced fingers 628 projecting forward from the front surface 622 of the rectangular plate 621. The four fingers 628 are configured to extend into the notches 609 along the lower edge 608 of the back panel 596, thereby securing the connector plate 610 to the back panel 596. When the fingers 628 on the plate 612 are received in the notches 609 in the back panel 596, the front surface 622 of the plate 621 abuts the back panel 596 of the document holder accessory 595, as shown in FIGS. 12A and 12B. The upper edge 626 of the connector plate 610 also includes a pair of opposing cylindrical recesses 629, 630 along the opposing sides 624, 625, respectively, the significance of which is explained below.

To assemble and use the baffle 611 and connector plate 610, the cylindrical posts 619, 620 on the baffle 611 are inserted into the cylindrical recesses 629, 630 in the connector plate 610. The baffle 611 is configured to rotate within the cylindrical recesses 629, 630 between a disengaged position (shown in broken lines in FIG. 12A) parallel with the back panel 596 and an engaged position (shown in solid lines in FIG. 12A) orthogonal to the back panel 596. In the engaged position, the rear edge 614 of the baffle 611 is configured to contact the wall 173 on which the panel 102 is mounted, as illustrated in FIG. 15. Additionally, the height $h_b$ of the baffle 611 is substantially equal to the combined, assembled thickness $t_a$ of the face panel 103, middle panel 104, and the mount 101, shown in FIG. 7C. That is, the height $h_b$ of the baffle 611 is substantially equal to the distance $t_a$ between the wall 173 and the vertical face panel 218 of the slats 215 on the panel 102.

When the document holder accessory 595 is secured to a lower slat 215 on the panel 102 such that the lower edge 608 of the back panel 596 of the accessory 595 hangs below a lower edge 710 of the panel 102 (shown in FIG. 15), the lower edge 608 of the accessory 595 tends to rock backwards and contact the wall 173 on which the panel 102 is mounted. Accordingly, the connector plate 610 and baffle 611 are provided to maintain the appropriate distance between the lower edge 608 of the document holder accessory 595 and the wall such that the accessory 595 is vertically oriented even when the accessory 595 is attached to a lower slat 215 on the panel 102. Specifically, when the accessory 595 is attached to a lower slat 215 on the panel 102 such that the lower edge 608 of the accessory 595 extends below the lower edge 710 of the panel 102 (see FIG. 15), the baffle 611 can be rotated into the engaged position (shown in solid lines in FIGS. 12A and 12B) such that the baffle 611 engages the wall 173 and thereby maintains the vertical orientation of the accessory 595. However, when the document holder accessory 595 is secured to a sufficiently high slat 215 on the panel 102 such that the lower edge 608 of the back panel 596 of the accessory 595 does not extend below the lower edge 710 of the panel 102, the baffle 611 can be moved into the disengaged position (i.e., parallel to the connector plate 610, as shown in broken lines in FIG. 12A) because the back panel 596 of the accessory 595 will abut the vertical face panels 218 of the slats 215, thereby maintaining the vertical orientation of the document holder accessory 595.

Figure 13A:
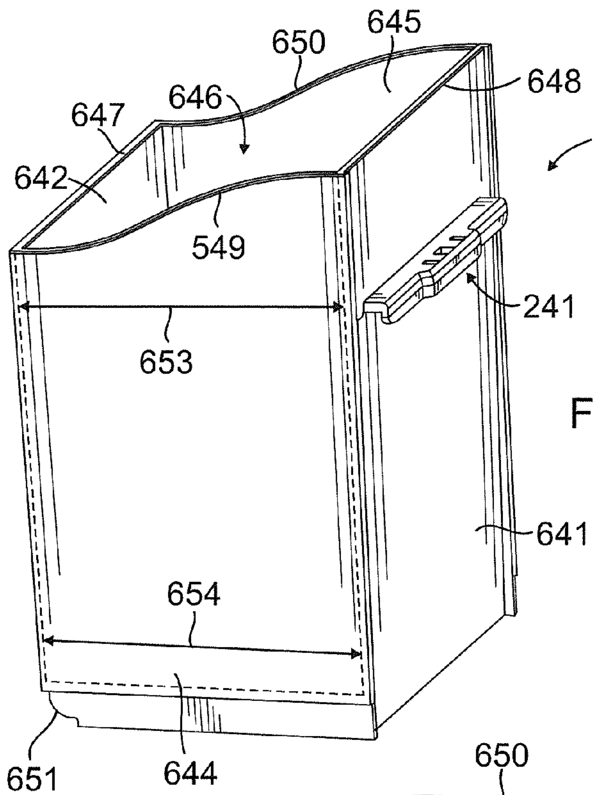
FIGS. 13A and 13B are a top rear left perspective view and a bottom front right perspective view, respectively, of an embodiment of a bin accessory.
Figure 13B:
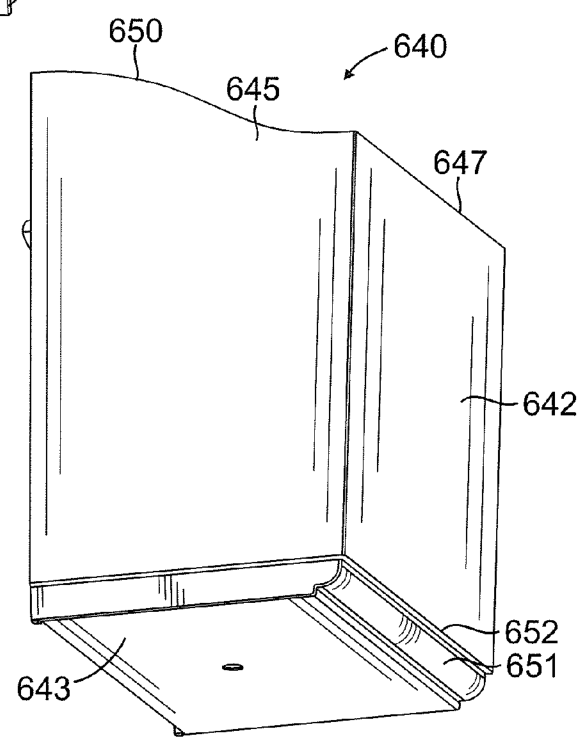

With reference now to FIGS. 13A and 13B, a bin accessory 640 configured to house a plurality of desktop items is illustrated. The bin accessory 640 includes a back panel 641, a front panel 642, a bottom panel 643, and a pair of opposing side panels 644, 645 extending between the back, front, and bottom panels 641, 642, 643, respectively. Together, the panels 641, 642, 643, 644, 645 define a cavity 646 having a U-shaped transverse cross-section configured to house the plurality of desktop items. In the illustrated embodiment, the back panel 641 includes one interlock receptacle 241 configured to receive an interlock connector 240 for detachably securing the bin accessory 640 to the panel 102, as described above. In the illustrated embodiment, an upper edge 647 of the front panel 642 is lower than an upper edge 648 of the back panel 641, which facilitates convenient retrieval of the various desktop items stored in the bin accessory 640. In one embodiment, the front panel 642 can be angled slightly away from the back panel 641 (e.g., between approximately 15° and 30°) such that an upper portion 653 of the cavity 646 is wider than a lower portion 654 of the cavity 646. Angling the front panel 642 away from the back panel 641 can facilitate retrieval of the various desktop items stored in the cavity 646. Additionally, in the illustrated embodiment, upper edges 649, 650 of the side panels 644, 645, respectively, have a scalloped or wavelike profile tapering between the upper edge 648 of the higher back panel 641 and the upper edge 647 of the relatively lower front panel 642. Additionally, the bin accessory 640 can include a bevel 651 extending along a lower edge 652 of the front panel 642.

Figure 13C:
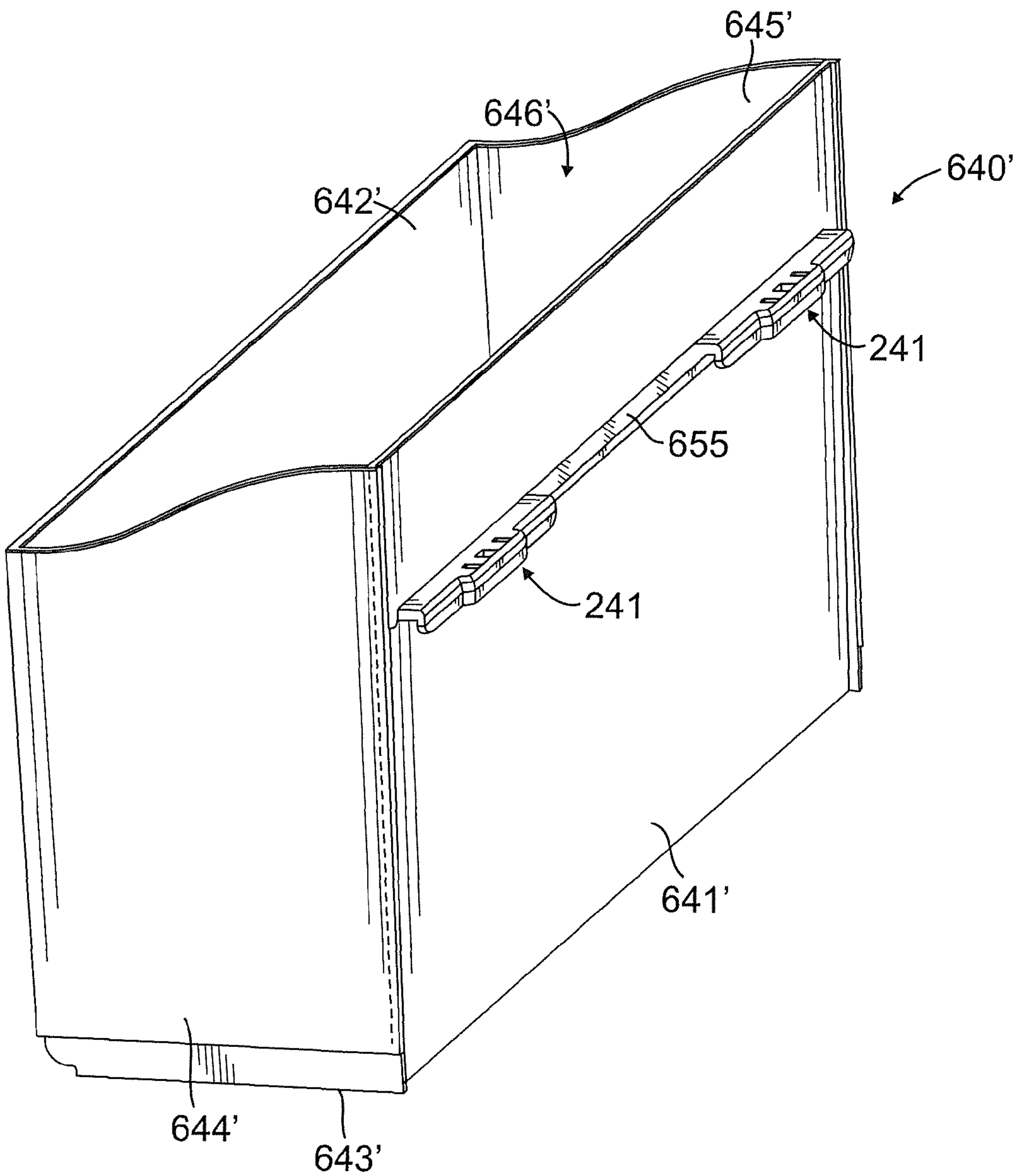
FIG. 13C is a top rear left perspective view of another embodiment of a bin accessory.

With reference now to FIG. 13C, an alternate embodiment of a bin accessory 640' configured to house a plurality of desktop items is illustrated. Similar to the bin accessory 640 described above, the bin accessory 640' includes a front panel 642', a bottom panel 643', and a pair of opposing side panels 644', 645' extending between the back, front, and bottom panels 641', 642', 643', respectively. Together, the panels 641', 642', 643', 644', 645' define a cavity 646' having a U-shaped transverse cross-section configured to house the plurality of desktop items therein. In the illustrated embodiment, the back panel 641' of bin accessory 640' is wider than the back panel 641 of bin accessory 640 (see FIG. 13A) and the back panel 641' includes two spaced apart interlock receptacles 241 configured to receive two interlock connectors 240 for detachably securing the bin accessory 640' to the panel 102, as described above. In the illustrated embodiment, the two interlock receptacles 241 are joined by a flange 655 extending between the two interlock receptacles 241, although in alternate embodiments the bin accessory 640' may be provided without the flange 655.

With reference now to FIGS. 14A-14H, the process of attaching a plurality of wall systems 100 to a wall 173 and subsequently removing the panels 102 from the mounts 101 will be described. To install and use one or more wall systems 100, the mount 101' of the first wall system 100' (see FIG. 14F) is disposed against the desired wall 173 with limited pressure, such that the bumpers 125 contact the wall and thereby prevent premature and inadvertent adhesion of the adhesive backing layer 171 of the hook-and-loop fasteners 120 to the wall 173. Using the markings 170 (e.g., arrow-shaped debosses) on the front surface 107 of the mount 101' (shown in FIG. 14A), the mount 101' is first moved into the proper orientation such that the leg 108 of the mount 101' is oriented facing upward. Using the level 168 mounted to the front surface 107 of the mount 101', the mount 101' is moved with slight pressure against the wall 173 until it is positioned in the desired location and orientation. With the mount 101' in the desired location and orientation on the wall 173, sufficient pressure is supplied against the mount 101', which causes the free ends of the bumpers 125 to elastically deflect forward and the adhesive backing layer 171 of the hook-and-loop fasteners 120 to be drawn into direct contact with the wall 173, as illustrated in FIG. 14C. In this manner, the hook-and-loop fasteners 120 retain the first mount 101' against the wall 173. If additional fastening elements are desired to increase the load-bearing capacity of the wall system 100', fasteners 136 (e.g., nails, or screws) are inserted through the angled standoffs 135 on the mount 101' and into the wall 173, as shown in FIG. 5C. As described above, the standoffs 135 can be angled at an oblique angle (e.g., 45 degrees) such that the fasteners 136 enter the wall 173 downward at the oblique angle (e.g., 45 degrees) to maximize the load-bearing capacity of the mount 101'.

After the first mount 101' is installed to the wall surface in the manner set forth in detail above, additional mounts 101", 101'" can be similarly secured to the wall adjacent to the first mount 101', as shown in FIGS. 14A and 14B. The additional mounts 101", 101'" can be disposed directly above, below, or beside the first mount 101', or at any other desired location along the wall. In the illustrated embodiment of FIGS. 14A and 14B, the first mount 101' is disposed directly beside a second mount 101", and the second mount 101" is disposed directly above a third mount 101'". It will be appreciated that the flat sides of the mount 101' permit the user to directly align subsequent mounts 101", 101'" on the wall 173 relative to the first mount 101'. That is, the flat sides of the mount 101' permit the user to directly abut adjacent mounts 101" and 101'" to the first mount 101' such that the various wall mounts 101', 101", and 101'" can be arranged in a seamless and continuous manner, as illustrated in FIGS. 14A and 14B.

Additionally, as mentioned above, each mount 101', 101", 101'" includes vertical tabs 166 and horizontal tabs 167 in each of the corners 121, 122, 123, 124 of the mounts 101', 101", 101'". The vertical tabs 166 are configured to provide a visual cue that the user can use to ensure proper lateral alignment between two or more mounts 101", 101'" installed directed above one another (i.e., the user can align the vertical tabs 166 on mount 101" with the vertical tabs 166 on mount 101'" to ensure that the mounts 101", 101'" are laterally aligned along the wall 173). Similarly, the horizontal tabs 167 are configured to provide a visual cue that the user can use to ensure proper vertical alignment between two or more mounts 101', 101" installed directed next to one another (i.e., the user can align the horizontal tabs 167 on mount 101' with the horizontal tabs 167 on mount 101" to ensure that the mounts 101", 101'" are vertically aligned on the wall 173).

Figure 14E:
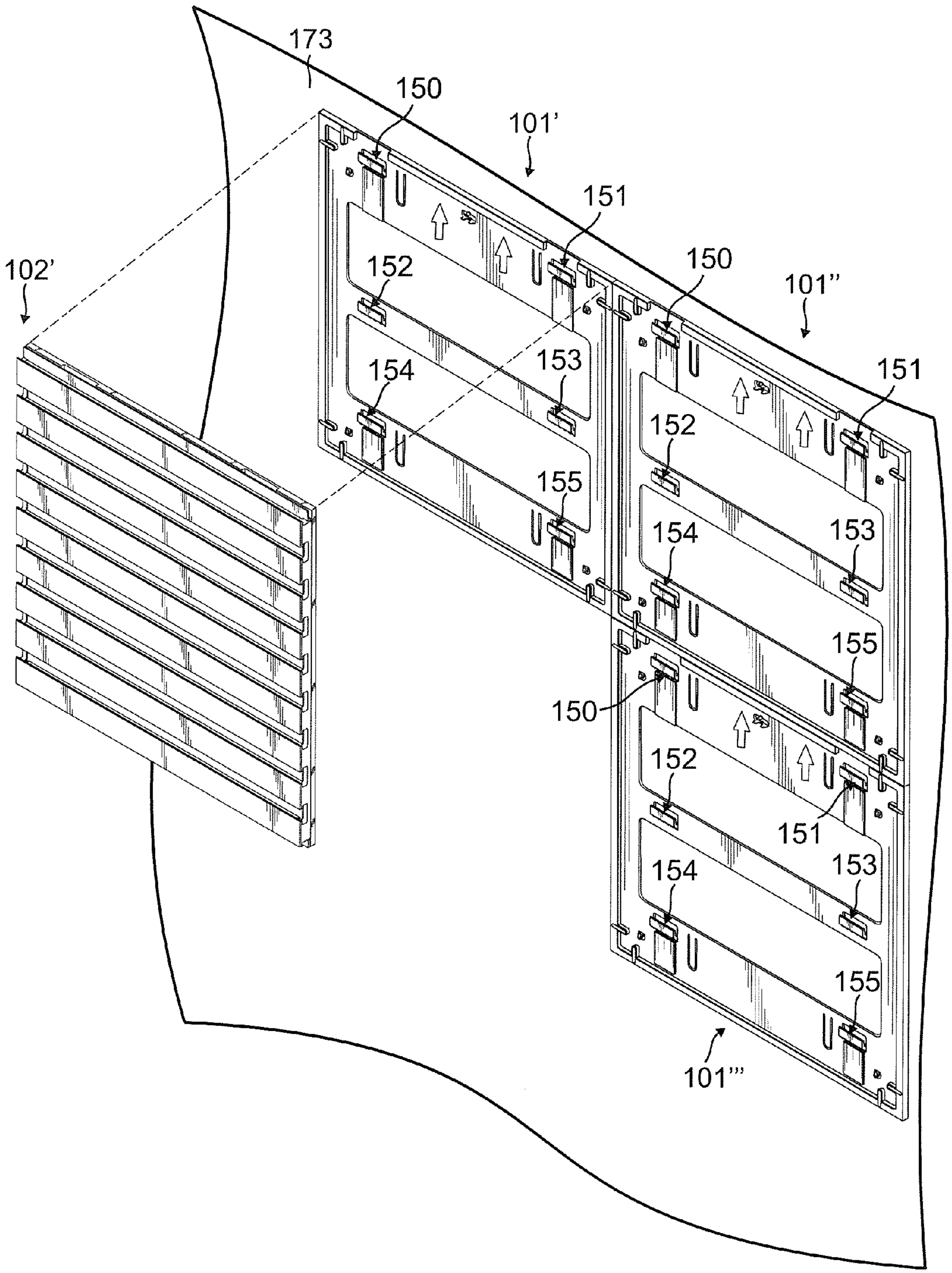
FIG. 14E is a top front left perspective view of the plurality of mounts mounted to the wall, as shown in FIG. 14A, and a face panel and a middle panel being attached to one of the mounts.

As illustrated in FIG. 14E, to attach a first panel 102' (i.e., middle panel 104 connected to face panel 103) to the first mount 101', the user draws the panel 102' toward the mount 101' and positions the hook receptacles 195, 196, 197, 198, 199, 200 (see FIG. 3B) above the corresponding L-shaped hooks 150, 151, 152, 153, 154, 155 on the mount 101'. When the middle panel 104 is urged downward, the hook receptacles 195, 196, 197, 198, 199, 200 and the L-shaped hooks 150, 151, 152, 153, 154, 155 interlock such that the lip portions 157 of the hooks 150, 151, 152, 153, 154, 155 underlap the lip portions 208 on the hook receptacles 195, 196, 197, 198, 199, 200, as illustrated in FIG. 5C. This interlocking configuration between the L-shaped hooks 150, 151, 152, 153, 154, 155 on the mount 101' and the inverted L-shaped hook receptacles 195, 196, 197, 198, 199, 200 on the middle panel 104 detachably secures the panel 102' to the mount 101'. Additionally, when the panel 102' is attached to the mount 101', the tabs 210 on the hook receptacles 195, 196, 197, 198, 199, 200 extend into the depressions 160 on the hooks 150, 151, 152, 153, 154, 155 of the mount 101'.

Figure 14F:
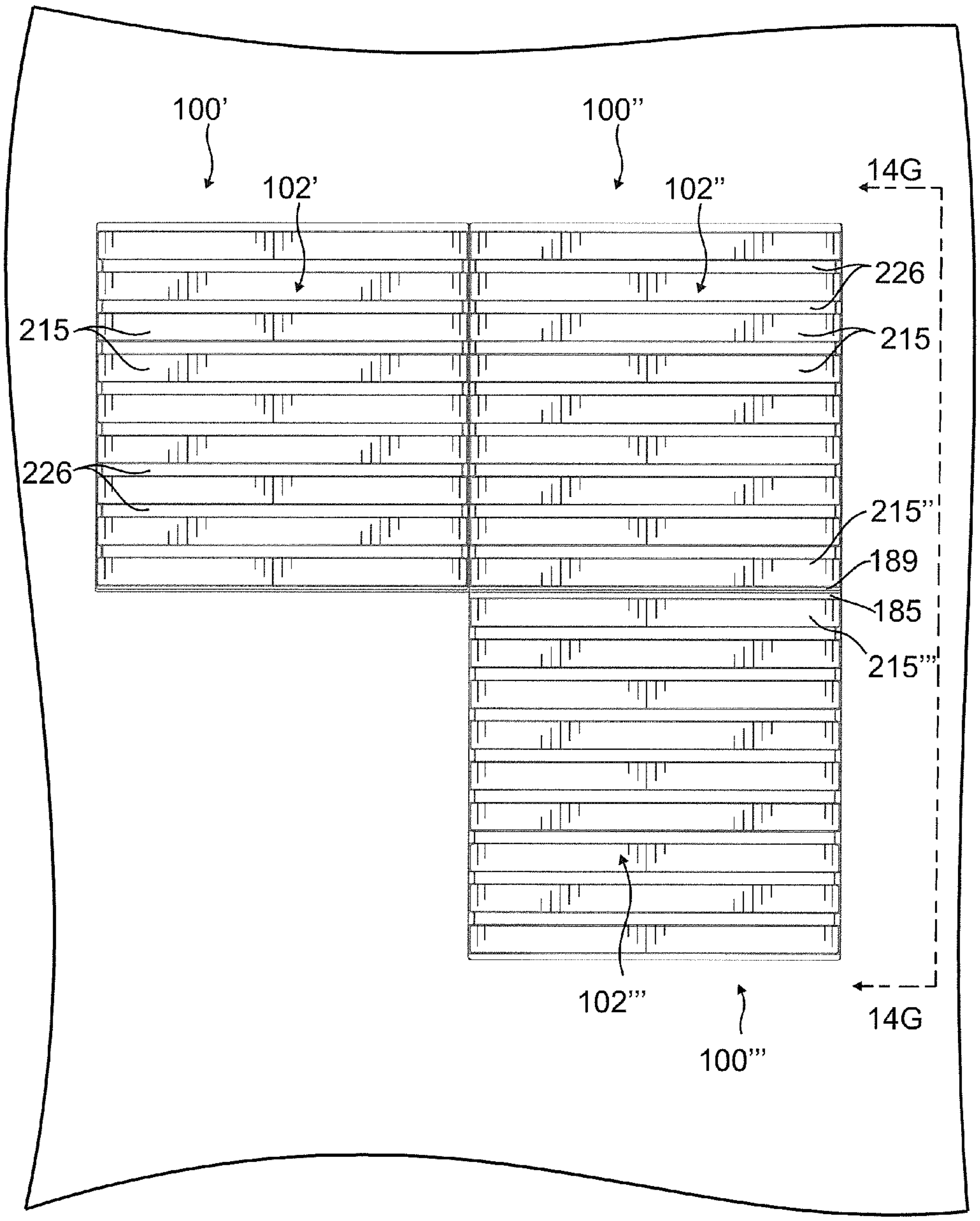
FIG. 14F is a front view of a plurality of wall systems mounted to a wall.

After the first panel 102' is installed to the first mount 101' in the manner set forth in detail above, second and third panels 102", 102'" can be similarly secured to the second and third mounts 101", 101', as shown in FIG. 14F. Specifically, panels 102", 102'" of wall systems 100", and 100'", respectively, can be detachably secured to the corresponding mounts 101", 101'" by drawing the panels 102", 102'" toward the mounts 101", 101'" and lowering the panels 102", 102'" onto the upturned hooks 150, 151, 152, 153, 154, 155 (see FIG. 14A) on the mounts 101", 101'" such that the hooks 150, 151, 152, 153, 154, 155 engage the corresponding hook receptacles 195, 196, 197, 198, 199, 200 on the panels 102", 102'" (see FIG. 5C).

With continued reference to FIG. 14F, and as described above with reference to FIGS. 3A and 3B, the upper and lower flanges 185, 189, respectively, on the middle panel 104 are configured to ensure that the spacing between the lowermost slat 215" on panel 102" and the uppermost slat 215'" on panel 102'" disposed directly below panel 102" is substantially the same as the spacing between any two adjacent slats 215 on either of the panels 102", 102'". That is, the height of the upper and lower flanges 185, 189 on the middle panel 104 maintains the spacing between adjacent slats 215 on wall systems 100", 100'" disposed directly above one another.

Figure 14G:
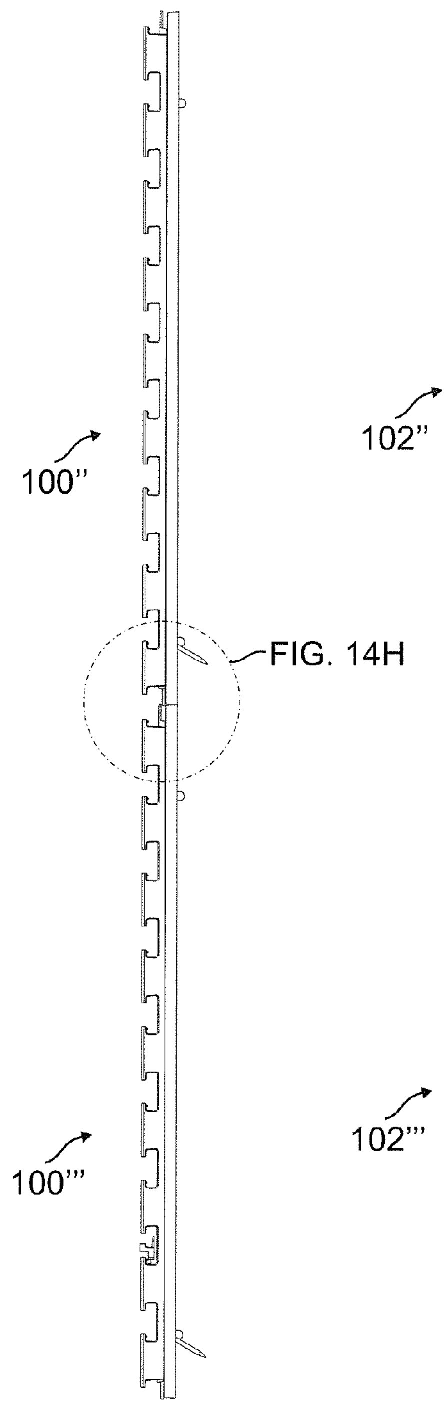
FIG. 14G is a side view of the plurality of wall systems mounted to the wall shown in FIG. 14F, showing one wall system mounted directly above another wall system.
Figure 14H:
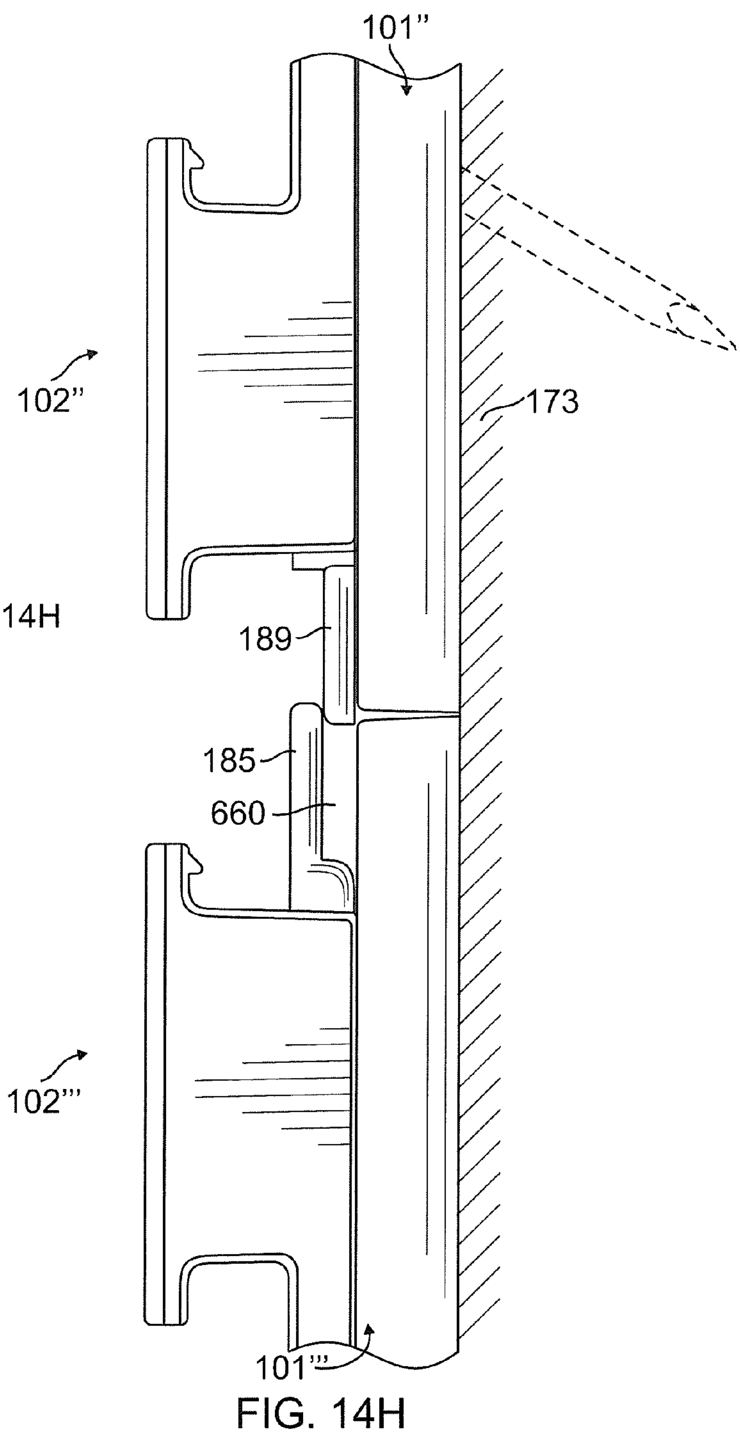
FIG. 14H is an enlarged, partial view of the plurality of wall systems mounted to the wall shown in FIG. 14G.

With reference now to FIGS. 14F-14H, the process for removing panel 102'" from the corresponding mount 101'" will be described. As illustrated in FIG. 14H, the upper and lower flanges 185, 189, respectively, on the middle panels 104 are offset such that the upper flange 185 on panel 102'" is spaced farther away from the wall 173 than the lower flange 186 on panel 102". Accordingly, when one wall system 100'" is disposed directly below another wall system 100", as illustrated in FIGS. 14F-14H, the offset upper and lower flanges 185, 189, respectively, on the middle panel 104 define a clearance gap 660 therebetween (see FIG. 14H). The clearance gap 660 between the upper and lower flanges 185, 189 facilitates the removal of panel 102'" without having to remove any adjacent panels. Specifically, panel 102'" illustrated in FIG. 14H can be detached from the corresponding mount 101'" by urging panel 102'" upwards such that the upper flange 185 on panel 102'" overlaps the lower flange 189 on panel 102" without contacting the lower flange 189 on panel 102" (i.e., the lower flange 189 on panel 102" extends into the clearance gap 660 when panel 102'" is urged upwards). The upward displacement of panel 102'" disengages the hooks 150, 151, 152, 153, 154, 155 on the mount 101'" from the corresponding hook receptacles 195, 196, 197, 198, 199, 200 on the middle panel 104, and therefore panel 102'" can be drawn away from the corresponding mount 101'" on the wall. Accordingly, the modular construction of the wall systems 100', 100", 100'" (i.e., the ease in separating each panel 102', 102", 102'" from its corresponding mount 101', 101", 101' without having to remove or adjust any other panels 102', 102", 102'" on the wall) enables the user to easily remove the panels 102', 102", 102'", such as for cleaning, or to replace the panels 102', 102", 102'" with panels having alternate styles, sizes, or functions.

With the mounts 101', 101", 101'" arranged on the wall 173 and the corresponding panels 102', 102", 102'" detachably secured thereto, one or more accessories (300, 365, 372, 515, 530, 580, 595, 640, 640' in FIG. 15) each having at least one interlock receptacle 241 configured to receive the interlock connector 240 can be detachably secured to one or more of the channels 226 between adjacent slats 215 on the panels 102', 102", 102'" to facilitate the storage, display, and/or organization of the various desktop items supported by the accessories. It will be appreciated that the modular construction of the wall systems 100', 100", 100'", the ability to readily modify the function of each wall system 100', 100", 100'" by replacing the panels 102', 102", 102'" with other panels having different configurations or functions, and the various types of accessories (e.g., bin, hook, and bulldog clip accessories) configured to connect to the panels 102', 102", 102'" provide a high level of design flexibility and customization capabilities. Further customization can be achieved by selecting the appropriate accessory (e.g., bin accessory, hook accessory, shelf accessory, etc.) depending upon the nature and volume of desktop items the user desires to store and organize on the panel. Thus, it will be appreciated that the user can arrange multiple modular wall systems 100', 100", 100'", some of which can differ in size, style, and functionality (e.g., slatted wall, dry erase board), to create a customized wall organization system designed to store, mount, and organize the specific desktop items of the user. Furthermore, once an array of wall systems 100', 100", 100'" has been installed on the wall 173, the user can modify the overall system by relocating the mounts 101', 101", 101'", replacing one or more of the panels 102', 102", 102'" with alternate style panels, and/or attaching and/or detaching various desktop organization accessories to the panels 102', 102", 102'".

Figure 17A:
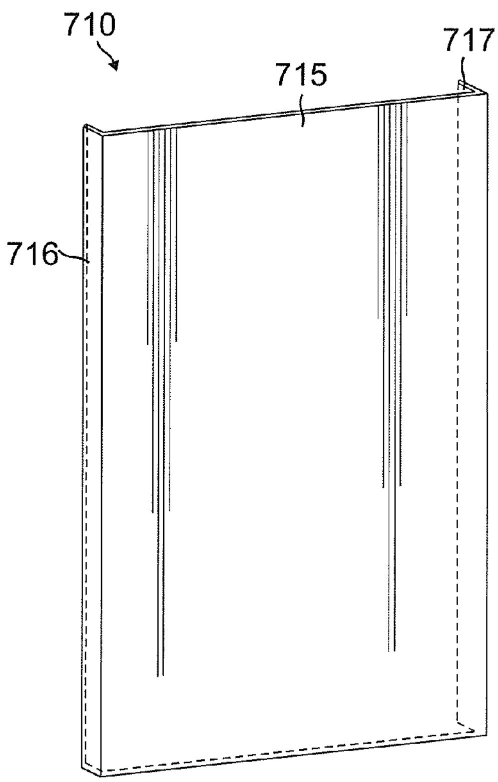
FIGS. 17A and 17B are front and rear perspective views, respectively, of a face panel having non-slatted design according to an embodiment of the invention.
Figure 17B:
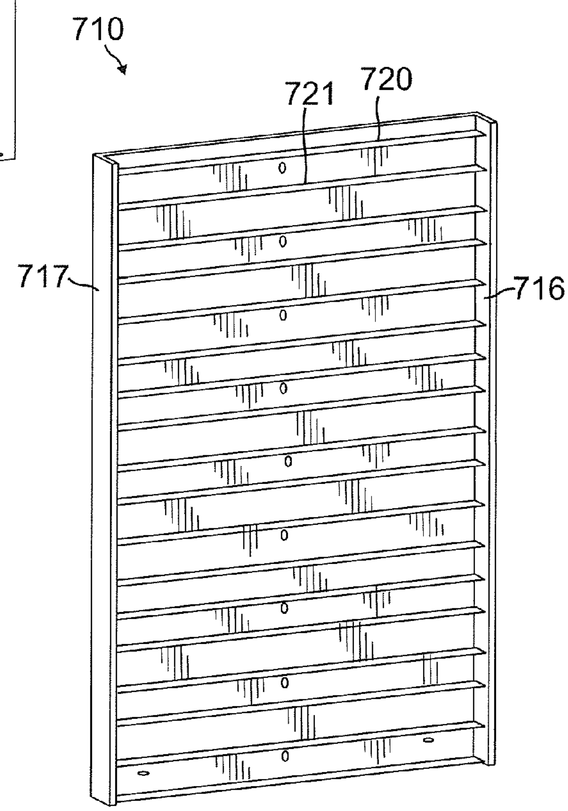

Referring now to FIG. 15, an array of wall systems of the type described in detail above is illustrated. In the illustrated embodiment, the arrangement includes two wall systems 700, 701 having a dry erase board, push pin board, or cork board (or other non-slatted design) and three wall systems 702, 703, 704 having a slatted panel design, as described above. As illustrated in FIGS. 17A and 17B, the non-slatted wall systems 700, 701 include a non-slatted face panel 710 (e.g., a mirror, cork board, dry erase board, push pin board, etc.) having a generally flat rectangular surface 715 extending between opposing side walls 716, 717. Additionally, the non-slatted face panel 710 includes a plurality of spaced apart legs 720, 721 extending generally orthogonally rearward from the flat rectangular surface 715. The legs 720, 721 are configured to engage the opposing lower and upper slat rails 178, 179, respectively, of each slat 175 on the middle panel 104, as described above with reference to FIG. 5C, to couple the non-slatted face panel 710 to the middle panel 104 to form the non-slatted wall system 700. The three slatted wall systems 702, 703, 704 have a variety of accessories attached thereto, including a drawer shelf accessory 365 having two drawers 372 therein and a document holder accessory 595 attached to the first slatted wall system 702, a shelf accessory 300 having two containers 515 and a stapler 900 thereon and two bin accessories 640 of different sizes attached to the second slatted wall system 703, and a hook accessory 580, a bulldog clip accessory 530 and standard bulldog clip 531 securing a plurality of papers 901 attached thereto, and a bin accessory 640 attached to the third slatted wall system 704. Accordingly, it will be appreciated that by arranging a variety of wall systems in a particular configuration on a wall, and detachably securing various organization accessories thereon, a unique customized organization system is achieved.

While this invention has been described in detail with particular references to exemplary embodiments thereof, the exemplary embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims. Although relative terms such as "outer," "inner," "upper," "lower," "below," "above," "distal, "proximal" and similar terms have been used herein to describe a spatial relationship of one element to another, it is understood that these terms are intended to encompass different orientations of the various elements and components of the device in addition to the orientation depicted in the figures. Moreover, the figures contained in this application are not necessarily drawn to scale.

What is claimed is:

1. A system configured to couple to a wall, the system comprising:

a mount configured to be detachably coupled to the wall, the mount including a frame having opposing front and rear surfaces;

wherein the mount further includes:

at least one adhesive member coupled to the rear surface of the frame; and at least one movable bumper configured to bias rearward beyond the at least one adhesive member, the at least one bumper configured to pivot between an engaged position and a disengaged position wherein the bumper extends beyond the at least one adhesive member such that as the mount is coupled to the wall, the bumper is configured to pivot and the adhesive member is configured to be coupled to the wall; and a panel detachably coupled to the mount, the panel configured to detachably support at least one accessory.

2. The system of claim 1, wherein:

the at least one accessory includes a portion;

the panel includes a plurality of spaced apart horizontal slats;

the panel includes a plurality of channels defined by adjacent slats; and each of the plurality of channels are configured to detachably receive the portion of the at least one accessory.

3. The system of claim 1, wherein:

the mount further includes at least one hook protruding forward from the front surface of the frame;

the panel further includes at least one corresponding hook receptacle; and the at least one hook is detachably engageable with the at least one corresponding hook receptacle.

4. The system of claim 3, wherein:

the at least one hook includes a depression;

the at least one corresponding hook receptacle includes a tab; and the depression is configured to receive the tab.

5. The system of claim 1, wherein the frame further includes at least one standoff protruding forward from the front surface of the frame, the standoff forming an oblique angle relative to the rear surface, and wherein the standoff is configured to receive a fastener configured to couple the mount to the wall.

6. The system of claim 1, wherein each of the at least one adhesive member includes a hook portion releasably engageable with a loop portion, wherein one of the hook and loop portions is coupled to the rear surface of the frame and the other is configured to be adhered to the wall.

7. The system of claim 1, wherein the at least one adhesive member includes transfer tape.

8. The system of claim 1, wherein the panel includes:

a middle panel including:

a plurality of horizontal slat rails, with adjacent horizontal slat rails spaced apart by a first distance; and a plurality of vertical support members interconnecting the plurality of horizontal slat rails; and a face panel joined to the middle panel, the face panel including:

a plurality of spaced apart slats, each slat including:

a vertical face panel having a generally flat front surface and a rear surface opposite the front surface; and a pair of legs spaced apart by a second distance, the legs extending orthogonally from the rear surface of the vertical face panel, wherein the second distance is substantially equal to the first distance.

9. The system of claim 8, wherein at least a portion of each of the plurality of vertical face panels overhangs the corresponding pair of legs wherein the overhanging portions of the vertical face panels define a top lip and a bottom lip opposite the top lip.

10. The system of claim 9, wherein the face panel further includes a plurality of lobes projecting rearward from the top lip.

11. The system of claim 1, wherein the panel includes a face panel selected from the group consisting of a dry erase board, a push pin board, a magnetic surface, and a mirror.

12. The system of claim 1, wherein the mount further includes a level that is coupled to the frame.

13. The system of claim 1, wherein the panel further includes:

an upper edge;

a lower edge;

an L-shaped flange disposed on the upper edge of the panel configured to be spaced apart from the mount by a first distance;

an inverted L-shaped flange on the lower edge of the panel configured to be spaced apart from the mount by a second distance; and wherein the first distance is greater than the second distance.

14. The system of claim 1, wherein the accessory is selected from the group consisting of a bin accessory, a document holder accessory, a hook accessory, a drawer shelf accessory, a shelf accessory, and a bulldog clip accessory.

15. A system configured to couple to a wall, the system comprising:

a mount configured to be detachably coupled to the wall, the mount including a frame having opposing front and rear surfaces and at least one hook protruding forward from the front surface of the frame;

a panel detachably coupled to the mount, the panel configured to be slidingly repositionable relative to the mount and to detachably support at least one accessory and includes at least one corresponding hook receptacle, wherein the at least one hook is detachably engageable with the at least one corresponding hook receptacle;

wherein:

the at least one hook includes a depression;

the at least one corresponding hook receptacle includes a tab; and the depression is configured to receive the tab.

16. A system configured to couple to a wall, the system comprising:

a mount configured to be detachably coupled to the wall, the mount including a frame having opposing front and rear surfaces;

wherein the mount further includes:

at least one adhesive member coupled to the rear surface of the frame; and at least one bumper biased rearward beyond the at least one adhesive member, the at least one bumper configured to pivot between an engaged position and a disengaged position wherein the bumper extends beyond the at least one adhesive member; and a panel detachably coupled to the mount, the panel configured to detachably support at least one accessory;

wherein the panel further includes:

a middle panel including:

a plurality of horizontal slat rails, with adjacent horizontal slat rails spaced apart by a first distance; and a plurality of vertical support members interconnecting the plurality of horizontal slat rails; and a face panel joined to the middle panel, the face panel including:

a plurality of spaced apart slats, each slat including:

a vertical face panel having a generally flat front surface and a rear surface opposite the front surface; and a pair of legs spaced apart by a second distance, the legs extending orthogonally from the rear surface of the vertical face panel, wherein the second distance is substantially equal to the first distance.

17. A system configured to couple to a wall, the system comprising:

a mount configured to be detachably coupled to the wall, the mount including a frame having opposing front and rear surfaces;

wherein the mount further includes:

at least one adhesive member coupled to the rear surface of the frame; and at least one bumper configured to bias rearward beyond the at least one adhesive member, the at least one bumper configured to pivot between an engaged position and a disengaged position wherein the bumper extends beyond the at least one adhesive member; and a panel detachably coupled to the mount, the panel configured to detachably support at least one accessory;

the panel comprising:

an upper edge;

a lower edge;

an L-shaped flange disposed on the upper edge of the panel configured to be spaced apart from the mount by a first distance;

an inverted L-shaped flange on the lower edge of the panel configured to be spaced apart from the mount by a second distance; and wherein the first distance is greater than the second distance.

* * * * *